(12) United States Patent
Sueyoshi et al.

(10) Patent No.: US 10,075,829 B2
(45) Date of Patent: Sep. 11, 2018

(54) INFORMATION PROCESSING DEVICE, INFORMATION TRANSMISSION CONTROL DEVICE, INFORMATION PROCESSING METHOD, INFORMATION TRANSMISSION CONTROL METHOD, PROGRAM, AND INFORMATION PROCESSING SYSTEM

(71) Applicant: SONY CORPORATION, Tokyo (JP)

(72) Inventors: Masahiro Sueyoshi, Kanagawa (JP); Yoshihiro Yoneda, Tokyo (JP); Takashi Abeno, Kanagawa (JP); Tomohiko Nagayama, Tokyo (JP); Masashi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/318,186

(22) PCT Filed: Mar. 19, 2015

(86) PCT No.: PCT/JP2015/058354
§ 371 (c)(1),
(2) Date: Dec. 12, 2016

(87) PCT Pub. No.: WO2015/194219
PCT Pub. Date: Dec. 23, 2015

(65) Prior Publication Data
US 2017/0127223 A1 May 4, 2017

(30) Foreign Application Priority Data

Jun. 19, 2014 (JP) .................................. 2014-126239
Jul. 16, 2014 (JP) .................................. 2014-145796

(51) Int. Cl.
*H04B 5/00* (2006.01)
*H04W 4/80* (2018.01)
(Continued)

(52) U.S. Cl.
CPC .......... *H04W 4/80* (2018.02); *G06Q 30/0261* (2013.01); *G06Q 30/0267* (2013.01); *H04W 4/008* (2013.01); *H04W 8/005* (2013.01)

(58) Field of Classification Search
CPC .......... G06Q 30/0261; G06Q 30/0267; H04W 4/008; H04W 8/005
See application file for complete search history.

(56) References Cited

U.S. PATENT DOCUMENTS

| 2012/0303455 A1* | 11/2012 | Busch | ..................... H04W 4/02 705/14.57 |
| 2014/0019254 A1* | 1/2014 | Reichert | ............ G06Q 30/0267 705/14.64 |

(Continued)

FOREIGN PATENT DOCUMENTS

| JP | 2011-166447 | 8/2011 |
| JP | 2013-258487 | 12/2013 |

(Continued)

*Primary Examiner* — Xin Jia
(74) *Attorney, Agent, or Firm* — Paratus Law Group, PLLC

(57) ABSTRACT

Provided is an information processing device including: a processing unit configured to, when an information transmission control device is detected based on a signal transmitted from the information transmission control device using first communication, cause user information indicating a user to be transmitted to the information transmission control device using second communication whose communicable range is narrower than the first communication, and to acquire, using the first communication, distribution information transmitted from the information transmission control device that has acquired the user information.

16 Claims, 29 Drawing Sheets

(51) Int. Cl.
*H04W 4/00* (2018.01)
*H04W 8/00* (2009.01)
*G06Q 30/02* (2012.01)

(56) References Cited

U.S. PATENT DOCUMENTS

2014/0058941 A1* 2/2014 Moon ................... G06Q 20/322
   705/42
2015/0206129 A1* 7/2015 Perez Lafuente ... H04L 63/0807
   705/44

FOREIGN PATENT DOCUMENTS

JP    2014-110011    6/2014
WO    WO2005/111880 A1    11/2005

* cited by examiner

FIG.4

| No | Station INFORMATION | DISTRIBUTION INFORMATION | USER INFORMATION | NUMBER OF ISSUED PERMISSIONS |
|---|---|---|---|---|
| 1 | A | 10% DISCOUNT FROM PRODUCT A1 | GENERAL | 1 |
| 2 | B | 5% DISCOUNT FROM PRODUCT B2 | USER B | 1 |
| 3 | C | 5% DISCOUNT FROM PRODUCT C2 | GENERAL | 2 |
| ⋮ | ⋮ | ⋮ | ⋮ | ⋮ |

Columns: I1, I2, I3, I4

FIG.8
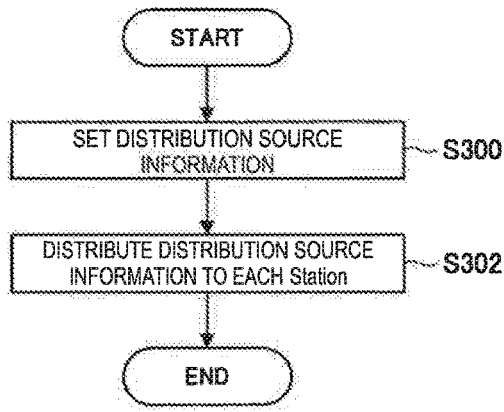
FIG.9
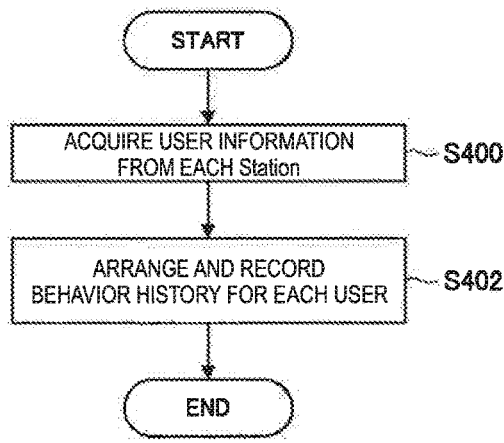
FIG.10
| No | USER INFORMATION | BEHAVIOR HISTORY |
|---|---|---|
| 1 | USER A | Station-A : TIME A1 ⇒ Station-B : TIME B1 ⇒ Station-C : TIME C3 |
| 2 | USER B | Station-A : TIME A2 ⇒ Station-B : TIME B2 ⇒ Station-C : TIME C2 |
| 3 | USER C | Station-A : TIME A3 ⇒ Station-C : TIME C3 |
| ⋮ | ⋮ | ⋮ |

| No | Station INFORMATION | DISTRIBUTION INFORMATION | USER INFORMATION | NUMBER OF ISSUED PERMISSIONS |
|---|---|---|---|---|
| 1 | A | 10% DISCOUNT FROM PRODUCT A1 | GENERAL | 1 |
| 2 | A | 20% DISCOUNT FROM PRODUCT A1 | USER A | 1 |
| 3 | B | 5% DISCOUNT FROM PRODUCT B2 | USER B | 1 |
| 3 | B | 5% DISCOUNT FROM PRODUCT B2 | USER C | 3 |
| 3 | C | 5% DISCOUNT FROM PRODUCT C2 | GENERAL | 2 |
| ⋮ | ⋮ | ⋮ | ⋮ | ⋮ |

FIG.22

| No | UNIQUE ID | SHOP ID | SHOP INFORMATION | COUPON TYPE TO BE DISTRIBUTED | ... |
|----|-----------|---------|------------------|-------------------------------|-----|
| 1 | ID1 | A | General Sale Info A | General Coupon A | ... |
| 2 | ID2 | B | General Sale Info B | General Coupon B | ... |
| 3 | ID3 | A | Special Sale Info A | Special Coupon A | ... |
| ... | ... | ... | ... | ... | ... |
| N | IDn | A | Special Sale Info A | Special Coupon A | ... |

FIG.23

| No | UNIQUE ID | USER INFORMATION | CREDIT CARD INFORMATION | PROCESS COMPLETION FLAG STORAGE AREA | |
|---|---|---|---|---|---|
| 1 | ID1 | Person A | 1111-2222-3333-4444 | Completed | ... |
| 2 | ID2 | Person B | 2222-3333-4444-5555 | N/A | ... |
| 3 | ID3 | Person C | 3333-4444-5555-6666 | Incomplete | ... |
| ... | ... | ... | ... | N/A | ... |
| N | IDn | Person N | AAAA-BBBB-CCCC-DDDD | Incomplete | ... |

FIG.29

| Offset | Field |
|---|---|
| +0 | PAYMENT TYPE |
| +1 | UNIQUE ID |
| +2 | ELECTRONIC VALUE |
| +3, +4 | COUPON INFORMATION |
| +5, +6 | ELECTRONIC RECEIPT |
| +7 | ELECTRONIC RECEIPT EXCHANGE COMPLETION FLAG |
| +8, +9 | OTHER ATTRIBUTE INFORMATION |

… # INFORMATION PROCESSING DEVICE, INFORMATION TRANSMISSION CONTROL DEVICE, INFORMATION PROCESSING METHOD, INFORMATION TRANSMISSION CONTROL METHOD, PROGRAM, AND INFORMATION PROCESSING SYSTEM

CROSS REFERENCE TO PRIOR APPLICATION

This application is a National Stage Patent Application of PCT International Patent Application No. PCT/JP2015/058354 (filed on Mar. 19, 2015) under 35 U.S.C. § 371, which claims priority to Japanese Patent Application Nos. 2014-145796 (filed on Jul. 16, 2014) and 2014-126239 (filed on Jun. 19, 2014), which are all hereby incorporated by reference in their entirety.

TECHNICAL FIELD

The present disclosure relates to an information processing device, an information transmission control device, an information processing method, an information transmission control method, a program, and an information processing system.

BACKGROUND ART

Technologies in which data can be distributed, for example, broadcast-type data distribution using Bluetooth low energy (BLE), data distribution using near field communication (NFC), and the like, have been developed.

In addition, technologies for estimating behavior patterns of users have been developed. A technology described in Patent Literature 1 mentioned below, for example, is exemplified as a technology for estimating behavior patterns of a user based on movement routes and movement speeds of the user.

CITATION LIST

Patent Literature

Patent Literature 1: WO 2005/111880

SUMMARY OF INVENTION

Technical Problem

Although there are technologies in which distribution target data (which will be referred to as "distribution information" hereinbelow) can be distributed, for example, the broadcast-type data distribution using BLE, and the data distribution using NFC, a method which can enhance user convenience in acquisition of distribution information and the like has been demanded.

The present disclosure proposes a novel and improved information processing device, information transmission control device, information processing method, information transmission control method, program, and information processing system which can achieve enhancement of user convenience in acquisition of distribution information.

Solution to Problem

According to the present disclosure, there is provided an information processing device including: a processing unit configured to, when an information transmission control device is detected based on a signal transmitted from the information transmission control device using first communication, cause user information indicating a user to be transmitted to the information transmission control device using second communication whose communicable range is narrower than the first communication, and to acquire, using the first communication, distribution information transmitted from the information transmission control device that has acquired the user information.

According to the present disclosure, there is provided an information transmission control device including: a communication control unit configured to cause a signal to be transmitted using first communication, and to cause distribution information to be transmitted using the first communication when user information indicating a user is acquired using second communication whose communicable range is narrower than the first communication.

According to the present disclosure, there is provided an information processing method executed by an information processing device, the method including: a step of causing, when an information transmission control device is detected based on a signal transmitted from the information transmission control device using first communication, user information indicating a user to be transmitted to the information transmission control device using second communication whose communicable range is narrower than the first communication; and a step of acquiring, using the first communication, distribution information transmitted from the information transmission control device that has acquired the user information.

According to the present disclosure, there is provided an information transmission control method executed by an information transmission control device, the method including: a step of transmitting a signal using first communication; and a step of transmitting distribution information using the first communication when user information indicating a user is acquired using second communication whose communicable range is narrower than the first communication.

According to the present disclosure, there is provided a program for causing a computer to execute: a step of transmitting, when an information transmission control device is detected based on a signal transmitted from the information transmission control device using first communication, user information indicating a user to the information transmission control device using second communication whose communicable range is narrower than the first communication; and a step of acquiring, using the first communication, distribution information transmitted from the information transmission control device that has acquired the user information.

According to the present disclosure, there is provided a program for causing a computer to execute: a step of transmitting a signal using first communication; and a step of transmitting distribution information using the first communication when user information indicating a user is acquired using second communication whose communicable range is narrower than the first communication.

According to the present disclosure, there is provided an information processing system including: an information transmission control device; and an information processing device. The information transmission control device includes a communication control unit configured to cause a signal to be transmitted using first communication, and to cause distribution information to be transmitted using the first communication when user information indicating a user is acquired using second communication whose communicable range is narrower than the first communication. The information processing device includes a processing unit configured to, when the information transmission control device is detected based on a signal transmitted from the information transmission control device using the first communication, cause the user information to be transmitted to the information transmission control device using the second communication, and to acquire, using the first communication, the distribution information transmitted from the information transmission control device.

Advantageous Effects of Invention

According to the present disclosure, enhancement of user convenience in acquisition of distribution information can be achieved.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an illustrative diagram showing an example of distribution source information according to the present embodiment.

FIG. 8 is an illustrative diagram for describing a first example of another process relating to the information processing system according to the present embodiment.

FIG. 9 is an illustrative diagram for describing a first example of another process relating to the information processing system according to the present embodiment.

FIG. 10 is an illustrative diagram for describing a first example of another process relating to the information processing system according to the present embodiment.

FIG. 22 is an illustrative diagram showing an example of a coupon distribution database according to the present embodiment.

FIG. 23 is an illustrative diagram showing an example of a payment database according to the present embodiment.

FIG. 29 is an illustrative diagram for describing an example of a process of an information processing device constituting the payment system according to the present embodiment.

DESCRIPTION OF EMBODIMENT(S)

Figure 1:
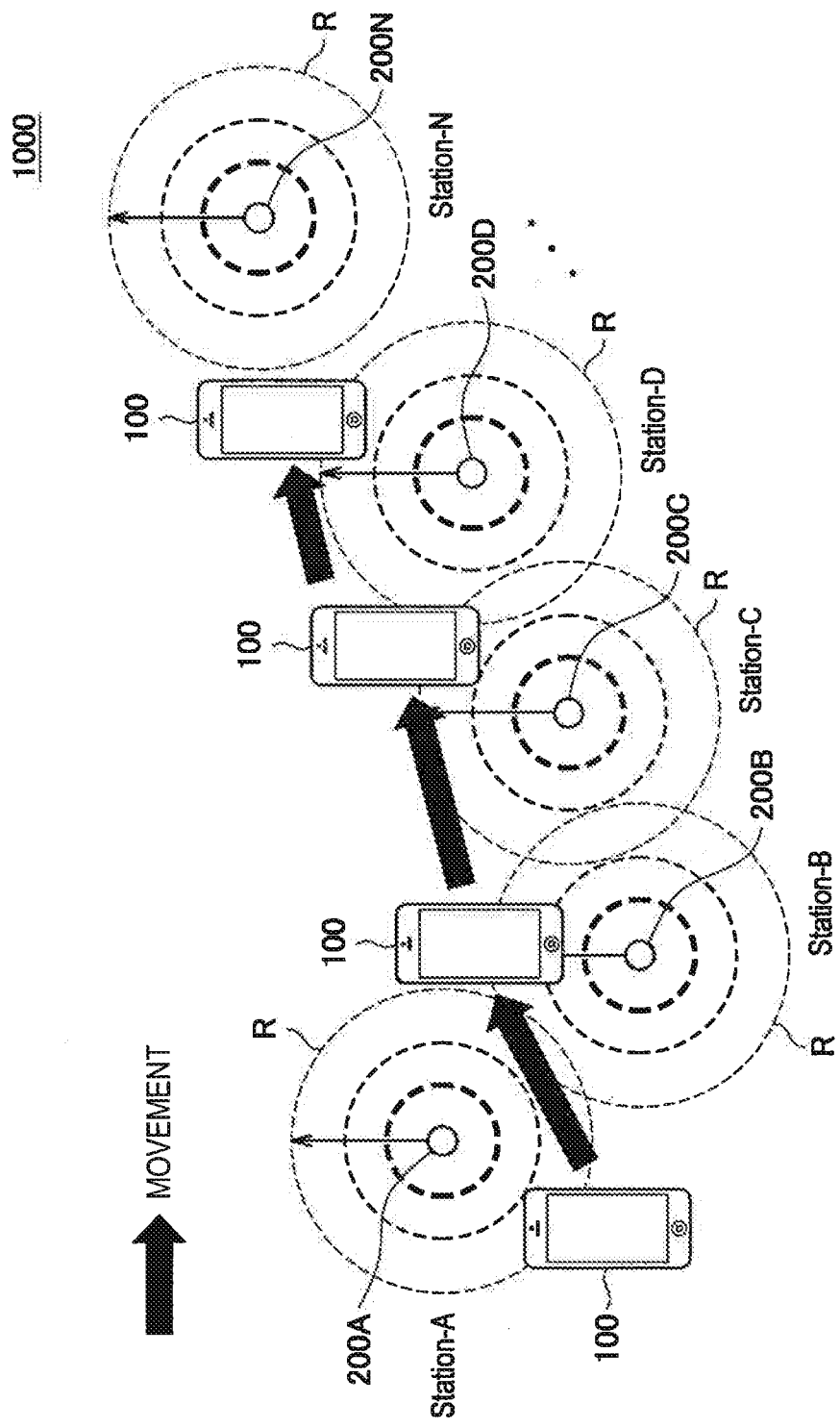
FIG. 1 is an illustrative diagram for describing an overview of an information processing system according to the present embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In addition, description will be provided below in the following order.

1. Information processing system according to present embodiment
2. Information processing device and information transmission control device according to present embodiment
3. Program according to present embodiment
4. Payment system according to present embodiment
5. Program relating to payment system according to present embodiment Information Processing System According to Present Embodiment

[1] Overview of Information Processing System According to Present Embodiment

As distribution methods of distribution information, for example, the broadcast-type data distribution using BLE and the data distribution using NFC are exemplified as described above.

However, the existing broadcast-type data distribution using BLE is merely for distributing distribution information using broadcast-type data communication. Thus, when the existing broadcast-type data distribution is performed, it is difficult to distribute distribution information corresponding to a user thereof.

In addition, the data distribution using NFC, for example, is performed for an information processing device when a user of the information processing device uses the information processing device to perform a touch operation with respect to a device (for example, a device playing a role of a reader/writer in NFC) that transmits distribution information. Thus, when the data distribution using NFC is performed, there is a possibility of distribution information corresponding to the user being distributed.

Here, a touch operation according to the present embodiment is, for example, an operation of moving an information processing device into a communicable range in which communication based on NFC is performed with an NFC communication-enabled device (for example, a device playing a role of a reader/writer in NFC). That is, the touch operation according to the present embodiment corresponds to an example of a user operation to start second communication.

When the data distribution using NFC is performed, however, the communicable range of NFC is short at about 10 [cm], and thus if an information processing device moves beyond the communicable range of NFC, the information processing device may not be able to acquire distribution information. In addition, when the information processing device is not able to acquire distribution information as described above, in order to cause distribution information to be acquired, the user should perform a touch operation using the information processing device again.

Thus, in an information processing system according to the present embodiment, acquisition of distribution information by an information processing device is realized using both first communication and second communication whose communicable range is narrower than the first communication.

Specifically, for example, when a signal is transmitted using the first communication and thus user information is acquired from an information processing device using the second communication in the information processing system according to the present embodiment, an information transmission control device which transmits distribution information transmits distribution information using first communication. In addition, when the signal transmitted from the information transmission control device using the first communication is detected in the information processing system according to the present embodiment, the information processing device transmits the user information using the second communication, and acquires the distribution information transmitted from the information transmission control device using the first communication.

Here, as the first communication according to the present embodiment, wireless communication, for example, wireless communication using IEEE 802.15.1 such as BLE, wireless communication using IEEE 802.11, and the like are exemplified. In addition, as the second communication according to the present embodiment, wireless communication whose communicable range is narrower than the first communication, for example, NFC, infrared communication, and the like, is exemplified. Note that the second communication may be, for example, a local area network (LAN), wired communication using a Universal Serial Bus (USB), or the like.

An example in which the first communication according to the present embodiment is wireless communication using IEEE 802.15.1 (which may be referred to as "BT" hereinbelow) and the second communication according to the present embodiment is NFC will be introduced below. When the first communication according to the present embodiment is wireless communication using IEEE 802.15.1 such as BLE, the first communication is communication which can be performed with low power consumption.

In addition, the distribution information according to the present embodiment is data to be distributed (data to be transmitted). As distribution data, any data, for example, data indicating a coupon (which will be indicated as "coupon information" below), data indicating an advertisement, or the like is exemplified. An example in which the distribution information according to the present embodiment is coupon information will be mainly introduced below.

In addition, the distribution information according to the present embodiment may include, for example, user information acquired by the information transmission control device from the information processing device. Furthermore, the information transmission control device may transmit, for example, distribution information associated with the user information acquired from the information processing device. When the distribution information associated with the user information is transmitted, the user information may be transmitted in the first communication along with the distribution information.

The information transmission control device decides distribution information to be transmitted with reference to, for example, distribution source information that is data serving as foundation of the distribution information according to the present embodiment, and transmits the decided distribution information using the first communication. Here, the distribution source information according to the present embodiment is newly generated and updated by an external device, for example, a management device according to the present embodiment to be described below. An example of a process for the generation and the like of the distribution source information by the management device according to the present embodiment and an example of the distribution source information according to the present embodiment will be described below.

In addition, the user information according to the present embodiment is data indicating a user. As the user information according to the present embodiment, for example, user identification information (for example, data indicating an ID or the like) indicating a user such as a user of the information processing device or a user who uses services is exemplified. Furthermore, the user information according to the present embodiment may be, for example, device identification information indicating the information processing device (for example, an ID of the information processing device or the like).

FIG. 1 is an illustrative diagram for describing an overview of an information processing system 1000 according to the present embodiment.

The information processing system 1000 has, for example, an information processing device 100 and information transmission control devices 200A, 200B, . . . , and 200N. The information transmission control devices 200A, 200B, . . . , and 200N may each be denoted as "Station-A," "Station-B," . . . , and "Station-N" below. In addition, "information transmission control device 200" or "Station" may refer to the plurality of information transmission control devices 200A, 200B, . . . , and 200N collectively or a single information transmission control device among the plurality of information transmission control devices 200A, 200B, . . . , and 200N below.

Note that, although the example in which the information processing system 1000 has the plurality of information transmission control devices 200 is shown in FIG. 1, a configuration of the information processing system according to the present embodiment is not limited to the example shown in FIG. 1. The information processing system according to the present embodiment may have a configuration in which, for example, one information transmission control device 200 is provided.

The information processing device 100 acquires distribution information in the first communication, using both the first communication and the second communication. The information processing device 100 acquires the distribution information by performing, for example, a process indicated in a process for distribution of the distribution information in the information processing system according to the present embodiment to be described below (an example of a process of an information processing method according to the present embodiment).

The information processing device 100 is, for example, a device carried by a user, and moves together with the moving user. Although a communication device such as a smartphone is shown as the information processing device 100 in FIG. 1, the information processing device 100 according to the present embodiment is not limited to the example shown in FIG. 1.

The information transmission control devices 200 transmit distribution information in the first communication, using both the first communication and the second communication. The information transmission control devices 200 transmit distribution information in the first communication by performing a process indicated by a process for distribution of the distribution information in the information processing system according to the present embodiment to be described below (an example of a process of an information transmission control method according to the present embodiment). "R" shown in FIG. 1 indicates a communicable range of the first communication of each information transmission control device 200.

Each information transmission control device 200, for example, transfers distribution information and a transmission command to a first communication unit (to be described below) which is provided in the information transmission control device 200 and can perform the first communication or an external communication device which is connected to the information transmission control device 200 and can perform the first communication, and thereby causes the first communication unit (to be described below) or the like to transmit the distribution information.

[2] Process for Distribution of Distribution Information in Information Processing System According to Present Embodiment Next, an example of a process for distribution of distribution information in the information processing system 1000 will be described. A process of the information processing device 100 in the process for distribution of distribution information in the information processing system 1000 to be shown below corresponds to the process of the information processing method according to the present embodiment. In addition, a process of the information transmission control device 200 in the process for distribution of distribution information in the information processing system 1000 to be shown below corresponds to the process of the information transmission control method according to the present embodiment.

Figure 2:
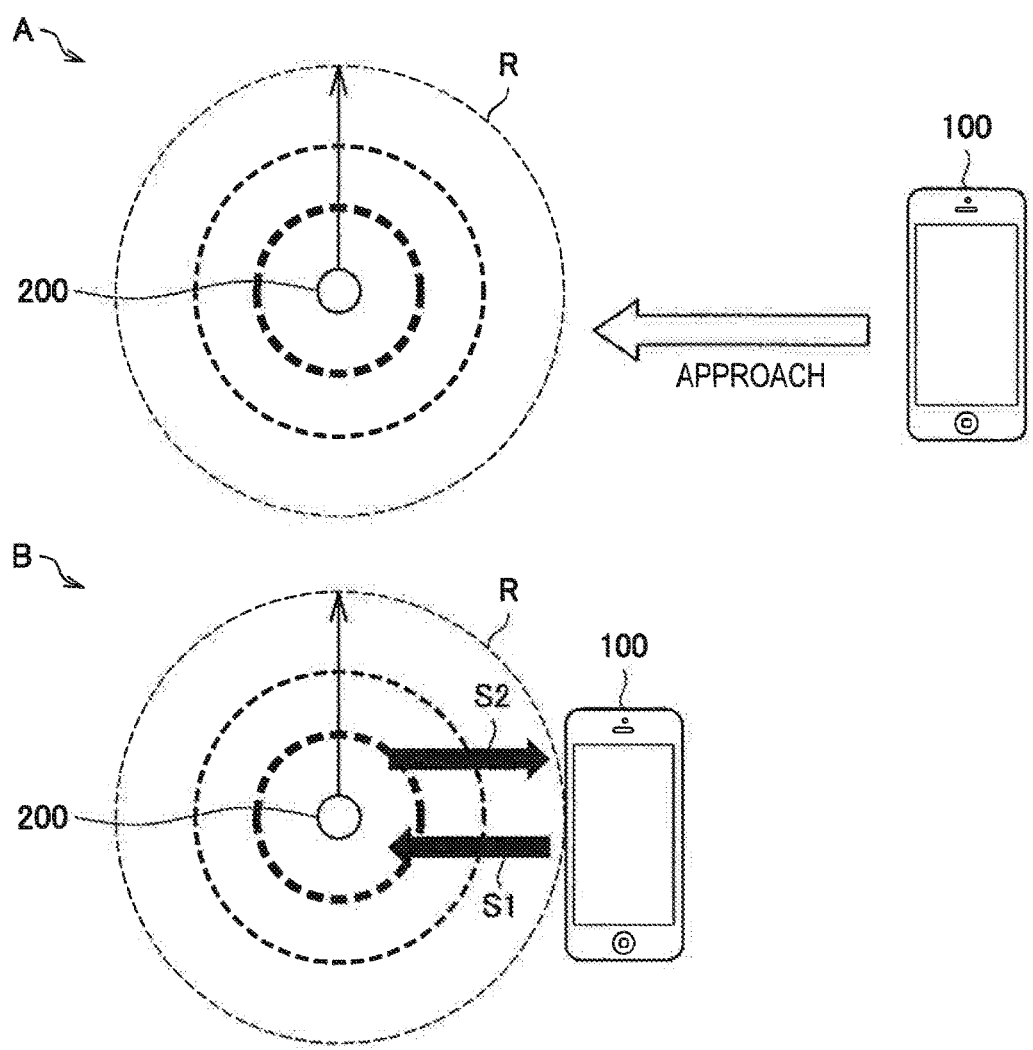
FIG. 2 is an illustrative diagram for describing an example of a process for distribution of distribution information in the information processing system according to the present embodiment.

FIG. 2 is an illustrative diagram for describing an example of the process for distribution of distribution information in the information processing system 1000 according to the present embodiment, showing the example of the process for distribution of distribution information in the information processing system 1000. "R" shown in FIG. 2 indicates a communicable range of the first communication of the information transmission control device 200.

Figure 3:
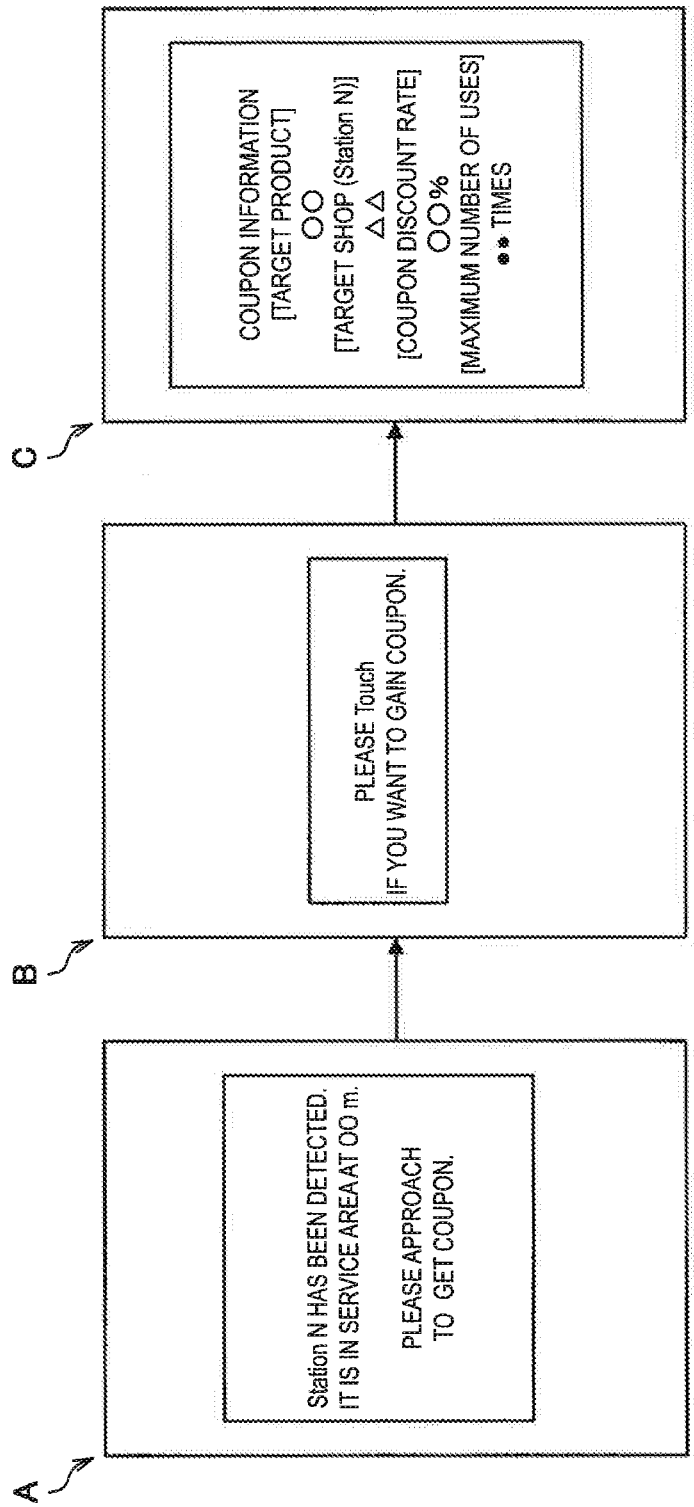
FIG. 3 is an illustrative diagram for describing an example of a process for distribution of distribution information in the information processing system according to the present embodiment.

FIG. 3 is an illustrative diagram for describing the example of the process for distribution of distribution information in the information processing system 1000 according to the present embodiment. A of FIG. 3 to C of FIG. 3 each indicate an example of a display screen of a display unit (to be described below) provided in the information processing device 100 or a screen displayed on a display screen of an external display device connected to the information processing device 100.

The information transmission control device 200, for example, controls the first communication unit (to be described below) or the like provided in the information transmission control device 200 to transmit signals in the first communication. Here, signals transmitted by the information transmission control device 200 in the first communication include, for example, identification information indicating the information transmission control device 200 (for example, an ID of the information transmission control device 200, etc.), and the like. The signals transmitted by the information transmission control device 200 in the first communication correspond to, for example, transmission of beacons.

When the user of the information processing device 100 moves as shows A of FIG. 2 and thus the information processing device 100 enters the communicable range R of the first communication of the information transmission control device 200, for example, the information processing device 100 detects the information transmission control device 200 based on a signal transmitted from the information transmission control device 200 using the first communication. Upon acquiring the signal transmitted from the information transmission control device 200 using the first communication, for example, the information processing device 100 determines that the information transmission control device 200 has been detected.

The information processing device 100, for example, acquires signals or data transmitted from an external device such as the information transmission control device 200 using the first communication via a first communication unit (to be described below) which is provided in the information processing device 100 and can perform the first communication, or an external communication device which is connected to the information processing device 100 and can perform the first communication.

In addition, the information processing device 100 may measure an intensity of a signal transmitted from the information transmission control device 200 in the first communication, using a Received Signal Strength Indicator (RSSI) provided in the information processing device 100, or an external RSSI connected to the information processing device 100.

Upon detecting the information transmission control device 200 using the first communication, the information processing device 100, for example, notifies the user that the information transmission control device 200 has been detected.

The information processing device 100 notifies the user that the information transmission control device 200 has been detected using any method which enables notification to the user, for example, visual notification performed by displaying text, images, or the like on a display screen, auditory notification performed by outputting a sound (including music) to an audio output device such as a speaker, notification performed by combining these, or the like. The audio output device for the auditory notification according to the present embodiment may be, for example, an audio output device constituting an audio output unit (to be described below) provided in the information processing device 100, or an external audio output device connected to the information processing device 100. To exemplify a specific example of the notification by the information processing device 100, the information processing device 100, for example, causes the display screen to display the screen shown in A of FIG. 3 when the information transmission control device 200 has been detected using the first communication.

In addition, when the information processing device 100 can obtain a result of measurement for an intensity of a signal transmitted from the information transmission control device 200 using the first communication, if the intensity of the signal is equal to or higher than a set threshold value (or when the intensity of the signal is higher than the threshold value), the screen shown in B of FIG. 3 may be displayed on the display screen. That is, the information processing device 100 may, for example, change content that the user is notified of according to a state of the detection of the information transmission control device 200 in the first communication.

Because the user is notified that the information transmission control device 200 has been detected, the user can more easily ascertain a method for acquiring the distribution information using the information processing device 100, as shown in, for example, A of FIG. 3 and B of FIG. 3. In addition, because the user is notified that the information transmission control device 200 has been detected, the presence of the information transmission control device 200 can be more easily ascertained as shown in, for example, A of FIG. 3 and B of FIG. 3.

Thus, because the information processing device 100 notifies the user that the information transmission control device 200 has been detected when the information transmission control device 200 has been detected using the first communication, user convenience can be further enhanced. Note that the information processing device 100 according to the present embodiment can also have, for example, a configuration in which it does not notify the user that the information transmission control device 200 is detected.

For example, when the information processing device 100 and the information transmission control device 200 enter a communicable range of the second communication as the user performs a touch operation on the information transmission control device 200 using the information processing device 100, the information processing device 100 transmits user information using the second communication (S1 of FIG. 2).

When the second communication is NFC, the information processing device 100 is in a state in which, for example, it can perform the second communication with the information transmission control device 200 as the user performs the touch operation as described above to transmit the user information. That is, the touch operation by the user when the second communication is NFC may correspond to a user operation to start the second communication.

Upon detecting the information transmission control device 200 using the first communication, the information processing device 100 transmits the user information using the second communication based on a user operation to start the second communication such as the touch operation. That is, the performance of the user operation by the user to start the second communication such as the touch operation can be understood as consent of the user to transmission of the user information.

Note that a user operation to start the second communication according to the present embodiment is not limited to the touch operation. A user operation to start the second communication may be an arbitrary operation associated with a start of the second communication, for example, a button operation to start the second communication.

The information processing device 100 transmits data such as user information, or a signal such as a response signal to an external device such as the information transmission control device 200 via, for example, a second communication unit (to be described below) which is provided in the information processing device 100 and can perform the second communication, or an external communication device which is connected to the information processing device 100 and can perform the second communication. When the second communication is NFC, the information processing device 100 controls, for example, load modulation for the second communication unit (to be described below) to transmit user information and the like.

Upon acquiring the user information transmitted from the information processing device 100 using the second communication, the information transmission control device 200 distributes distribution information using the first communication (S2 of FIG. 2).

Here, the information transmission control device 200 acquires signals or data transmitted from an external device such as the information processing device 100 using the second communication via, for example, a second communication unit (to be described below) which is provided in the information transmission control device 200 and can perform the second communication, or an external communication device which is connected to the information transmission control device 200 and can perform the second communication.

The information transmission control device 200 decides distribution information with reference to, for example, distribution source information, and transmits the decided distribution information. The information transmission control device 200 refers to, for example, a storage unit (to be described below) provided in the information transmission control device 200, or distribution source information stored in a connected external recording medium, or the like. In addition, the information transmission control device 200 can perform communication with an external device, for example, a server that stores distribution source information, to refer to the distribution source information stored in the external device.

In addition, the information transmission control device 200, for example, may transmit, using the first communication, distribution information including the user information acquired from the information processing device 100 using the second communication as described above. The information transmission control device 200, for example, merges the distribution information decided with reference to the distribution source information with the user information acquired from the information processing device 100 and transmits the merged data as distribution information.

Furthermore, the information transmission control device 200, for example, can also transmit distribution information associated with the user information acquired from the information processing device 100 using the second communication as described above. The information transmission control device 200, for example, transmits distribution information associated with the user information along with the user information.

As the information transmission control device 200 transmits the distribution information that includes the user information using the first communication, or the distribution information associated with the user information using the first communication, restriction on use of the distribution information using the user information, for example, can be realized in the information processing system according to the present embodiment.

To exemplify a specific example, in the information processing system according to the present embodiment, for example, a device which uses distribution information in processes determines whether or not user information included in the distribution information or user information associated with the distribution information coincides with user information corresponding to the information processing device 100 before a process using the distribution information is performed. In addition, the device which uses distribution information in a process, for example, may determine whether or not the user information included in the distribution information or the like includes user information corresponding to the information processing device 100. Here, as the device which uses distribution information in processes according to the present embodiment, for example, the information processing device 100, or an external device which can communicate with the information processing device 100 is exemplified.

In addition, the device which uses distribution information in processes, for example, performs a process using the distribution information when the user information included in the distribution information or the like coincides with the user information corresponding to the information processing device 100. Further, when the user information included in the distribution information or the like does not coincide with the user information corresponding to the information processing device 100, for example, the device which uses distribution information in processes performs no process using the distribution information.

As the device which uses distribution information in processes selectively performs a process using the distribution information based on the result of the determination process using the user information as described above, for example, restriction on use of the distribution information using the user information is realized.

FIG. 4 is an illustrative diagram showing an example of distribution source information according to the present embodiment. The distribution source information stores, for example, information indicating the information transmission control device 200 (for example, "Station information" indicated in I1 of FIG. 4), distribution information (I2 of FIG. 4), user information (I3 of FIG. 4), and information indicating a condition for restriction on distribution (for example, "the number of issued permissions" indicated in I4 of FIG. 4) that are associated with each other.

Referring to the distribution source information shown in FIG. 4, for example, the information transmission control device 200 searches "Station information" corresponding to the device itself (the information transmission control device 200) from the distribution source information. Then, the information transmission control device 200 specifies the "distribution information" associated with the searched "Station information" as distribution information to be transmitted.

In addition, when "Station information" shown in FIG. 4 is associated with "user information, "the information transmission control device 200 refers to the "user information" associated with the searched "Station information."

Here, when no specific user is set in the "user information" associated with the searched "Station information, "as in" general" shown in FIG. 4, the information transmission control device 200 transmits the specified distribution information.

In addition, when a specific user such as a "user B" shown in FIG. 4 is set in the "user information" associated with the searched "Station information, "for example, the information transmission control device 200 determines whether or not the user information acquired using the second communication coincides with the "user information" associated with the "Station information." Then, when the user information acquired using the second communication coincides with the "user information" associated with the "Station information, "the information transmission control device 200 transmits the specified distribution information. In addition, when the user information acquired using the second communication does not coincide with the "user information" associated with the "Station information, "for example, the information transmission control device 200 does not transmit the specified distribution information.

When the user information acquired using the second communication coincides with the "user information" associated with the "Station information" as described above and the specified distribution information is transmitted, for example, the distribution information transmitted by the information transmission control device 200 is information (data) corresponding to the user information transmitted by the information processing device 100 using the second communication.

In addition, there can be cases in which, as a result of searching the distribution source information, there are a plurality of pieces of "Station information" corresponding to the device itself (the information transmission control device 200). When there are a plurality of pieces of searched "Station information" and the" user information" associated with the searched "Station information" has mixed settings of no specific user, like "general" shown in FIG. 4, and a specific user, like "user B" shown in FIG. 4, the information transmission control device 200 performs processes as shown in, for example, (a) and (b) below. Note that it is a matter of course that a process performed when there are a plurality of pieces of "Station information" corresponding to the device itself (the information transmission control device 200) is not limited to the processes shown in (a) and (b) below.

(a) A process for the" user information" with a set specific user is performed with priority.

(b) When specified distribution information due to (a) is not transmitted, a process for the" user information" without a set specific user is performed.

Note that a method of the information transmission control device 200 for transmitting distribution information corresponding to the user information transmitted by the information processing device 100 using the second communication is not limited to the example in which the distribution source information is used shown in FIG. 4. The information transmission control device 200, for example, can also specify distribution information corresponding to the user information acquired using the second communication with reference to a table or a database in which the user information is associated with the distribution information (an example of the distribution source information), and transmit the specified distribution information.

When the information transmission control device 200 can transmit the distribution information corresponding to the user information as described above, the information transmission control device 200 may perform a combined process of for example, transmission control of distribution information based on broadcast-type data distribution and transmission control of distribution information corresponding to the user information. When the information transmission control device 200 transmits distribution information independent of user information using the first communication based on the broadcast-type data distribution and acquires user information using the second communication, for example, distribution information corresponding to the user information is transmitted using the first communication.

When the information transmission control device 200 performs the combined process of transmission control of distribution information based on the broadcast-type data distribution and transmission control of distribution information corresponding to the user information, the user of the information processing device 100 enters the communicable range of the first communication of the information transmission control device 200, and thus the information processing device 100 acquires the distribution information independent of the user information. In addition, as the user of the information processing device 100 performs a touch operation using the information processing device 100 in this case, the information processing device 100 acquires the distribution information corresponding to the user information (for example, distribution information having superior content for the user than the distribution information independent of the user information).

In addition, when the searched "Station information" is associated with "the number of issued permissions" as shown in FIG. 4, the information transmission control device 200 refers to "the number of issued permissions" associated with the searched "Station information."

Here, when "the number of issued permissions" associated with the searched "Station information" is equal to or higher than one, the information transmission control device 200 transmits specified distribution information. In addition, when the "the number of issued permissions" associated with the searched "Station information" is not equal to or higher than one, the information transmission control device 200 does not transmit the specified distribution information. When the specified distribution information is transmitted, the information transmission control device 200 updates the distribution source information so that 1 is subtracted from the "the number of issued permissions" associated with the searched "Station information."

Since the distribution information is associated with "the number of issued permissions" (an example of information indicating a condition for restriction on distribution) as in the distribution source information shown in FIG. 4, for example, distribution of the distribution information can be restricted in terms of the number of times.

The information transmission control device 200, for example, decides the distribution information with reference to the distribution source information and selectively transmits the decided distribution information as described above.

Note that distribution source information according to the present embodiment is not limited to the example shown in FIG. 4.

Although the example in which "the number of issued permissions" indicating restriction on the number of times of distribution is included in the distribution source information as information indicating a condition for restriction on distribution is shown in FIG. 4, for example, information relating to other restriction such as information indicating restriction on a time or a period in which distribution is possible may be included instead of "the number of issued permissions." In addition, the distribution source information may include, as information indicating a condition for restriction on distribution, information relating to other restriction on distribution, such as information indicating restriction on a time or a period in which distribution is possible together. distribution of distribution information can be restricted if such information relating to other restriction on distribution described above (an example of information indicating a condition for restriction on distribution) is associated with the distribution information in the distribution source information.

In addition, the distribution source information according to the present embodiment may include either the user information (I3 of FIG. 4) or the information indicating a condition for restriction on distribution (for example, the "the number of issued permissions" shown in I4 of FIG. 4) or neither of them.

When the information transmission control device 200 which acquired the user information transmits the distribution information using the first communication, the information processing device 100 acquires the distribution information transmitted from the information transmission control device 200 in the first communication.

Here, when the information transmission control device 200 transmits the distribution information that includes the user information, for example, the information processing device 100 acquires the distribution information that includes the user information using the first communication. In addition, when the information transmission control device 200 transmits the user information along with the distribution information, for example, the information processing device 100 acquires the user information on top of the distribution information using the first communication.

In addition, upon acquiring the distribution information using the first communication, for example, the information processing device 100 notifies the user of the content indicated by the distribution information.

The information processing device 100 notifies the user of the content indicated by the distribution information using any method which enables notification to the user, for example, visual notification performed by displaying text, images, or the like on a display screen, auditory notification performed by outputting a sound (including music) to an audio output device such as a speaker, notification performed by combining these, or the like. Exemplifying a specific example of notification by the information processing device 100, upon acquiring the distribution information using the first communication, the information processing device 100, for example, causes the display screen to display the screen shown in C of FIG. 3.

As the user is notified of the content indicated by the acquired distribution information as shown in C of FIG. 3, for example, the user can understand the content indicated by the acquired distribution information more easily.

Thus, since the information processing device 100 notifies the user of the content indicated by the distribution information upon acquiring the distribution information using the first communication, user convenience can be more enhanced. Note that the information processing device 100 according to the present embodiment, for example, can also have a configuration in which the device does not notify the user of the content indicated by the acquired distribution information. In addition, when a user operation to give a notification of the content indicated by the distribution information has been detected, for example, the information processing device 100 according to the present embodiment may notify the user of the content of the distribution information.

In the information processing system 1000, the respective information processing device 100 and information transmission control device 200 perform the processes as described above using both the first communication and the second communication, and thereby distribution of the distribution information is realized.

Here, since the information processing device 100 detects the information transmission control device 200 using the first communication, it can detect the information transmission control device 200 which transmits the distribution information even outside the communicable range of the second communication.

In addition, when the information transmission control device 200 is detected using the first communication, the information processing device 100 transmits user information using the second communication with the information transmission control device 200. The transmission of the user information by the information processing device 100 is performed through, for example, a user operation to start the second communication, such as a touch operation. That is, in the information processing system 1000, the performance of the user operation to start the second communication such as a touch operation by a user is regarded as consent of the user to transmission of the user information, and thus the user information is provided from the information processing device 100 to the information transmission control device 200.

In addition, the information processing device 100 acquires, using the first communication, distribution information which has been transmitted in the first communication by the information transmission control device 200 which had acquired the user information using the second communication. Here, since the communicable range of the first communication is wider than the communicable range of the second communication, the information processing device 100 can acquire the distribution information more reliably than when the device acquires the distribution information in the second communication.

Therefore, since the respective information processing device 100 and information transmission control device 200 perform the above-described processes using both the first communication and the second communication, the information processing device 100 and the information transmission control device 200 can achieve enhancement of user convenience in acquisition of the distribution information. In addition, since the respective information processing device 100 and information transmission control device 200 perform the above-described processes using both the first communication and the second communication, the information processing system which can achieve enhancement of user convenience in the acquisition of the distribution information is realized.

[3] Examples of Processes of Information Processing Device and Information Transmission Control Device According to Present Embodiment Next, an example of the process of the information processing method of the information processing device 100 and an example of a process of an information transmission control method of the information transmission control device 200 which can realize the process for distribution of distribution information in the information processing system 1000 will be described.

[3-1] Process of Information Processing Method of Information Processing Device 100

Figure 5:
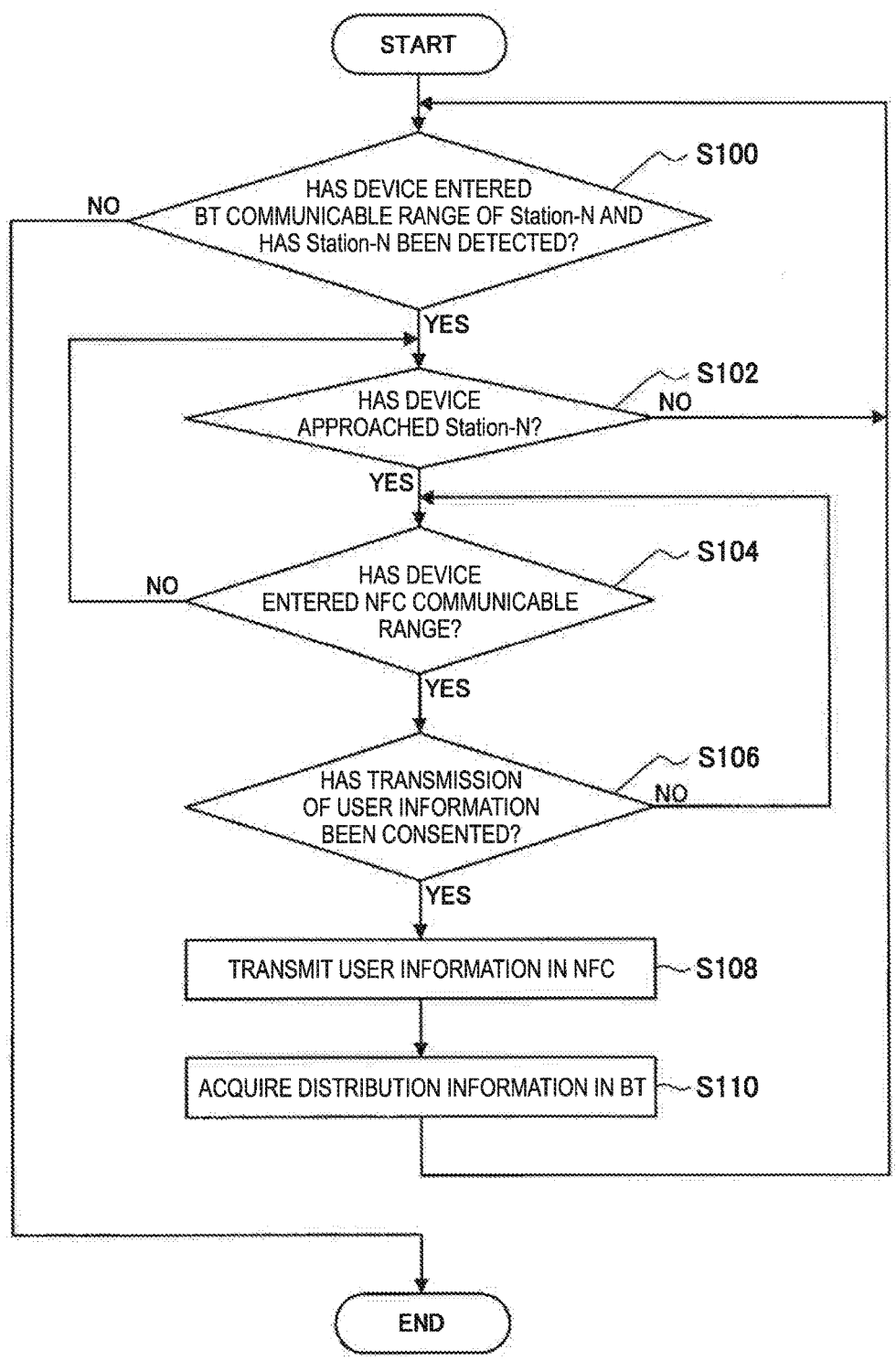
FIG. 5 is a flowchart showing an example of a process of an information processing method of an information processing device according to the present embodiment.

FIG. 5 is a flowchart showing the example of the process of the information processing method of the information processing device 100 according to the present embodiment. The information processing device 100, for example, repeats the process shown in FIG. 5 periodically or aperiodically. In FIG. 5, the information transmission control device 200 is denoted as a" Station-N." In addition, in FIG. 5, an example in which the first communication is "BT" and the second communication is "NFC" is shown.

The information processing device 100 determines whether or not the Station-N (the information transmission control device 200) has been detected in the first communication (S100). The information processing device 100 determines the Station-N to be detected when, for example, a signal transmitted using the first communication is acquired and the acquired signal includes identification information of the Station-N.

When the Station-N is determined not to have been detected in Step S100, the information processing device 100 ends the process of the information processing method. Here, when the Station-N is determined to have been detected first and thereafter the Station-N is determined not to have been detected in Step S100, the state corresponds that the user was in the communicable range of the first communication of the Station-N and then moved out of the communicable range.

In addition, when the Station-N is determined to have been detected in Step S100, the information processing device 100 determines whether or not it has approached the Station-N (S102). When an intensity of a signal transmitted from the Station-N in the first communication is equal to or higher than a set threshold value (or when the intensity of the signal is higher than the threshold value), for example, the information processing device 100 determines to have approached the Station-N.

When the information processing device determines not to have approached the Station-N in Step S102, for example, the information processing device 100 repeats the processes from Step S100.

In addition, when the information processing device determines to have approached the Station-N in Step S102, the information processing device 100 determines whether or not the information processing device has entered the communicable range of the second communication of the Station-N (S104). When a signal (for example, a polling signal or the like) transmitted using the second communication is acquired, for example, the information processing device 100 determines to have entered the communicable range of the second communication.

When it is determined that the information processing device has not entered the communicable range of the second communication of the Station-N in Step S104, for example, the information processing device 100 repeats the process from Step S102.

In addition, it is determined that the information processing device has entered the communicable range of the second communication of the Station-N in Step S104, the information processing device 100 determines whether or not transmission of user information has been consented (S106).

Here, when the second communication is NFC, a touch operation of the user can be understood as consent to the transmission of the user information. Thus, when the second communication is NFC, the information processing device 100 determines that the transmission of the user information has been consented according to, for example, the determination of Step S104 that it has entered the communicable range of the second communication of the Station-N.

In addition, for example, if a user operation to start the second communication is an operation other than a touch operation, such as a button operation to start the second communication, the information processing device 100 determines that the transmission of the user information has been consented when a signal corresponding to the user operation to start the second communication had been detected.

When the transmission of the user information is determined not to have been consented in Step S106, for example, the information processing device 100 repeats the process from Step S104.

In addition, when the transmission of the user information is determined to have been consented in Step S106, the information processing device 100 transmits the user information using the second communication (S108). When the user information is transmitted in Step S108, the information processing device 100 acquires distribution information transmitted by the Station-N using the first communication (S110). Then, the information processing device 100 repeats the process from Step S100.

The information processing device 100 performs, for example, the process shown in FIG. 5 as the process of the information processing method. By performing the process shown in FIG. 5, for example, the information processing device 100 can acquire the distribution information n the first communication, using both the first communication and the second communication. Thus, by performing the process shown in FIG. 5, the information processing device 100 can, for example, enhance user convenience in acquisition of the distribution information.

Note that a process of the information processing method of the information processing device 100 is not limited to the process shown in FIG. 5.

The information processing device 100, for example, may notify the user that the Station-N has been detected and content indicated by the acquired distribution information. When the Station-N is determined to have been detected in Step S100, the information processing device 100 causes the display screen to display, for example, the screen shown in A of FIG. 3. In addition, when the information processing device 100 determines to have approached the Station-N in Step S102, the information processing device causes the display screen to display, for example, the screen shown in B of FIG. 3. Furthermore, when the distribution information is acquired in Step S110, the information processing device 100 causes the display screen to display, for example, the screen shown in C of FIG. 3.

[3-2] Process of Information Transmission Control Method of Information Transmission Control Device 200

Figure 6:
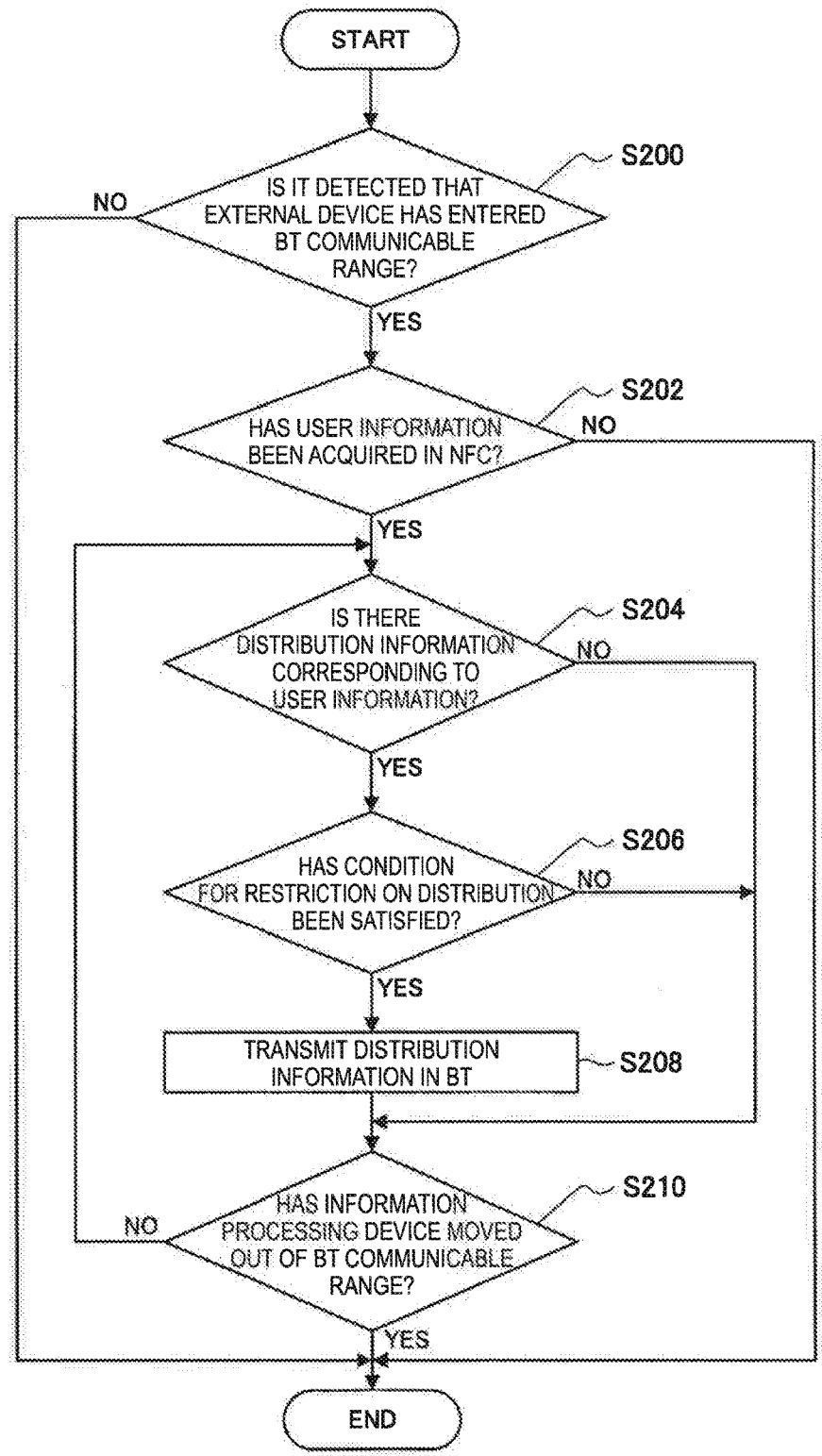
FIG. 6 is a flowchart showing an example of a process of an information transmission control method of an information transmission control device according to the present embodiment.

FIG. 6 is a flowchart showing an example of the process of the information transmission control method of the information transmission control device 200 according to the present embodiment. The information transmission control device 200, for example, repeats the process shown in FIG. 6 periodically or aperiodically. In FIG. 6, an example in which the first communication is "BT" and the second communication is "NFC" is shown.

The information transmission control device 200 determines whether or not an external device has been detected using the first communication (S200). When an address of the external device has been detected using the first communication, for example, the information transmission control device 200 determines that the external device has been detected.

When it is determined that no external device has been detected in Step S200, for example, the information transmission control device 200 ends the process of the information transmission control method.

In addition, when it is determined that an external device has been detected in Step S200, the information transmission control device 200 determines whether or not user information has been acquired in the second communication (S202).

Here, if the second communication is NFC and the information transmission control device 200 has a function of an initiator in NFC playing a role of a so-called reader/writer, the information transmission control device 200 may activate the second communication unit (to be described below) when the external device is determined to have been detected in Step S200 to start transmission of a magnetic field (carrier) of a predetermined frequency such as 13.56 [MHz]. As the information transmission control device 200 activates the second communication unit (to be described below) when the external device is determined to have been detected in Step S200 as described above, power consumption relating to the second communication can be reduced.

When it is determined that no user information has been acquired in Step S202, for example, the information transmission control device 200 ends the process of the information transmission control method.

In addition, when it is determined that user information has been acquired in Step S202, the information transmission control device 200 determines whether or not there is distribution information corresponding to the user information (S204).

When there is distribution information that is distribution information associated with the device itself (the information transmission control device 200) and is associated with user information corresponding to the acquired user information with reference to the distribution source information shown in FIG. 4, for example, the information transmission control device 200 determines that there is distribution information corresponding to the user information. Here, as the user information corresponding to the acquired user information in the distribution source information, for example, user information that coincides with the acquired user information, user information indicating no restriction on users, like "general" shown in I3 of FIG. 4, or the like is exemplified.

When it is determined that there is no distribution information corresponding to the user information in Step S204, the information transmission control device 200 performs the process of Step S210 to be described below.

In addition, when it is determined that there is distribution information corresponding to the user information in Step S204, the information transmission control device 200 determines whether or not the condition for restriction on distribution of the distribution information is satisfied (S206). As the condition for restriction on distribution according to the present embodiment, for example, a condition relating to the number of maximum times in which the distribution information can be transmitted, a condition relating to a period or a time in which the distribution information can be transmitted, or the like is exemplified.

The information transmission control device 200 makes the determination of Step S206 using, for example, information indicating the condition for restriction on distribution included in the distribution source information, such as "the number of issued permissions" shown in I4 of FIG. 4. When, for example, the distribution source information shown in FIG. 4 is referred to, a value indicated by "the number of issued permissions" included in the distribution source information is updated each time distribution information is distributed, and the number of issued permissions for the distribution information is equal to or higher than one, the information transmission control device 200 determines that the condition for restriction on distribution of the distribution information is satisfied.

When it is determined that the condition for restriction on distribution of the distribution information is not satisfied in Step S206, the information transmission control device 200 performs the process of Step S210 to be described below.

In addition, it is determined that the condition for restriction on distribution of the distribution information is not satisfied in Step S206, the information transmission control device 200 transmits the distribution information using the first communication (S208).

When it is determined that there is no distribution information corresponding to the user information in Step S204, that the condition for restriction on distribution of the distribution information is not satisfied in Step S206, or that the distribution information has been transmitted in Step S208, the information transmission control device 200 determines whether or not the information processing device 100 that had transmitted the user information using the second communication has moved out of the communicable range of the first communication (S210). When the address of the information processing device 100 that had transmitted the user information is not detected in the first communication, the information transmission control device 200 determines that the information processing device 100 that had transmitted the user information has moved out of the communicable range of the first communication.

When the information processing device 100 that had transmitted the user information is determined not to have moved out of the communicable range of the first communication in Step S210, the information transmission control device 200, for example, repeats the process from Step S204. When the information processing device 100 that had transmitted the user information is determined to have moved out of the communicable range of the first communication in Step S210, the information transmission control device 200, for example, ends the process of the information transmission control method.

As the process of the information transmission control method, the information transmission control device 200, for example, performs the process shown in FIG. 6. By performing the process shown in FIG. 6, for example, the information transmission control device 200 can use both the first communication and the second communication, and transmits the distribution information using the first communication when the user information is acquired in the second communication. Thus, as the information transmission control device 200 performs the process shown in FIG. 6, for example, the information processing system in which enhancement of user convenience in acquisition of the distribution information can be achieved is realized.

Note that the process of the information transmission control method of the information transmission control device 200 is not limited to the process shown in FIG. 6.

The information transmission control device 200, for example, may not perform the process of Step S200 shown in FIG. 6.

In addition, the information transmission control device 200 may record various histories. As histories recorded by the information transmission control device 200, for example, there are the following examples. Note that it is a matter of course that examples of histories recorded by the information transmission control device 200 are not limited to the following examples.

Identification information indicating a detected external device such as an address of the external device, a detected time, and the like recorded when the external device is determined to have been detected in Step S200.

Acquired user information, a time at which the user information is acquired, and the like recorded when the user information is determined to have been acquired in Step S202.

A time at which the information processing device 100 is detected in the first communication, a time at which the information processing device 100 is not detected in the first communication, the period in which the information processing device 100 is detected and then not detected in the first communication.

[4] Example of Other Process Relating to Information Processing System According to Present Embodiment Next, other processes relating to the information processing system 1000 according to the present embodiment will be described. As the other processes relating to the information processing system 1000, a process for distribution of distribution source information, a process for collection of user information acquired by the information transmission control device 200 from the information processing device 100, and a process for generation of the distribution source information will be described.

Figure 7:
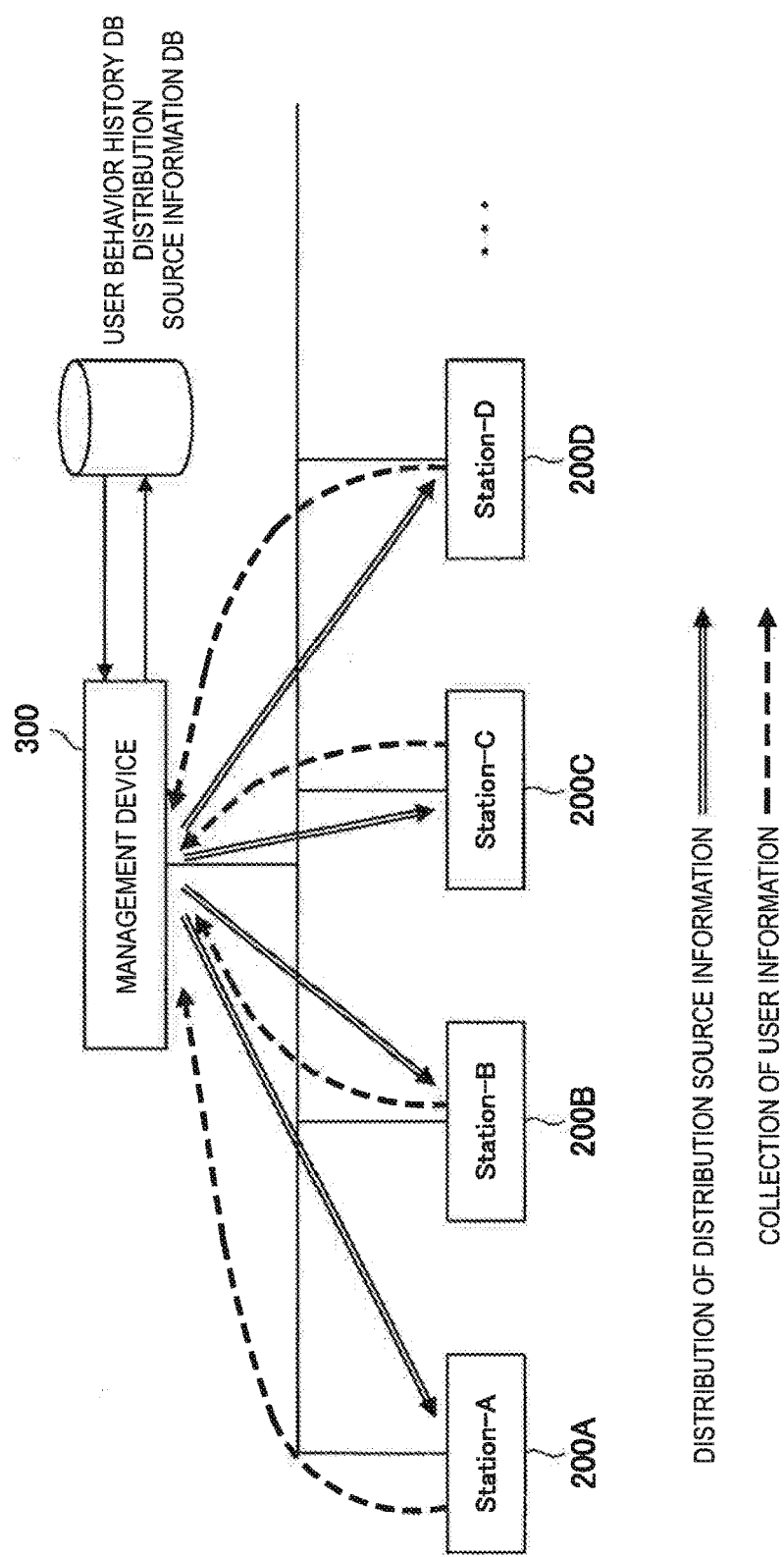
FIG. 7 is an illustrative diagram for describing a first example of another process relating to the information processing system according to the present embodiment.

[4-1] First Example of Other Processes Relating to Information Processing System According to the Present Embodiment FIG. 7 is an illustrative diagram for describing a first example of other processes relating to the information processing system according to the present embodiment. FIG. 7 shows a case in which the process for distribution of the distribution source information, the process for collection of user information, and the process for generation of the distribution source information are performed by a management device 300 connected to the plurality of information transmission control devices 200 via a network.

Here, as the network according to the present embodiment, for example, there are a wired network such as a LAN or a wide area network (WAN), a wireless network such as a wireless local area network (WLAN), a network using a communication protocol such as transmission Control Protocol/Internet Protocol (TCP/IP), or the like.

[4-1-1] Example of Process for Distribution of Distribution Source Information

The management device 300, for example, distributes distribution source information to each of the information transmission control devices 200 via the network. The management device 300 distributes the distribution source information as shown in, for example, FIG. 4, which is common for the plurality of information transmission control devices 200 to each of the information transmission control devices 200. In addition, the management device 300 may distribute, for example, distribution source information of an individual information transmission control device 200 corresponding to the information transmission control device 200 serving as a distribution source to distribute the distribution source information to each of the information transmission control devices 200.

Note that the management device 300 may be configured not to distribute the distribution source information to each of the information transmission control devices 200. When the management device 300 does not distribute the distribution source information to each of the information transmission control devices 200, the information transmission control devices 200 perform the process of the information transmission control method using, for example, distribution source information stored in the management device, or distribution source information stored in an external recording medium connected to the management device 300.

FIG. 8 is an illustrative diagram for describing the first example of the other processes relating to the information processing system according to the present embodiment, showing an example of the process for distribution of the distribution source information by the management device 300. FIG. 8 shows an example of the process performed when the management device 300 distributes distribution source information to each of the information transmission control devices 200 as the process for distribution of the distribution source information. In addition, in FIG. 8, the information transmission control devices 200 are denoted as "Stations."

The management device 300 sets distribution source information (S300). The setting of distribution source information by the management device 300 means, for example, setting distribution source information to be distributable, or setting distribution source information to be referred to by each of the information transmission control devices 200.

The management device 300 reads distribution source information from, for example, a distribution source information database (which may be referred to as a "distribution source DB") in which the distribution source information is stored. The management device 300 reads the distribution source information, for example, periodically or at a predetermined timing like when the distribution source information stored in the distribution source information database is updated. Then, the management device 300 sets the distribution source information by, for example, setting the read distribution source information to be distributable, or to be referred to by each of the information transmission control devices 200.

The management device 300 distributes distribution source information of individual information transmission control devices 200 to each of the information transmission control devices 200 (S302).

As the process for distribution of the distribution source information, for example, the management device 300 performs the process shown in FIG. 8. Note that it is a matter of course that a process for distribution of distribution source information by the management device 300 is not limited to the example shown in FIG. 8.

[4-1-2] Example of Process for Collection of User Information

The management device 300 acquires user information front each of the information transmission control devices 200 via the network.

The management device 300, for example, transmits a user information transmission request including a transmission command for transmitting user information to each of the information transmission control devices 200 periodically or aperiodically, and thereby actively acquires user information from each of the information transmission control devices 200. In addition, the management device 300 may, for example, receive user information transmitted periodically or aperiodically from each of the information transmission control devices 200, and thereby passively acquire the user information from each of the information transmission control devices 200.

Here, the user information acquired by the management device 300 from each of the information transmission control devices 200, for example, includes identification information indicating the information transmission control devices 200, or is associated with identification information indicating the information transmission control devices 200.

In addition, the user information acquired by the management device 300 from each of the information transmission control devices 200 may include, for example, information regarding a time at which the information transmission control devices 200 acquire the user information. Furthermore, the user information acquired by the management device 300 from each of the information transmission control devices 200, for example, may be associated with information regarding the time at which the information transmission control devices 200 acquire the user information.

In addition, the management device 300 can further acquire history information indicating a history recorded by the information transmission control devices 200.

FIG. 9 is an illustrative diagram for describing the first example of the other processes relating to the information processing system according to the present embodiment, showing an example for the process for collection of user information by the management device 300. In FIG. 9, the information transmission control devices 200 are denoted as "Stations."

The management device 300 acquires user information from each of the information transmission control devices 200 (S400). The management device 300, for example, transmits a user information transmission request to each of the information transmission control devices 200 periodically or non-periodically, and thereby acquires the user information from each of the information transmission control devices 200. In addition, the management device 300 may, for example, passively acquire the user information autonomously transmitted by each of the information transmission control devices 200.

The management device 300 arranges behavior histories of users for each of the users based on the user information acquired in Step S400, and records the arranged behavior histories of the users in, for example, a user behavior history database (which may be referred to as a "user behavior history DB") (S402).

FIG. 10 is an illustrative diagram for describing the first example of the other processes relating to the information processing system according to the present embodiment, showing an example of a behavior history of users arranged in the process for collection of user information by the management device 300.

The management device 300 arranges the behavior history of users by putting the information transmission control devices 200 from which the user information was acquired for each user in a time series order as shown in, for example, FIG. 10.

Note that an example of a behavior history of users arranged by the management device 300 is not limited to the example shown in FIG. 10. When, for example, the management device 300 acquires history information from each information transmission control device 200 on top of the user information, the management device 300 can arrange a behavior history of users including content of the history indicated by the history information according to a criterion such as a time series order.

As the process for collection of user information, the management device 300 performs, for example, the process shown in FIG. 9. Note that it is a matter of course that a process for collection of user information by the management device 300 is not limited to the example shown in FIG. 9.

[4-1-3] Process for Generation of Distribution Source Information

The management device 300 generates distribution source information based on, for example, the behavior history of users recorded in [4-1-2] above. Here, the generation of distribution source information according to the present embodiment includes, for example, new generation of distribution source information, and updating of the distribution source information.

Note that the distribution source information according to the present embodiment is not limited to being generated from the process for generation of distribution source information by the management device 300, and may be, for example, generated manually through a user operation by a user of the management device 300, or the like.

Figures 11, 12:
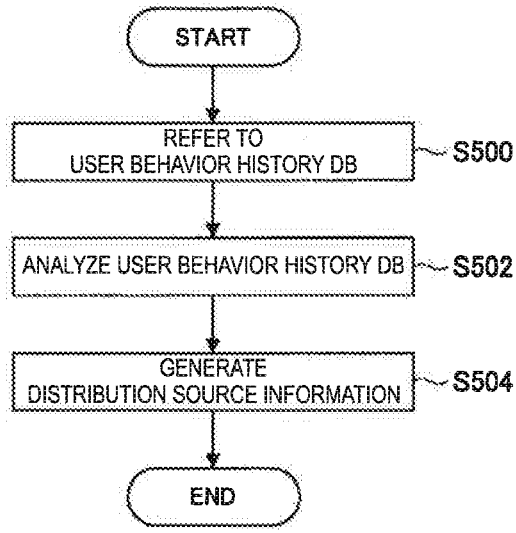
FIG. 11 is an illustrative diagram for describing a first example of another process relating to the information processing system according to the present embodiment.
FIG. 12 is an illustrative diagram for describing a first example of another process relating to the information processing system according to the present embodiment.

FIG. 11 is an illustrative diagram for describing the first example of the other processes relating to the information processing system according to the present embodiment, showing an example for the process for generation of distribution source information by the management device 300.

The management device 300 refers to the user behavior history database (S500), and analyzes a behavior history of users recorded in the user behavior history database (S502). Using any technology which can analyze the behavior history, the management device 300 analyzes the behavior history of the users.

The management device 300 generates distribution source information based on the analysis result of the behavior history of the users from Step S502 (S504). The generated distribution source information is used in, for example, the process for distribution of the distribution source information shown in FIG. 8.

FIG. 12 is an illustrative diagram for describing the first example of the other processes relating to the information processing system according to the present embodiment, showing an example of distribution source information updated through the process for generation of the distribution source information by the management device 300. I1 and I2 shown in FIG. 12 indicate examples of distribution information added through updating of the distribution source information and each piece of information associated with the distribution information.

When, for example, there is a user A who has a long retention time of the Station-A (an information transmission control device 200) as a result of analysis of the behavior history of the users in Step S502, the management device 300 adds distribution information, which is indicated by the distribution information associated with the Station-A of which a discount rate has changed from 10[%] to 20[%], to the distribution source information in association with the user A, as shown in I1 of FIG. 12.

In addition, when there is a user C who has a long retention time with respect to the Station-B (an information transmission control device 200) as a result of analysis of the behavior history of the users in Step S502, the management device 300 adds distribution information associated with the Station-B to the distribution source information in new association with the user C, as shown in I2 of FIG. 12. In addition, when there is a user C who has a long retention time with respect to the Station-B (an information transmission control device 200), the management device 300 may set, for example, the number of issued permissions greater than the number of issued permissions associated with the existing distribution information associated with the Station-B, as shown in I2 of FIG. 12.

The management device 300 generates, for example, the distribution source information based on the result of analysis of the behavior history of the users in Step S502 as shown in I1 and I2 of FIG. 12.

Note that a process for generation of the distribution source information based on the result of the analysis of the behavior history of the users by the management device 300 is not limited to the example shown above.

For example, the management device 300 can add distribution information having no restriction on users (for example, distribution information associated with user information indicating "general") to the distribution source information based on a behavior history of a plurality of users.

In addition, it is a matter of course that content of the distribution information such as a discount rate or content of the condition for restriction of distribution such as the number of issued permissions when the management device 300 updates the distribution source information are not limited to the example shown in FIG. 12.

Furthermore, although the example shown in FIG. 12 introduces that the distribution source information is updated by adding distribution information to the distribution source information, the distribution source information may be updated when its content are changed.

The management device 300 performs the process shown in FIG. 11, for example, as the process for generation of the distribution source information. Note that it is a matter of course that a process for generation of distribution source information by the management device 300 is not limited to the example shown in FIG. 11.

Figure 13:
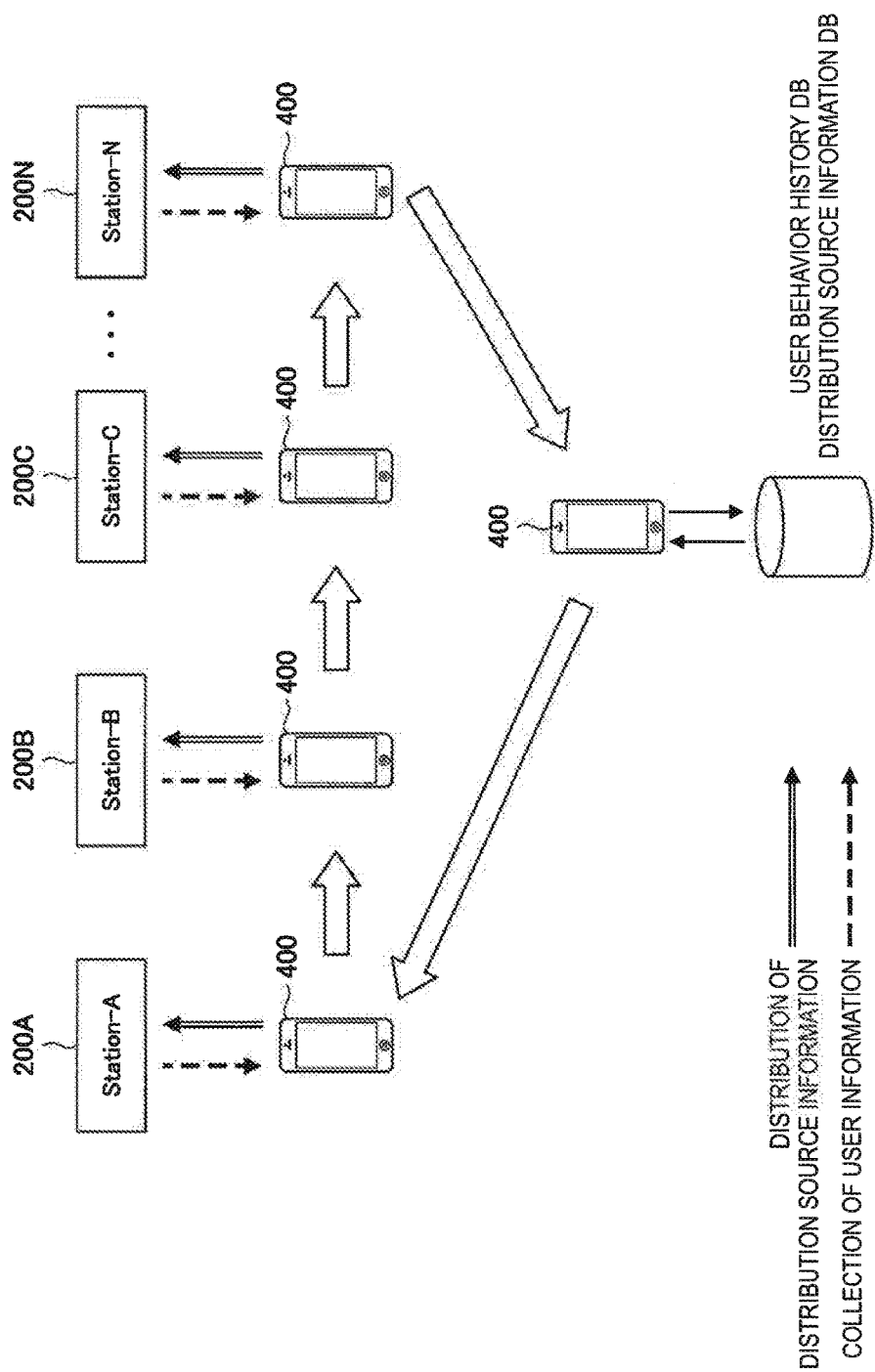
FIG. 13 is an illustrative diagram for describing a second example of the other process relating to the information processing system according to the present embodiment.

[4-2] Second Example of Other Processes Relating to Information Processing System According to Present Embodiment FIG. 13 is an illustrative diagram for describing a second example of the other processes relating to the information processing system according to the present embodiment. FIG. 13 shows a case in which management terminals 400 which perform communication with the plurality of information transmission control devices 200 one-to-one perform the process for distribution of distribution source information and the process for collection of user information.

When the management terminals 400 perform the process for distribution of distribution source information as shown in FIG. 13, the management terminals can distribute the distribution source information to each of the plurality of information transmission control devices 200 even though the respective information transmission control devices 200 are not connected to a network. In addition, when the management terminals 400 perform the process for collection of user information, the management terminals can acquire the user information from each of the plurality of information transmission control devices 200 even though the respective information transmission control devices 200 are not connected to the network.

[4-2-1] Example of Process for Distribution of Distribution Source Information

The management terminals 400, for example, communicate with an external device storing a distribution source information database, e.g., the management device 300, to acquire distribution source information from the external device. Here, the distribution source information is, for example, newly generated or updated through the above-described process of [4-1-3] (the process for generation of distribution source information) by an external device such as the management device 300. Note that the management terminals 400 can also perform the process of [4-1-3] (the process for generation of distribution source information).

In addition, the management terminals 400, for example, move along movement of users of the management terminals 400, and perform wireless or wired communication with the information transmission control devices 200 one-to-one at places at which the information transmission control devices 200 are installed. Then, the management terminals 400 distribute distribution source information to the communication-target information transmission control devices 200.

Figure 14:
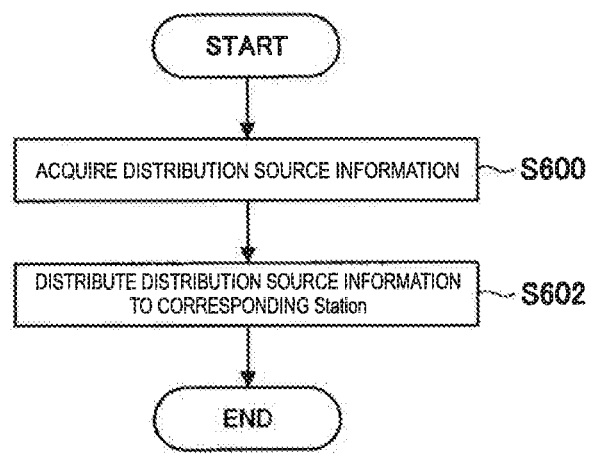
FIG. 14 is an illustrative diagram for describing a second example of the other process relating to the information processing system according to the present embodiment.

FIG. 14 is an illustrative diagram for describing the second example of the other process relating to the information processing system according to the present embodiment, showing an example of a process for distribution of distribution source information by a management terminal 400. As the process for distribution of distribution source information by the management terminal 400, FIG. 14 shows an example of a process performed when distribution source information is distributed to a communication-target information transmission control device 200. In FIG. 14, the information transmission control device 200 is denoted as "Station."

The management terminal 400 communicates with, for example, an external device storing the distribution source information database, and acquires distribution source information from the external device (S600). The management terminal 400 acquires the distribution source information by, for example, reading the distribution source information from the distribution source information database stored in the external device.

Upon starting communication with the information transmission control device 200, the management terminal 400 distributes the distribution source information to the communication-target information transmission control device 200 (S602). The management terminal 400 distributes the distribution source information as shown in, for example, FIG. 4, which is common for the plurality of information transmission control devices 200 to the communication-target information transmission control device 200. In addition, the management terminal 400, for example, may distribute the distribution source information of individual information transmission control devices 200 corresponding to the communication-target information transmission control device 200 to each of the information transmission control devices 200.

As the process for distribution of the distribution source information, the management terminal 400 performs, for example, the process shown in FIG. 14. Note that it is a matter of course that a process for distribution of distribution source information by the management terminal 400 is not limited to the example shown in FIG. 14.

[4-2-2] Example of Process for Collection of User Information

The management terminals 400, for example, move along movement of users of the management terminals 400, and perform wireless or wired communication with the information transmission control devices 200 one-to-one at places at which the information transmission control devices 200 are installed. Then, the respective management terminals 400 acquire user information from the communication-target information transmission control devices 200. The management terminals 400 may perform the acquisition of the user information from the communication-target information transmission control devices 200 in parallel with the distribution of the distribution source information to the communication-target information transmission control devices 200 shown in [4-2-1] above, or before or after the distribution of the distribution source information.

The management terminals 400, for example, transmit a user information transmission request to the communication-target information transmission control devices 200, and thereby actively acquire user information from the communication-target information transmission control devices 200. In addition, the management terminals 400 may, for example, passively acquire the user information from the communication-target information transmission control devices 200 by receiving the user information autonomously transmitted by the communication-target information transmission control devices 200.

The management terminals 400 acquire, for example, user information, which is similar to user information acquired by the management device 300 from the information transmission control devices 200, from the communication-target information transmission control devices 200.

Figure 15:
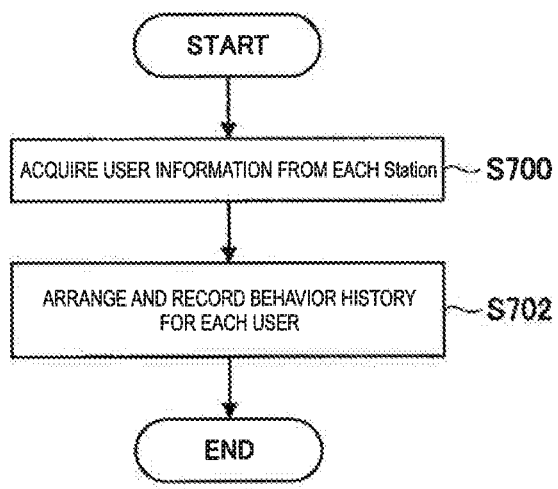
FIG. 15 is an illustrative diagram for describing a second example of the other process relating to the information processing system according to the present embodiment.

FIG. 15 is an illustrative diagram for describing the second example of the other processes relating to the information processing system according to the present embodiment, showing an example of the process for collection of user information by the management terminals 400. In FIG. 15, the information transmission control devices 200 are denoted as "Station."

The management terminals 400 acquire each piece of user information from the respective communication-target information transmission control devices 200 (S700). The management terminals 400 acquire the user information from the communication-target information transmission control devices 200 by, for example, transmitting a user information transmission request to the communication-target information transmission control devices 200. In addition, the management terminals 400 may, for example, acquire the user information from the communication-target information transmission control devices 200 by receiving the user information autonomously transmitted by the communication-target information transmission control devices 200.

The management terminals 400, for example, arrange behavior histories of users for each of the users based on the user information acquired in Step S700, and records the arranged behavior histories of the users in, for example, the user behavior history database, as in Step S402 of FIG. 9 of the management device 300.

As the process for collection of user information, for example, the management terminals 400 perform the process shown in FIG. 15. Note that it is a matter of course that a process for collection of user information by the management terminals 400 is not limited to the example shown in FIG. 15.

[4-3] Third Example of Other Processes Relating to Information Processing System According to the Present Embodiment The process for distribution of distribution source information and the process for collection of user information may be, for example, a process in which the processes in the first example described in [4-1] above and the processes in the second example described in [4-2] above are combined.

[4-4] Summary of Other Processes Relating to Information Processing System According to Present Embodiment As the other processes relating to the information processing system 1000 according to the present embodiment, for example, the process for distribution of distribution source information, the process for collection of user information acquired by the information transmission control device 200 from the information processing device 100, and the process for generation of distribution source information described above are exemplified.

When the process for distribution of distribution source information according to the present embodiment is performed, the distribution of the distribution source information to the plurality of information transmission control devices 200 can be performed via the network as shown in the first example, or can be performed through one-to-one communication with the management terminals 400 as described in the second example.

In addition, the distribution source information is newly generated or updated through, for example, the process for generation of distribution source information according to the present embodiment performed by the management device 300 or the like. Specifically, the distribution source information is newly generated or updated using, for example, a result of analysis of behavior histories of users based on user information or the like collected from each of the information transmission control devices 200. In addition, the distribution source information may be newly generated or updated through, for example, an operation of a user of the management device 300, or the like.

Thus, when the process for distribution of distribution source information according to the present embodiment is performed, the distribution source information appropriately generated or updated based on user information or the like can be distributed to the information transmission control devices 200, regardless of an installation environment of the information transmission control devices 200 (for example, a network connection environment, or the like).

In addition, when the process for collection of user information according to the present embodiment is performed, a behavior history of a user can be ascertained using user information acquired by the information transmission control device 200 from the information processing device 100 using both the first communication and the second communication, rather than position information (data) indicating a position based on a Global Positioning System (GPS) or the like. Thus, when the process for collection of user information according to the present embodiment is performed, for example, the following advantages are gained.

A behavior history of a user can be ascertained even inside a building in which it is not possible to specify a position using GPS (for example, inside a shopping center, or the like).

It is easy to associate an installation position of the information transmission control device 200 with a behavior history of a user inside a building.

Information Processing Device and Information Transmission Control Device According to Present Embodiment Next, configurations of the information processing device 100 and the information transmission control device 200 according to the present embodiment which can realize the process for distribution of distribution information in the information processing system 1000 will be described.

[I] Information Processing Device 100

Figure 16:
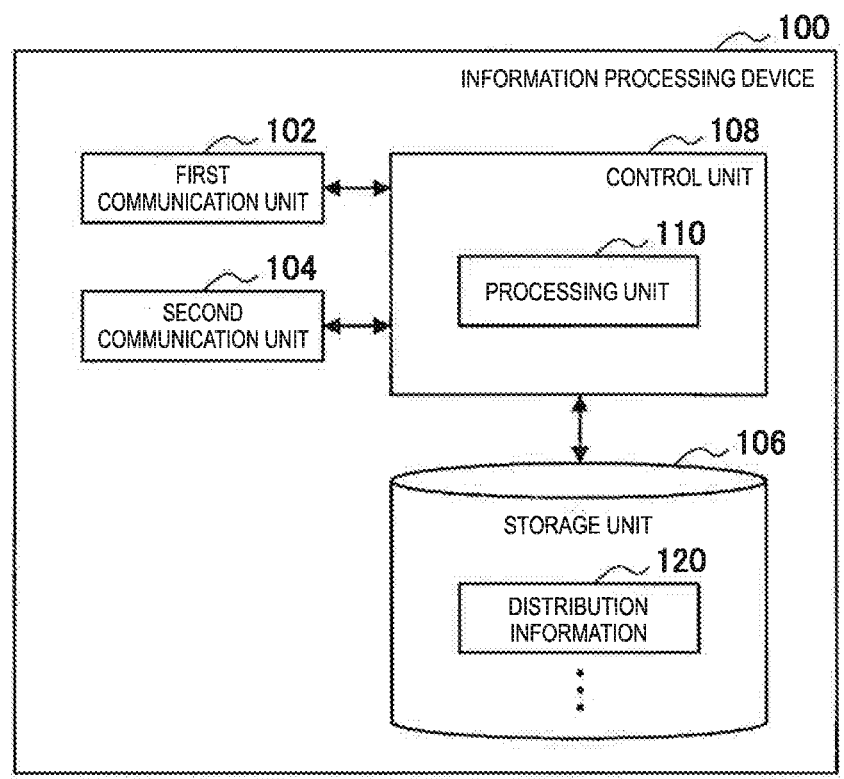
FIG. 16 is a block diagram showing an example of a configuration of an information processing device according to the present embodiment.

FIG. 16 is a block diagram showing an example of the configuration of the information processing device 100 according to the present embodiment. The information processing device 100 has, for example, a first communication unit 102, a second communication unit 104, a storage unit 106, and a control unit 108.

In addition, the information processing device 100 may have, for example, a read only memory (ROM, which is not shown), a random access memory (RAM, which is not shown), an operation unit (not shown) which can be operated by a user, a display unit (not shown) that displays various screens such as a screen indicating content notified of by the information processing device 100 as shown in FIG. 3 on a display screen, or the like. The information processing device 100 connects the respective constituent elements with each other using, for example, a bus serving as a data transmission path.

The ROM (not shown) stores data for control, such as programs and operation parameters to be used by the control unit 108. The RAM (not shown) temporarily stores a program executed by the control unit 108 or the like.

As the operation unit (not shown), an operation input device which will be described below may be exemplified. As the display unit (not shown), a display device which will be described below may be exemplified.

Example of Hardware Configuration of Information Processing Device 100

Figure 17:
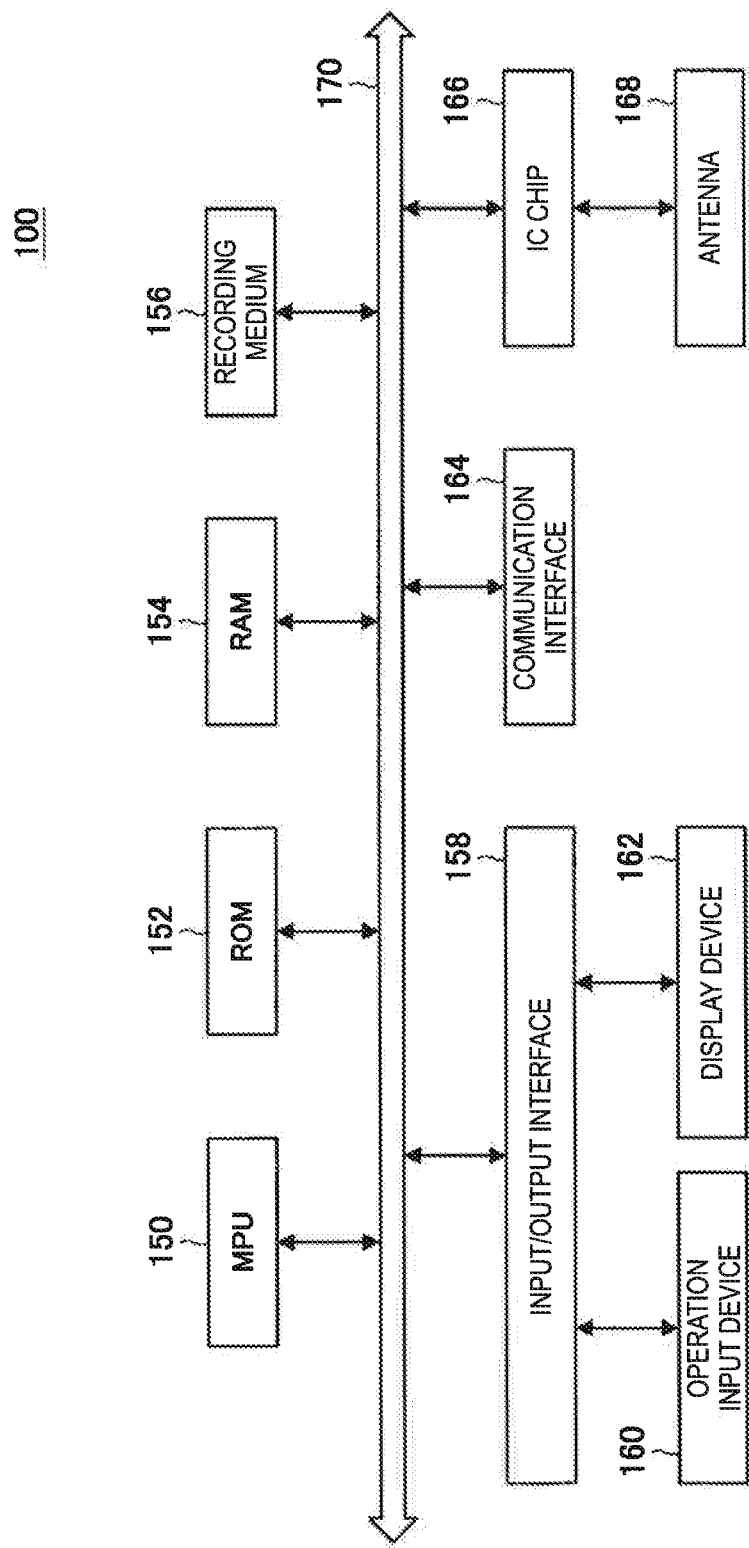
FIG. 17 is an illustrative diagram showing an example of a hardware configuration of the information processing device according to the present embodiment.

FIG. 17 is an illustrative diagram showing an example of a hardware configuration of the information processing device 100 according to the present embodiment. FIG. 17 shows the example of the hardware configuration of the information processing device 100 when the second communication is NFC.

The information processing device 100 includes, for example, an MPU 150, a ROM 152, a RAM 154, a recording medium 156, an input/output interface 158, an operation input device 160, a display device 162, a communication interface 164, an IC chip 166 and an antenna 168. In addition, the information processing device 100 connects the components, for example, by means of a bus 170 as a data transmission path.

The MPU 150 is composed of one or more processors configured as operation circuits such as a micro-processing unit (MPU) and various processing circuits and functions as the control unit 108 that controls the information processing device 100. In addition, the MPU 150 serves as, for example, a processing unit 110 which will be described below, in the information processing device 100.

The ROM 152 stores data for control, such as programs and operation parameters to be used by the MPU 150, and the like. The RAM 154 temporarily stores, for example, a program or the like executed by the MPU 150.

The recording medium 156 functions as the storage unit 106 and stores, for example, information relating to the information processing method according to the present embodiment, such as distribution information, and data such as various applications. Here, as the recording medium 156, for example, a magnetic recording medium such as a hard disk or a non-volatile memory such as a flash memory may be exemplified. Furthermore, the recording medium 156 may be attachable to/detachable from the information processing device 100.

The input/output interface 158 is connected, for example, to the operation input device 160 and the display device 162. The operation input device 160 serves as the operation unit (not shown) and the display device 162 serves as the display unit (not shown). Here, as the input/output interface 158, for example, a Universal Serial Bus (USB) port, a digital visual interface (DVI) terminal, a high-definition multimedia interface (HDMI) (registered trademark) terminal, various processing circuits or the like may be exemplified.

In addition, the operation input device 160 is, for example, included in the information processing device 100 and connected to the input/output interface 158 inside the information processing device 100. As the operation input device 160, for example, a button, arrow keys, a rotary type selector such as a jog dial or a combination thereof may be exemplified.

Furthermore, the display device 162 is, for example, included in the information processing device 100 and connected to the input/output interface 158 inside the information processing device 100. As the display device 162, for example, a liquid crystal display, an organic electro-luminescence display (which is also referred to as an organic light emitting diode (OLED) display) or the like may be exemplified.

Of course, the input/output interface 158 may be connected to an external device such as an external operation input device (e.g., a keyboard, a mouse, etc.) and an external display device as external devices of the information processing device 100. Furthermore, the display device 162 may be, for example, a device that enables display and a user operation, such as a touch screen.

The communication interface 164 is a communication means which the information processing device 100 has to perform communication based on the first communication, and functions as the first communication unit 102. The communication interface 164 communicates with, for example, the information transmission control device 200, the management device 300, the management terminal 400, or the like via a network (or directly).

Here, as the communication interface 164, for example, an IEEE 802.15.1 port and a transmission/reception circuit, an IEEE 802.11 port and a transmission/reception circuit, or the like are exemplified.

The IC chip 166 and the antenna 168 are communication means that the information processing device 100 has to perform communication based on the second communication. The IC chip 166 and the antenna 168 perform communication with a reader-writer or an external device having a reader-writer function based on NFC using, for example, a carrier of a predetermined frequency, such as 13.56 [MHz]. The antenna 168 plays a role of receiving carriers and transmitting response signals. In addition, the IC chip 166 demodulates and processes carrier signals transmitted from an external device such as a reader-writer based on received carriers, and causes response signals to be transmitted using load modulation.

Figure 18:
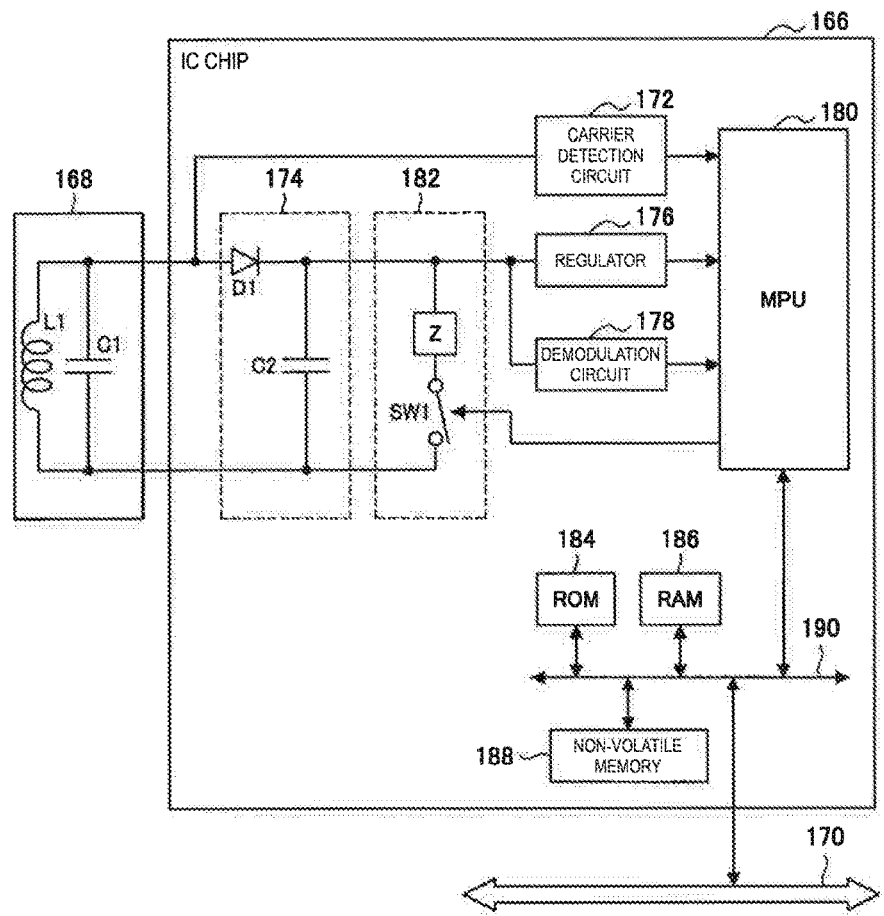
FIG. 18 is an illustrative diagram showing an example of a configuration of an IC chip and an antenna shown in FIG. 17.

FIG. 18 is an illustrative diagram showing an example of a configuration of the IC chip 166 and the antenna 168 shown in FIG. 17. Note that the information processing device 100 may not have the configuration of the IC chip 166 shown in FIG. 18 in, for example, a form of an IC chip.

The antenna 168 is configured as, for example, a resonance circuit constituted by a coil L1 having a predetermined inductance (an inductor) and a capacitor C1 having a predetermined electrostatic capacitance, and generates an induced voltage through electromagnetic induction according to reception of carriers. Then, the antenna 168 outputs a reception voltage obtained by causing the induced voltage to resonate at a predetermined resonance frequency. Here, the resonance frequency of the antenna 168 is set according to a frequency of a carrier, for example, 13.56 [MHz]. The antenna 168 receives carriers using the above-described configuration, and performs transmission of response signals using load modulation performed by a load modulation circuit 182 that the IC chip 166 has.

The IC chip 166 has a carrier detection circuit 172, a detector circuit 174, a regulator 176, a demodulation circuit 178, an MPU180, and a load modulation circuit 182. Note that, although not shown in FIG. 18, the IC chip 166 may further have, for example, a protection circuit (not shown) which prevents overvoltage or overcurrent to be applied to the MPU 180. Here, as the protection circuit (not shown), for example, a clamper configured with a diode or the like is exemplified.

In addition, the IC chip 166 has, for example, a ROM 184, a RAM 186, and a non-volatile memory 188. The MPU180, the ROM 184, the RAM 186, and the non-volatile memory 188 are connected to each other by, for example, a bus 190 serving as a data transmission path. Furthermore, the bus 190 is connected to the bus 170.

Then ROM 184 stores programs to be used by the MPU180 and control data such as operation parameters. The RAM 186 temporarily stores programs executed by the MPU180, results of arithmetic operations, states of execution, and the like.

The non-volatile memory 188 stores a variety of data, for example, user information, electronic values (money or data having values equivalent to money, which can be referred to as "electronic money" below), and various applications. The electronic values stored in the non-volatile memory 188 correspond to "stored values." Here, as the non-volatile memory 188, for example, an electrically erasable and programmable read only memory (EEPROM), a flash memory, or the like is exemplified. In addition, the non-volatile memory 188 may have, for example, temper resistance.

The carrier detection circuit 172 generates, for example, a rectangular detection signal based on a reception voltage delivered from the antenna 168, and delivers the detection signal to the MPU180. In addition, the MPU 180 uses the delivered detection signal as, for example, a processing clock for data processing. Here, since the detection signal is based on the reception voltage delivered from the antenna 168, it is synchronized with the frequency of a carrier transmitted from an external device such as a reader/writer. Thus, with the carrier detection circuit 172 provided, the IC chip 166 can perform a process with an external device such as a reader/writer in synchronization with the external device.

The detector circuit 174 commutates the reception voltage output from the antenna 168. Here, the detector circuit 174 is constituted by, for example, a diode D1 and a capacitor C2, The regulator 176 smoothly turns the reception voltage into a constant voltage to output a drive voltage to the MPU 180. Here, the regulator 176 uses DC components of the reception voltage as the drive voltage.

The demodulation circuit 178 demodulates a carrier signal based on the reception voltage, and outputs data corresponding to the carrier signal included in the carrier (for example, a data signal binarized to a high level and a low level). Here, the demodulation circuit 178 outputs AC components of the reception voltage as data.

The MPU 180 is driven using the drive voltage output from the regulator 176 as a power source, and performs processes of the data demodulated by the demodulation circuit 178. Here, the MPU 180 is constituted by, for example, one or two or more processors configured as an operation circuit such as an MPU, various processing circuits, and the like.

In addition, the MPU 180 selectively generates a control signal for controlling load modulation relating to a response to an external device such as a reader/writer according to a process result. Then, the MPU 180 selectively outputs the control signal to the load modulation circuit 182.

The load modulation circuit 182 is provided with, for example, a load Z and a switch SW1, and performs load modulation by selectively connecting (activating) the load Z according to a control signal delivered from the MPU 180. Here, the load Z is configured with, for example, a resistance having a predetermined resistance value. In addition, the switch SW1 is configured with, for example, a p-channel metal oxide semiconductor field effect transistor (MOSFET), or an n-channel MOSFET.

With the configuration described above, the IC chip 166 can process the carrier signal received by the antenna 168, and cause the antenna 168 to transmit a response signal using load modulation.

Since the IC chip 166 and the antenna 168 have the configuration shown in FIG. 18, for example, they perform communication with an external device such as a reader/writer based on NFC using a carrier having a predetermined frequency. Note that it is a matter of course that a configuration of the IC chip 166 and the antenna 168 according to the present embodiment is not limited to the example shown in FIG. 18.

With the configuration shown in FIG. 17, for example, the information processing device 100 performs the process of the information processing method according to the present embodiment described above. Note that a hardware configuration of the information processing device 100 according to the present embodiment is not limited to the configuration shown in FIG. 17.

The information processing device 100 may not be provided with the communication interface 164 when the first communication is performed with an external device via a connected external communication device that can communicate based on the first communication.

In addition, the information processing device 100 may be further provided with, for example, a carrier transmission circuit electrically connected with the antenna 168, and may have a reader/writer function for NFC. An example of a configuration of the carrier transmission circuit will be described below.

Further, when the second communication is not NFC, the information processing device 100 may not be provided with the IC chip 166 and the antenna 168. In addition, when the second communication is not NFC, the information processing device 100 may be further provided with a second communication-enabled communication device such as an infrared communication device.

In addition, when the information processing device 100 performs the second communication with an external device via a connected external communication device that can communicate based on the second communication, the information processing device may not be provided with a second communication-enabled communication device such as the IC chip 166 and the antenna 168.

Further, the information processing device 100 may be further provided with other communication devices, for example, a communication antenna such as an antenna for LTE/3G and a radio frequency (RF) circuit, or the like. In addition, the information processing device 100 may be further provided with sensors, for example, a GPS sensor and an acceleration sensor.

In addition, the information processing device 100 may not be provided with one or two or more elements among, for example, the recording medium 156, the operation input device 160, and the display device 162. Note that, when an external display device is connected to the information processing device 100, for example, the information processing device 100 can cause the external display device to display a screen indicating content notified of by the information processing device 100 as shown in FIG. 3, regardless of whether the display device 162 is provided.

Further, the information processing device 100 may be further provided with, for example, an audio output device that outputs sounds (including music). As the audio output device according to the present embodiment, for example, a speaker is exemplified. In addition, the audio output device according to the present embodiment may further have a digital signal processor (DSP) that processes audio signals, an amplifier that amplifies audio signals, and the like.

When the audio output device is provided, the information processing device 100 causes, for example, a sound (including music) indicating detection of the information transmission control device 200 or the content indicated by acquired distribution information to be output from the audio output device. That is, when the information processing device 100 is provided with an audio output device, the audio output device plays a role of, for example, an audio output unit (not shown) that outputs sounds (including music) indicating the content notified of by the information processing device 100. Note that, when an external audio output device is connected to the information processing device 100, for example, the information processing device can also cause the external audio output device to output a sound (including music) indicating the content notified of by the information processing device 100, regardless of whether an audio output device is provided.

In addition, the configuration shown in FIG. 17 (or a configuration according to a modified example thereof) may be realized with, for example, one or two or more integrated circuits (ICs).

The example of the configuration of the information processing device 100 will be described with reference to FIG. 16 again. The first communication unit 102 communicates with external devices using the first communication. The first communication of the first communication unit 102 is controlled by, for example, the control unit 108 (more specifically, for example, the processing unit 110).

Here, as the first communication unit 102, for example, an IEEE 802.15.1 port and a transmission/reception circuit, an IEEE 802.11 port and a transmission/reception circuit, or the like are exemplified.

The second communication unit 104 communicates with external devices using the second communication. The second communication of the second communication unit 104 is controlled by, for example, the control unit 108 (more specifically, for example, the processing unit 110).

Here, as the second communication unit 104, for example, NFC-enabled communication devices such as the IC chip 166 and the antenna 168 shown in FIG. 17, infrared communication devices, and the like are exemplified.

The storage unit 106 is a storage means provided in the information processing device 100 that stores, for example, information relating to the information processing method according to the present embodiment such as distribution information, and various kinds of data such as various applications. FIG. 16 shows an example in which distribution information 120, . . . are stored in the storage unit 106.

Here, as the storage unit 106, for example, a magnetic recording medium such as a hard disk and a non-volatile memory such as a flash memory may be exemplified. Furthermore, the storage unit 106 may be attachable to/detachable from the information processing device 100.

The control unit 108 is configured with an MPU, for example, and plays a role of controlling the information processing device 100 overall. In addition, the control unit 108 is provided with, for example, the processing unit 110, and plays a leading role of performing the process of the information processing method according to the present embodiment.

The processing unit 110 plays a leading role of performing the process of the information processing method according to the present embodiment, and acquires distribution information in the first communication, using both the first communication and the second communication.

When the information transmission control device 200 is detected based on a signal transmitted from the information transmission control device 200 in the first communication, the processing unit 110 causes user information to be transmitted to the information transmission control device 200 in the second communication.

The processing unit 110 determines whether or not the information transmission control device 200 has been detected based on, for example, a signal delivered from the first communication unit 102. Then, when the information transmission control device 200 is determined to have been detected, the processing unit 110 delivers, for example, a transmission command for transmitting user information to the second communication unit 104, and thereby the second communication unit 104 transmits the user information.

Here, when the information transmission control device 200 is detected in the first communication, the processing unit 110 may notify a user that the information transmission control device 200 is detected as shown in, for example, A of FIG. 3. In addition, the processing unit 110 may change content that the user is to be notified of according to a state of detection of the information transmission control device 200 in the first communication as shown in, for example, B of FIG. 3.

In addition, when the information transmission control device is detected, the processing unit 110 may cause the user information to be transmitted in the second communication based on a user operation to start the second communication, for example, a touch operation, or the like.

When the user information is transmitted, the processing unit 110 acquires distribution information transmitted from the information transmission control device 200 that has acquired the user information in the first communication. The processing unit 110 acquires the distribution information when, for example, the distribution information received by the first communication unit 102 is delivered from the first communication unit 102.

Here, when the distribution information is acquired using the first communication, the processing unit 110 may notify the user of content indicated by the distribution information as shown in, for example, C of FIG. 3.

With the processing unit 110 provided, for example, the control unit 108 actively performs the process of the information processing method according to the present embodiment.

With the configuration shown in FIG. 16, for example, the information processing device 100 performs the process of the information processing method according to the present embodiment, and acquires the distribution information in the first communication, using both the first communication and the second communication.

Thus, with the configuration shown in FIG. 16, for example, the information processing device 100 can achieve enhancement of user convenience in acquisition of the distribution information.

In addition, with the configuration shown in FIG. 16, for example, the information processing device 100 can exhibit effects obtained by performing, for example, the process of the information processing method according to the present embodiment as described above.

Note that a configuration of the information processing device according to the present embodiment is not limited to the configuration shown in FIG. 16.

For example, the information processing device according to the present embodiment can be provided with the processing unit 110 separately from the control unit 108 (for example, realized with a different processing circuit). In addition, the information processing device according to the present embodiment may be configured such that processes performed by the processing unit 110 are performed in a plurality of processing circuits.

In addition, when the first communication is performed with an external device via a connected external communication device that can communicate based on the first communication, for example, the information processing device according to the present embodiment may not be provided with the first communication unit 102.

Further, when the second communication is performed with an external device via a connected external communication device that can communicate based on the second communication, for example, the information processing device according to the present embodiment may not be provided with the second communication unit 104.

In addition, the information processing device according to the present embodiment can also have a configuration in which the storage unit 106 is not provided.

Further, the information processing device according to the present embodiment may be further provided with, for example, either the display unit (not shown) that displays content notified of by the information processing device according to the present embodiment (more specifically, for example, the processing unit 110) on the display screen or the audio output unit (not shown) that outputs sounds (including music) indicating the content notified of, or both.

[II] Information Transmission Control Device 200

Figure 19:
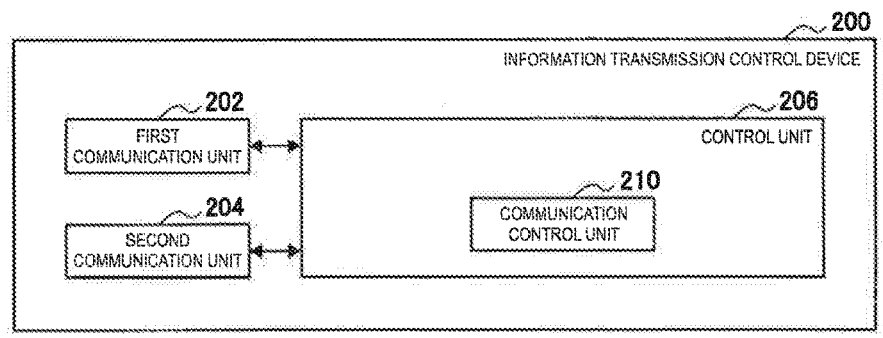
FIG. 19 is a block diagram showing an example of a configuration of the information transmission control device according to the present embodiment.

FIG. 19 is a block diagram showing an example of a configuration of the information transmission control device 200 according to the present embodiment. The information transmission control device 200 is provided with, for example, a first communication unit 202, a second communication unit 204, and a control unit 206.

In addition, the information transmission control device 200 may be provided with, for example, a ROM (not shown), a RAM (not shown), a storage unit (not shown), an operation unit (not shown) which can be operated by a user, a display unit (not shown) which displays various screens on a display screen, or the like. The information transmission control device 200 connects the respective constituent elements with each other using, for example, a bus serving as a data transmission path.

The ROM (not shown) stores control data, such as programs and operation parameters used by the control unit 206. The RAM (not shown) temporarily stores a program executed by the control unit 206, and the like.

The storage unit (not shown) is a storage means provided in the information transmission control device 200, and stores various types of data, for example, data relating to the information transmission control method according to the present embodiment such as distribution source information, user information, and various applications. Here, as the storage unit (not shown), for example, a magnetic recording medium such as a hard disk, a non-volatile memory such as a flash memory, or the like is exemplified. In addition, the storage unit (not shown) may be attachable to/detachable from the information transmission control device 200.

As the operation unit (not shown), an operation input device which will be described below is exemplified. In addition, as the display unit (not shown), a display device which will be described below is exemplified.

Example of Hardware Configuration of Information Transmission Control Device 200

Figure 20:
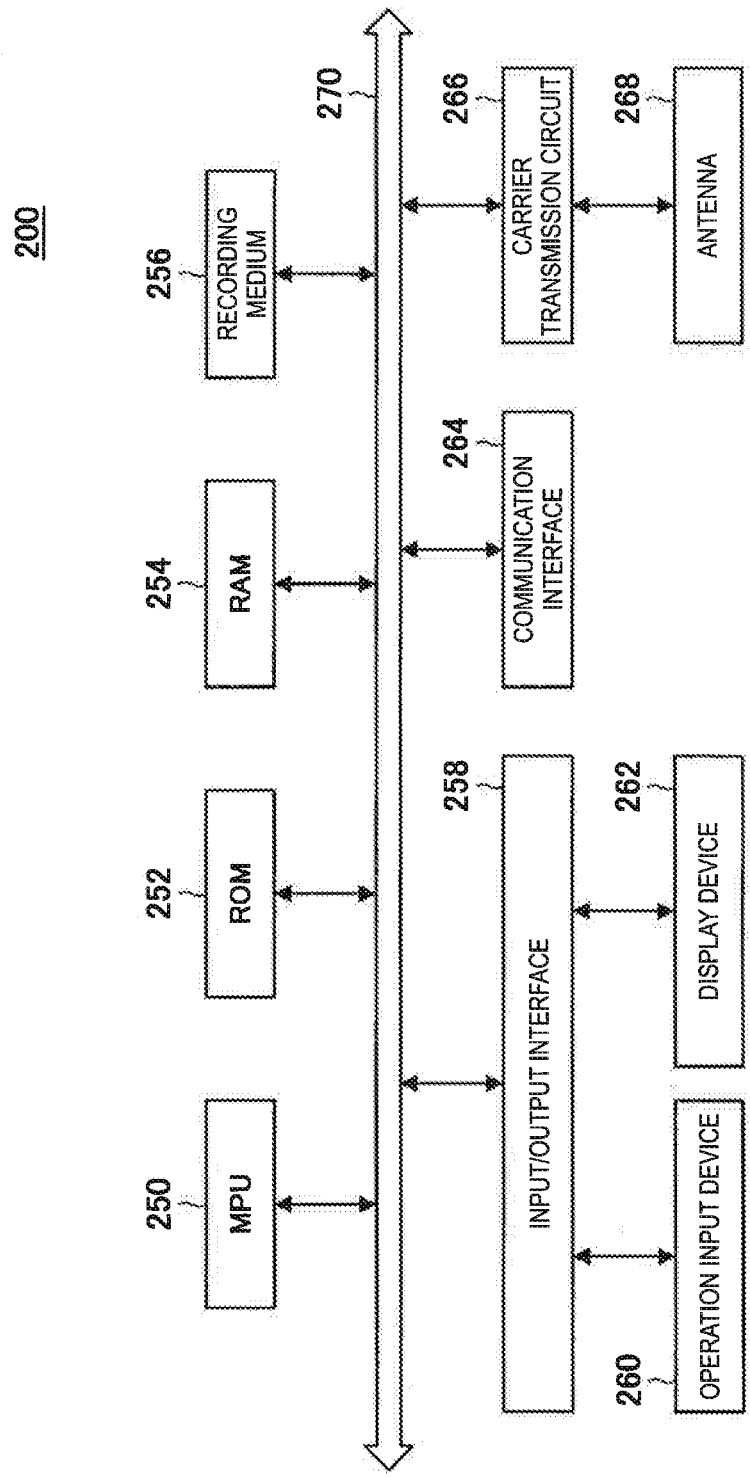
FIG. 20 is an illustrative diagram showing an example of a hardware configuration of the information transmission control device according to the present embodiment.

FIG. 20 is an illustrative diagram showing an example of a hardware configuration of the information transmission control device 200 according to the present embodiment. FIG. 20 shows the example of the hardware configuration of the information transmission control device 200 when the second communication is NFC.

The information transmission control device 200 includes, for example, an MPU 250, a ROM 252, a RAM 254, a recording medium 256, an input/output interface 258, an operation input device 260, a display device 262, a communication interface 264, a carrier transmission circuit 266, and an antenna 268. In addition, the information transmission control device 200 connects the respective constituent elements with each other using, for example, a bus 270 serving as a data transmission path.

The MPU 250 is constituted by, for example, one or two or more processors configured as an operation circuit such as an MPU, various processing circuits, and the like, and functions as the control unit 206 that controls the information transmission control device 200 overall. In addition, the MPU 250 serves as, for example, a communication control unit 210 to be described below in the information transmission control device 200.

The ROM 252 stores control data such as programs and operation parameters used by the MPU 250, and the like. The RAM 254 temporarily stores, for example, programs executed by the MPU 250, and the like.

The recording medium 256 functions as the storage unit (not shown) and stores, for example, various kinds of data such as various applications. Here, as the recording medium 256, for example, a magnetic recording medium such as a hard disk and a non-volatile memory such as a flash memory are exemplified. Furthermore, the recording medium 256 may be attachable to/detachable from the information transmission control device 200.

The input/output interface 258 connects, for example, the operation input device 260 or the display device 262. The operation input device 260 serves as the operation unit (not shown) and the display device 262 serves as the display unit (not shown). Here, as the input/output interface 258, for example, a USB port, a DVI terminal, an HDM1 (a registered trademark) terminal, various processing circuits or the like may be exemplified.

In addition, the operation input device 260 is, for example, provided on the information transmission control device 200 and connected with the input/output interface 258 in the inside of the information transmission control device 200. As the operation input device 260, for example, buttons, arrow keys, a rotation-type selector such as a jog dial, a combination thereof; or the like is exemplified.

Furthermore, the display device 262 is, for example, provided on the information transmission control device 200, and connected with the input/output interface 258 in the inside of the information transmission control device 200. As the display device 262, for example, a liquid crystal display, an organic EL display or the like is exemplified.

Note that it is a matter of course that the input/output interface 258 can be connected to an external device such as an external operation input device (e.g., a keyboard, a mouse, etc.) and an external display device as external devices of the information transmission control device 200. Furthermore, the display device 262 may be a device on which display and user operations are possible, for example, a touch screen, or the like.

The communication interface 264 is a communication means provided in the information transmission control device 200 to perform communication based on the first communication, and functions as the first communication unit 202. Here, as the communication interface 264, for example, an IEEE 802.15.1 port and a transmission/reception circuit, an IEEE 802.11 port and a transmission/reception circuit, or the like are exemplified. In addition, the communication interface 264 is a device, for example, compatible with the communication interface 164 provided in the information processing device 100 in terms of a communication scheme.

The carrier transmission circuit 266 and the antenna 268 are communication means provided in the information transmission control device 200 to perform communication based on the second communication, functioning as the second communication unit 204. The carrier transmission circuit 266 and the antenna 268 function as a reader/writer in NFC.

The antenna 268 is configured with, for example, a resonance circuit constituted by a coil having predetermined inductance that serves as a transmission/reception antenna and a capacitor having predetermined electrostatic capacitance, and a demodulation circuit. In addition, when a carrier with a frequency of 13.56 [MHz] is received, for example, the antenna 268 demodulates data that has been transmitted from an external device such as the information processing device 100 using load modulation, or the like. Note that, when the carrier transmission circuit 266 is provided with a demodulation circuit, for example, the antenna 268 may be constituted by a resonance circuit.

The carrier transmission circuit 266 is provided with, for example, a modulation circuit that performs modulation, such as Amplitude Shift Keying (ASK), and an amplification circuit that amplifies output of the modulation circuit, and causes carriers carrying carrier signals from a transmission/reception antenna of the antenna 268 thereon to be transmitted. In addition, the carrier transmission circuit 266 may be provided with, for example, a demodulation circuit that demodulates signals received by the antenna 268. The demodulation circuit detects envelope curves of amplitude variation of a voltage occurring between, for example, the modulation circuit (or the amplification circuit) and the resonance circuit of the antenna 268, binarizes detected signals, and thereby demodulates the signal received by the antenna 268. Note that the demodulation circuit can also demodulate the signal received by the antenna 268 using, for example, phase variation of a voltage occurring between the modulation circuit (or the amplification circuit) and the resonance circuit of the antenna 268.

Since the carrier transmission circuit 266 is provided, the information processing device 100 has the function of an initiator in NFC, and plays a role of a so-called reader/writer. Here, as a carrier signal transmitted by the carrier transmission circuit 266 from the antenna 268, for example, a polling signal, a signal indicating various kinds of data such as distribution information, or the like is exemplified. In addition, transmission of carriers of the carrier transmission circuit 266 is controlled by, for example, the MPU250.

With the configuration shown in FIG. 20, for example, the information transmission control device 200 performs the process of the information processing method according to the present embodiment. Note that a hardware configuration of the information transmission control device 200 according to the present embodiment is not limited to the configuration shown in FIG. 20.

For example, when first communication is performed with an external device via a connected external communication device that can communicate based on the first communication, the information transmission control device 200 may not be provided with the communication interface 264.

In addition, when the second communication is not NFC, the information transmission control device 200 may not be provided with the carrier transmission circuit 266 and the antenna 268. Furthermore, when the second communication is not NFC, the information transmission control device 200 may be further provided with a second communication-enabled communication device such as an infrared communication device.

In addition, when the information transmission control device 200 performs the second communication with an external device via a connected external communication device that can communicate based on the second communication, the information transmission control device may not be provided with a second communication-enabled communication device such as the carrier transmission circuit 266 and the antenna 268.

Furthermore, the information transmission control device 200 may be further provided with other communication devices, for example, an LAN terminal and a transmission/reception circuit, communication antennas such as LTE/3G antennas and an RF circuit, and the like. In addition, the information transmission control device 200 may be further provided with sensors, for example, a GPS sensor and an acceleration sensor.

In addition, the information transmission control device 200 can also have a configuration in which, for example, the recording medium 256, an operation input device 260, or a display device 262 is not provided.

Furthermore, for example, the configuration shown in FIG. 20 (or a configuration according to a modified example thereof) may be realized with one or two or more ICs.

The example of the configuration of the information transmission control device 200 will be described with reference to FIG. 19 again.

The first communication unit 202 communicates with external devices using the first communication. The first communication of the first communication unit 202 is controlled by, for example, the control unit 206 (more specifically, for example, the communication control unit 210).

Here, as the first communication unit 202, for example, an IEEE 802.15.1 port and a transmission/reception circuit, an IEEE 802.11 port and a transmission/reception circuit, and the like are exemplified.

The second communication unit 204 communicates with external devices using the second communication. The second communication of the second communication unit 204 is controlled by, for example, the control unit 206 (more specifically, for example, the communication control unit 210).

Here, as the second communication unit 204, for example, an NFC-enabled communication device such as the carrier transmission circuit 266 and the antenna 268 shown in FIG. 20, an infrared communication device, or the like is exemplified.

The control unit 206 is configured with an MPU, for example, and plays a role of controlling the information transmission control device 200 overall. In addition, the control unit 206 is provided with, for example, the communication control unit 210, and plays a leading role of performing the process of the information transmission control method according to the present embodiment.

The communication control unit 210 plays a leading role of performing the process of the information transmission control method according to the present embodiment, and causes distribution information to be transmitted in the first communication, using both the first communication and the second communication.

The communication control unit 210 causes a signal to be transmitted using the first communication. The communication control unit 210 causes a signal to be transmitted using the first communication by, for example, delivering a signal transmission command to the first communication unit 202.

In addition, when user information has been acquired using the second communication, the communication control unit 210 causes distribution information to be transmitted using the first communication. The communication control unit 210 acquires the user information from, for example, the second communication unit 204 delivering the user information. Then, the communication control unit 210 delivers, for example, distribution information and a transmission command of the distribution information to the first communication unit 202, thereby causes the distribution information to be transmitted in the first communication.

With the communication control unit 210 provided, for example, the control unit 206 actively performs the process of the information transmission control method according to the present embodiment.

With the configuration shown in FIG. 19, for example, the information transmission control device 200 performs the process of the information transmission control method according to the present embodiment, and transmits the distribution information in the first communication, using both the first communication and the second communication.

Thus, since the information transmission control device 200 has the configuration shown in FIG. 19, for example, the information processing system which can achieve enhancement of user convenience in acquisition of distribution information is realized.

In addition, with the configuration shown in FIG. 19, for example, the information transmission control device 200 can exhibit the effects obtained by performing, for example, the process of the information processing method according to the present embodiment as described above.

Note that a configuration of the information transmission control device according to the present embodiment is not limited to the configuration shown in FIG. 19.

The information transmission control device according to the present embodiment can be provided with the communication control unit 210, for example, separately from the control unit 206 (for example, realized with a different processing circuit). In addition, the information transmission control device according to the present embodiment may be configured such that processes performed by the communication control unit 210 are performed in a plurality of processing circuits.

In addition, when the first communication is performed with an external device via a connected external communication that can communicate based on the first communication, for example, the information transmission control device according to the present embodiment may not be provided with the first communication unit 202.

In addition, when the second communication is performed with an external device via a connected external communication that can communicate based on the second communication, for example, the information transmission control device according to the present embodiment may not be provided with the second communication unit 204.

Although the information processing device has been described as the present embodiment, the present embodiment is not limited thereto. For example, the present embodiment may be applied to various apparatuses, such as communication devices such as smartphones or cellular phones as shown in FIG. 1, tablet type devices, computers such as personal computers, video/music players (or video/music recording/replay devices) and game machines. In addition, the present embodiment may be applied to, for example, a processing IC that may be integrated into the aforementioned apparatuses.

In addition, although the information transmission control device has been exemplified as the present embodiment, the present embodiment is not limited thereto. The present embodiment can be applied to various apparatuses, for example, devices installed in stores (for example, devices relating to a point-of-sale (POS) and the like), computers such as PCs and servers, communication devices such as smartphones and mobile telephones, tablet type devices, and the like. In addition, the present embodiment can also be applied to, for example, processing ICs that can be incorporated into such apparatuses described above.

Furthermore, although the management device has been exemplified as the present embodiment, the present embodiment is not limited thereto. The present embodiment can be applied to various apparatuses, for example, computers such as PCs and servers.

In addition, although the management terminals have been exemplified as the present embodiment, the present embodiment is not limited thereto. The present embodiment can be applied to various apparatuses, for example, communication devices such as smartphones and mobile telephones, tablet type devices, portable computers such as notebook PCs, video/audio reproduction devices (or video/audio recording/reproduction devices), game machines, and the like. In addition, the present embodiment can also be applied to, for example, processing ICs that can be incorporated into such apparatuses described above.

Program According to Present Embodiment

[i] Program for Enabling Computer to Function as Information Processing Device According to Present Embodiment As a program for enabling a computer to function as the information processing device according to the present embodiment (for example, a program that can execute the process of the information processing method according to the present embodiment) is executed by a processor of the computer, enhancement of user convenience in acquisition of distribution information can be achieved.

In addition, the program for enabling a computer to function as the information processing device according to the present embodiment may be executed by a processor of the computer to exhibit the effects obtained from the process of the aforementioned information processing method according to the present embodiment.

[ii] Program for Enabling Computer to Function as Information Transmission Control Device According to Present Embodiment As a program for enabling a computer to function as the information transmission control device according to the present embodiment (for example, a program that can execute the process of the information transmission control method according to the present embodiment) is executed by a processor of the computer, an information processing system that can achieve enhancement of user convenience in acquisition of distribution information can be realized.

In addition, as the program for enabling a computer to function as the information transmission control device according to the present embodiment is executed by the processor of the computer, effects obtained by performing the process of the information transmission control method according to the present embodiment can be exhibited.

Payment System According to Present Embodiment

Next, a payment system according to the present embodiment that can realize payment using the first communication according to the present embodiment and the second communication according to the present embodiment will be described.

Figure 21:
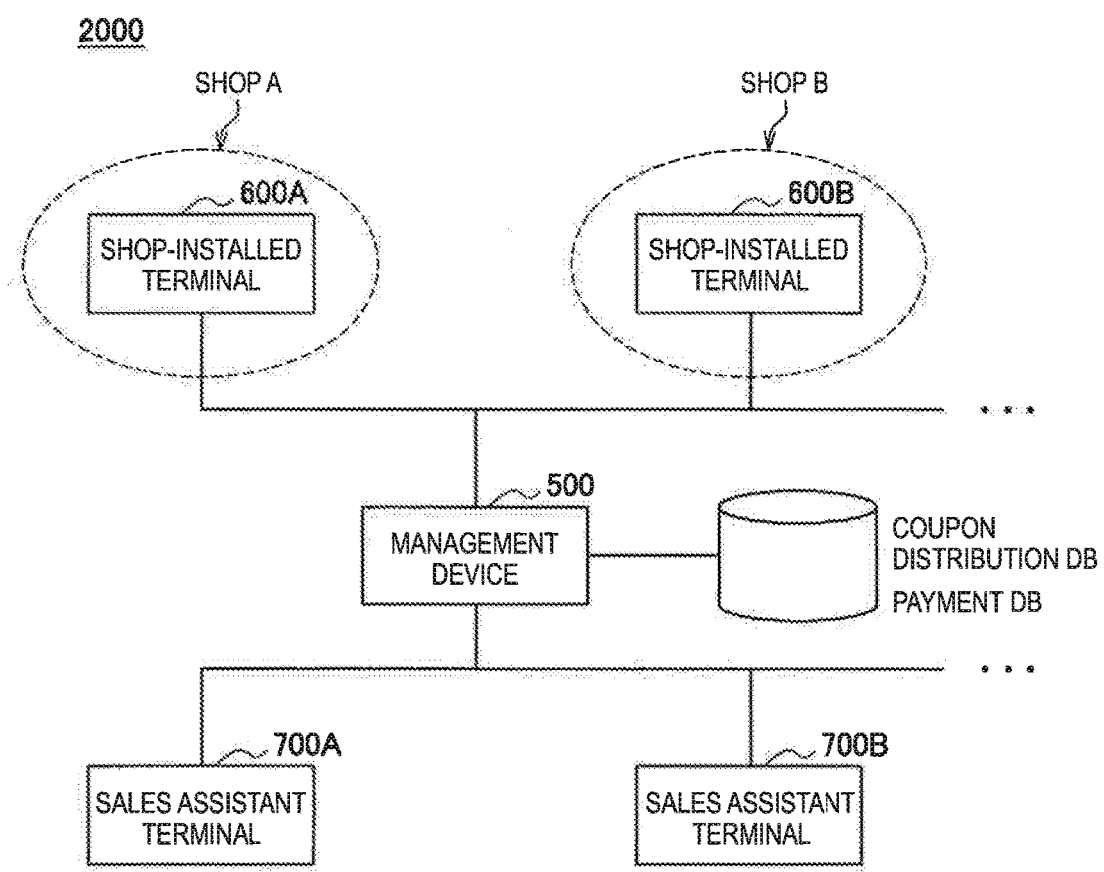
FIG. 21 is an illustrative diagram showing an example of a payment system according to the present embodiment.

FIG. 21 is an illustrative diagram showing an example of the payment system 2000 according to the present embodiment. FIG. 21 shows the example of the payment system when the payment system according to the present embodiment is applied to a real store having a plurality of shops including a shop A, a shop B, . . . . Note that a "shop" shown in FIG. 21 may also be read a" store."

The payment system 2000 has, for example, a management device 500, shop-installed terminals 600A, 600B, . . . which are devices installed in the respective shops, and sales assistant terminals 700A, 700B, . . . which are devices used by sales assistants. The "management device 500 and respective shop-installed terminals 600A, 600B, . . . " and the "management device 500 and respective sales assistant terminals 700A, 700B, . . . " are, for example, connected to each other via a network (or directly).

In addition, although not shown in FIG. 21, the payment system 2000 includes one or two or more information processing devices carried by, for example, one or two or more customers (prospective purchasers, who will be referred to as "users" below).

A case in which the payment system 2000 includes information processing devices and the information processing devices included in the payment system 2000 are information processing devices 100 (an example of the information processing device according to the present embodiment) will be exemplified below. In addition, description will be provided focusing on one information processing device 100 among the information processing devices included in the payment system 2000.

In addition, "shop-installed terminal 600" may represent the collective shop-installed terminals 600A, 600B, . . . , or a single shop-installed terminal among the plurality of shop-installed terminals 600A, 600B, . . . , below. Here, the shop-installed terminal 600 may have a function of performing the process of the information transmission control method according to the present embodiment. The shop-installed terminal 600 can also function as the information transmission control device 200.

Furthermore, "sales assistant terminal 700" may represent the collective sales assistant terminals 700A, 700B, . . . , or a single sales assistant terminal among the plurality of sales assistant terminals 700A, 700B, below.

The management device 500 actively performs a process of payment in the payment system 2000. The management device 500 may function as, for example, the management device 300 shown in FIG. 7, or may be a separate device from the management device 300 shown in FIG. 7.

As the process of payment according to the present embodiment, for example, a payment process for performing payment using an arbitrary payment method such as payment using electronic money, a process of transmission of data indicating receipt (which indicates an "electronic receipt" below), and the like are exemplified. In addition, the process of payment according to the present embodiment may include a process of distribution of various kinds of data such as shop information, coupon information, and the like (a process for distribution of distribution information).

The management device 500 performs the process of payment according to the present embodiment using various databases, for example, a coupon distribution database used for distributing coupon information (which may be referred to as a "coupon distribution DB" below), a payment database used for payment (which may be referred to as a "payment DB" below), and the like.

FIG. 22 is an illustrative diagram showing an example of the coupon distribution database according to the present embodiment, and FIG. 23 is an illustrative diagram showing an example of the payment database according to the present embodiment. Note that examples of the coupon distribution DB according to the present embodiment and the payment DB according to the present embodiment are not limited to the examples shown in FIGS. 22 and 23. A configuration of the coupon distribution DB according to the present embodiment may be the same as that of the distribution source information shown in FIG. 4, or may include the content included in the distribution source information shown in FIG. 4 (for example, the number of issued permissions shown in I4 of FIG. 4, or the like). In addition, the payment DB according to the present embodiment may include, for example, transaction numbers for identifying transactions relating to payment. Furthermore, the payment DB according to the present embodiment may include, for example, a plurality of records of the same unique ID.

Note that a configuration of the payment system according to the present embodiment is not limited to the example shown in FIG. 21. The payment system according to the present embodiment may not have, for example, the sales assistant terminals 700. In addition, the payment system according to the present embodiment may be configured, for example, to have one shop-installed terminal 600.

The payment system according to the present embodiment will be described exemplifying a case in which the payment system according to the present embodiment is the payment system 2000 shown in FIG. 21.

[A] Overview of Payment System 2000

With approach of a user to a shop (i.e., approach of an information processing device 100 to a shop-installed terminal 600) taken as an opportunity in the payment system 2000, for example, specifying the user (or the information processing device 100), distribution of various kinds of data such as shop information and coupon information, and a real purchase process and reception of an electronic receipt by the user are realized. In addition, the above is realized when a sales assistant uses the sales assistant terminal 700 in the payment system 2000, without necessity that the sale assistant steps toward a device installed in a shop, such as a device for POS.

Payment is performed in the payment system 2000, for example, as follows.

When a user carrying the information processing device 100 enters a communicable range of the first communication of a shop-installed terminal 600, the shop-installed terminal 600 detects approach of the information processing device 100.

The shop-installed terminal 600 that has detected the approach of the information processing device 100 acquires user information from the information processing device 100, and the management device 500 specifies the user (or the information processing device 100) based on the user information acquired from the information processing device 100.

The management device 500 distributes coupon information and shop information corresponding to the specified user (or the information processing device 100) to the information processing device 100 via, for example, the shop-installed terminal 600. Here, the distributed coupon information and shop information correspond to an example of the distribution information.

When the user performs a touch operation or the like toward the shop-installed terminal 600 using the information processing device 100, the information processing device 100 and the management device 500 perform a payment process via the shop-installed terminal 600.

The management device 500 transmits an electronic receipt according to the result of the payment to the information processing device 100 via the shop-installed terminal 600. In addition, the management device 500 transmits various kinds of data, e.g., data indicating content of the payment to the sales assistant terminal 700.

Next, an overview of a process of the payment system 2000 will be shown exemplifying a case in which a user carrying the information processing device 100 performs payment using the shop-installed terminal 600A installed in the shop A.

Figure 24:
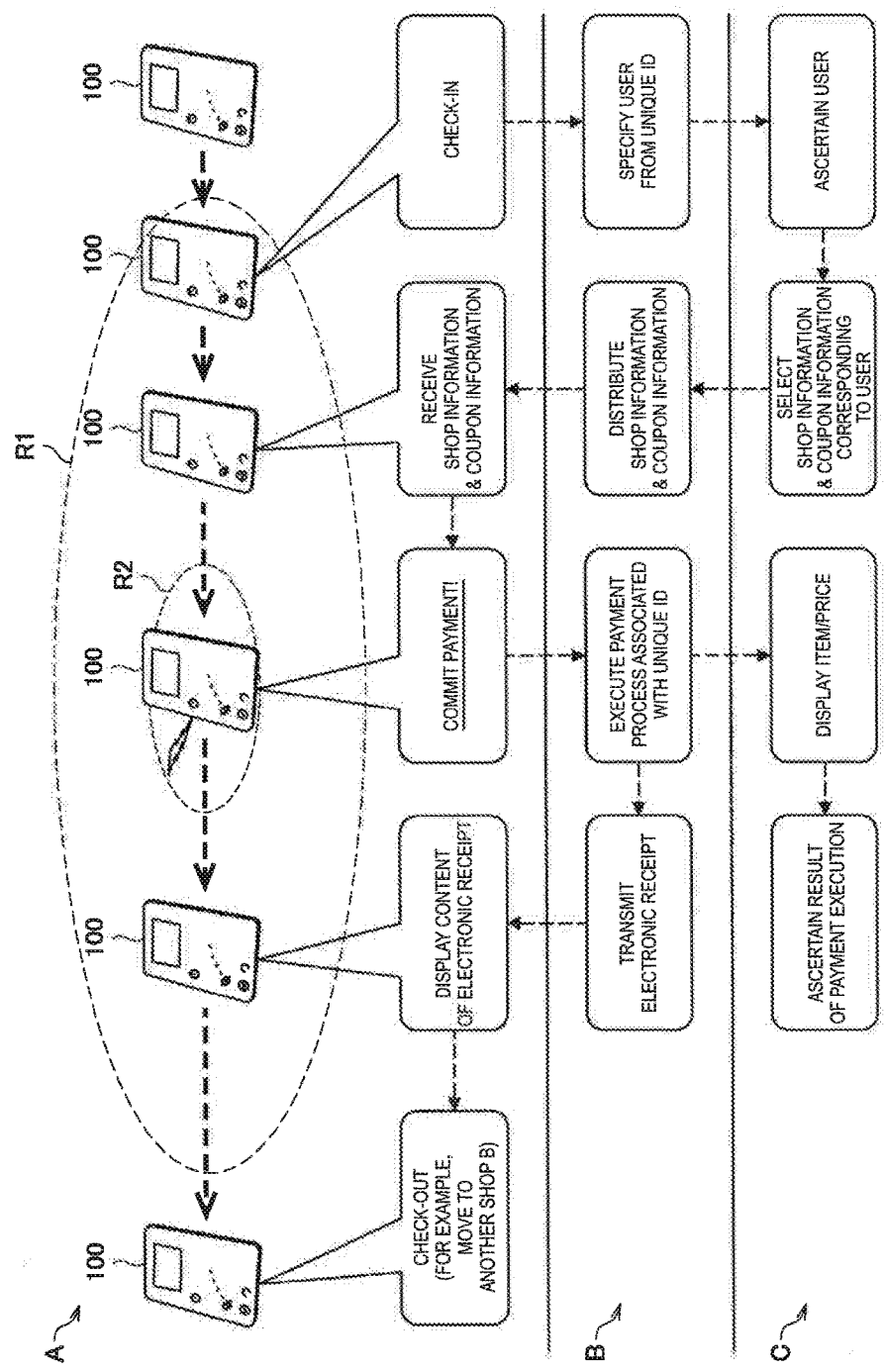
FIG. 24 is an illustrative diagram showing an example of an overview of a process of the payment system according to the present embodiment.

FIG. 24 is an illustrative diagram showing an example of the overview of the process of the payment system 2000 according to the present embodiment.

"R1" shown in FIG. 24 indicates a communicable range of the first communication of the shop-installed terminal 600A installed in the shop A, and "R2" shown in FIG. 24 indicates a communicable range of the second communication of the shop-installed terminal 600A. In addition, in FIG. 24, an IC card provided with a display device and an operation device having a user interface (UI) function is shown as an information processing device 100. Note that the information processing device 100 (an example of the information processing device according to the present embodiment) may be any apparatus such as a smartphone shown in FIG. 1.

A shown in FIG. 24 indicates an example of a flow of a user side, indicating a flow from when the information processing device 100 enters the communicable range R1 of the first communication of the shop-installed terminal 600A installed in the shop A to when the information processing device 100 moves out of the communicable range R1. An action of the information processing device 100 entering the communicable range of the first communication of the shop-installed terminal 600 may be referred to as "check-in," "and an action of the information processing device 100 moving out of the communicable range of the first communication of the shop-installed terminal 600 may be referred to as "check-out"

In addition, B shown in FIG. 24 indicates an example of a process flow of a management device 500 side, and C shown in FIG. 24 indicates an example of a flow of a sales assistant side using a sales assistant terminal 700.

Figure 25:
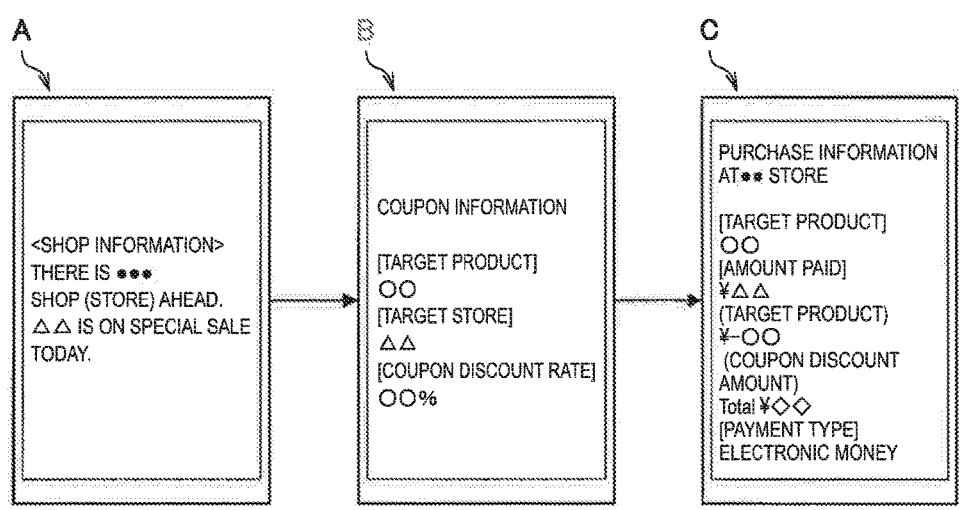
FIG. 25 is an illustrative diagram showing an example of an overview of a process of the payment system according to the present embodiment.
Figure 26:
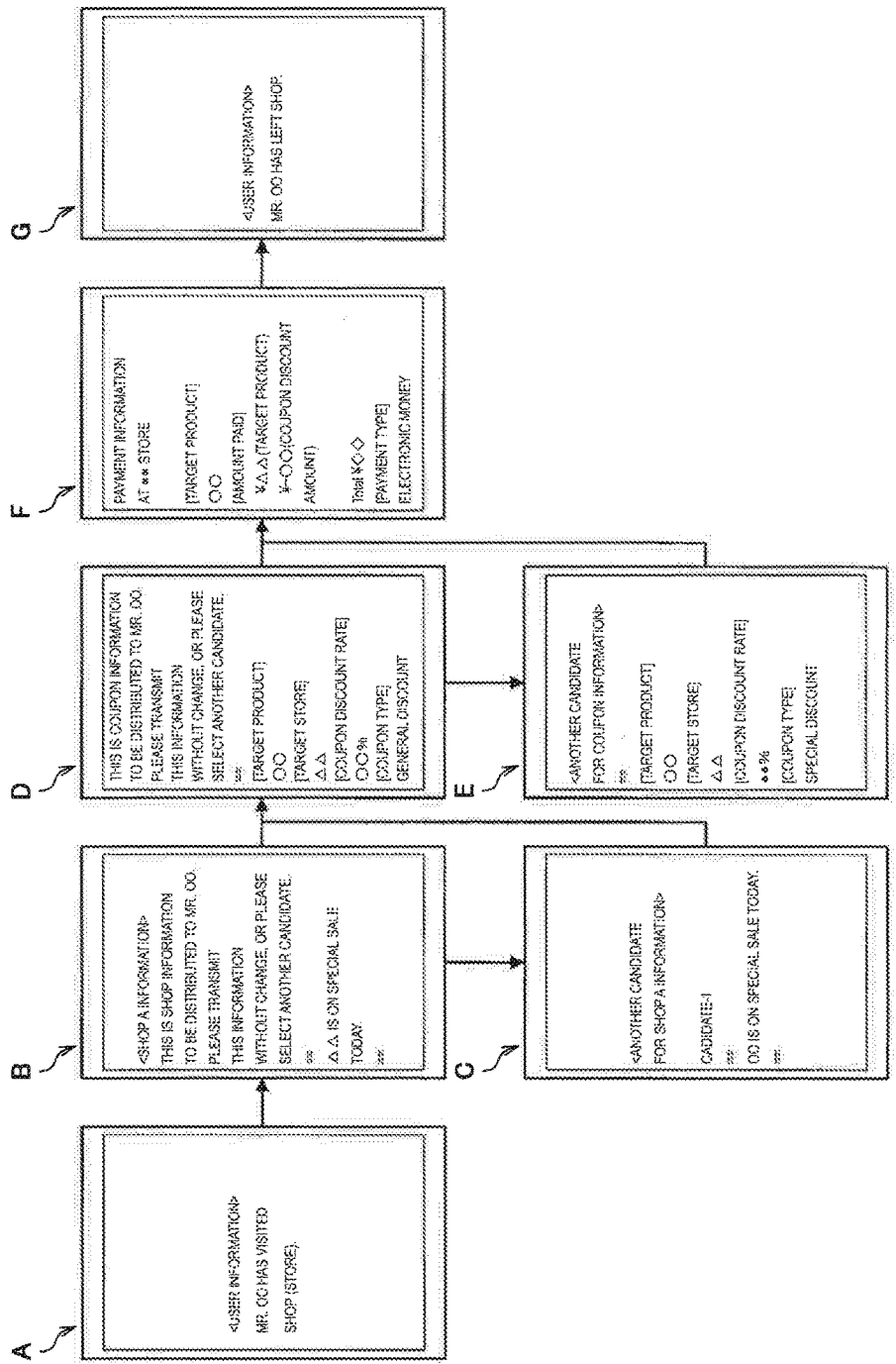
FIG. 26 is an illustrative diagram showing an example of an overview of a process of the payment system according to the present embodiment.

FIGS. 25 and 26 are illustrative diagrams describing the example of the overview of the process of the payment system 2000 according to the present embodiment. A to C shown in FIG. 25 indicate examples of screens displayed on a display screen of the display unit provided in the information processing device 100, or displayed on a display screen of an external display device connected to the information processing device 100. In addition, A to G shown in FIG. 26 indicate examples of screens displayed on a display screen of a display device provided in the sales assistant terminal 700, or displayed on a display screen of an external display device connected to the sales assistant terminal 700.

The example of the overview of the process of the payment system 2000 shown in FIG. 24 will be described below while FIGS. 25 and 26 are appropriately referred to.

When the information processing device 100 enters the communicable range R1 of the first communication of the shop-installed terminal 600A, the management device 500 specifies the user (or the information processing device 100) based on the unique ID corresponding to the information processing device 100. Here, as the unique ID according to the present embodiment, arbitrary unique data, e.g., a value converted from a BT address or credit card numbers, is exemplified.

The management device 500 acquires user information acquired by, for example, the shop-installed terminal 600A in the first communication with the information processing device 100 from the shop-installed terminal 600A, and specifies the user (or the information processing device 100) based on the acquired user information. Here, the management device 500 specifies the user (or the information processing device 100) using, for example, a table (or a database) in which the acquired user information is set as a unique ID and the unique ID is associated with data indicating the user (or the information processing device 100). In addition, the management device 500 can specify, for example, a unique ID from the acquired user information using the table (or a database) in which user information is associated with unique IDs, and thus specify the user (or the information processing device 100) using the specified unique ID.

The management device 500 transmits information (data) of the specified user to the sales assistant terminal 700. The sales assistant terminal 700 causes the display screen to display a screen as shown in, for example, A of FIG. 26 based on the acquired user information.

In addition, the management device 500 specifies selection information (data) for causing information to be transmitted to the information processing device 100 to be selected, and transmits the specified selection information to the sales assistant terminal 700. The management device 500 specifies the selection information associated with the shop-installed terminal 600A based on, for example, identification information indicating the shop-installed terminal 600A (for example, an ID of the shop-installed terminal 600A). Furthermore, the management device 500 can also specify the selection information based further on, for example, the unique ID.

As information to be transmitted to the information processing device 100, for example, shop information and coupon information are exemplified. In addition, the information to be transmitted to the information processing device 100 may not include coupon information. A case in which the information to be transmitted to the information processing device 100 includes shop information and coupon information will be exemplified below.

The selection information includes, for example, initial data of the shop information and coupon information to be transmitted to the information processing device 100, and transmission candidate data of the shop information and coupon information. In addition, the selection information may not include initial data of the coupon information, or the initial data of the coupon information and transmission candidate data of the coupon information.

Here, as the shop information according to the present embodiment, data indicating products sold at the shop or services provided at the shop, for example, data indicating a product on special sale (for example, data indicating a product code, name, price, or the like) is exemplified. In addition, the coupon information may be data indicating a coupon corresponding to the shop-installed terminal 600, or data indicating a coupon corresponding to the acquired user information or the unique ID.

The sales assistant terminal 700 causes the display screen to display a screen relating to selection of shop information and a screen relating to selection of coupon information based on the acquired selection information, and decides shop information and coupon information to be transmitted to the information processing device 100 based on an operation performed by a sales assistant on an operation device provided in the sales assistant terminal 700. B of FIG. 26 and C of FIG. 26 indicate examples of screens relating to selection of shop information, and D of FIG. 26 and E of FIG. 26 indicate examples of screens relating to selection of coupon information.

Then, the sales assistant terminal 700 transmits the decided shop information and coupon information to the management device 500.

The management device 500 transmits the shop information and coupon information acquired from the sales assistant terminal 700 to the information processing device 100 via the shop-installed terminal 600A. For example, the management device 500 transmits the shop information and coupon information to be transmitted and a transmission command to the shop-installed terminal 600A, and then the shop-installed terminal 600A transmits the acquired shop information and coupon information using the first communication according to the transmission command.

Here, when the shop information and coupon information are transmitted using the first communication, the shop-installed terminal 600A may further transmit the user information acquired from the information processing device 100. By further transmitting the user information, for example, the transmitted shop information and coupon information can be regarded as "information valid in the specific information processing device 100 corresponding to the user information" (information invalid in a device other than the specific information processing device 100).

Note that data to be transmitted by the management device 500 to the information processing device 100 via the shop-installed terminal 600A is not limited thereto. For example, the management device 500 may transmit data indicating lists of products sold at the shop or services provided at the shop corresponding to the shop-installed terminal 600 (for example, a table in which product codes, names, and prices are associated with each other, or the like) to the information processing device 100 via the shop-installed terminal 600A.

The information processing device 100 causes the display screen to display a screen indicating content of the shop information as shown in A of FIG. 25 or a screen indicating content of the coupon information as shown in B of FIG. 25, for example, based on the acquired shop information and coupon information.

When the user approves payment by, for example, performing a touch operation of the shop-installed terminal 600A using his or her information processing device 100, the information processing device 100 and the management device 500 perform a payment process for a product that the user desires to purchase via the second communication performed between the shop-installed terminal 600 and the information processing device 100.

Based on the unique ID, for example, the management device 500 performs the payment process associated with the unique ID according to an arbitrary payment scheme such as payment using electronic money or payment using credit card numbers.

In addition, the management device 500 transmits information regarding payment of the payment process to the sales assistant terminal 700. As the information regarding payment, for example, data indicating items such as a payment type, a product for which payment is performed, and a price, and data indicating a payment result are exemplified. The sales assistant terminal 700 causes the display screen to display a screen as shown in for example, F of FIG. 26 based on the acquired information regarding payment. As the sales assistant terminal 700 causes the display screen to display the screen as shown in for example, F of FIG. 26, the sales assistant who is the user of the sales assistant terminal 700 can ascertain content of the payment.

In addition, when the payment process is normally completed, the management device 500 generates an electronic receipt according to the result of the payment process, and transmits the electronic receipt to the information processing device 100 via the shop-installed terminal 600A.

For example, the management device 500 transmits the electronic receipt and a transmission command for causing the electronic receipt to transmit using the first communication to the shop-installed terminal 600A, and the shop-installed terminal 600A transmits the acquired electronic receipt using the first communication according to the transmission command. Since the shop-installed terminal 600A transmits the electronic receipt using the first communication whose communicable range is wider than the second communication, the payment system 2000 can enable the information processing device 100 to acquire the electronic receipt with more reliability.

Note that, in the payment system 2000, the electronic receipt can also be transmitted to the information processing device 100 using the second communication for the payment performed between the shop-installed terminal 600A and the information processing device 100.

Based on the acquired electronic receipt, the information processing device 100 causes the display screen to display a screen shown in, for example, C of FIG. 25. As the information processing device 100 causes the display screen to display the screen shown in C of FIG. 25, the user of the information processing device 100 can ascertain content of the payment.

When the information processing device 100 moves out of the communicable range R1 of the first communication of the shop-installed terminal 600A, the shop-installed terminal 600A transmits, for example, information (data) indicating that the information processing device 100 has moved out of the communicable range R1 of the first communication to management device 500. The information indicating that the information processing device 100 has moved out of the communicable range R1 of the first communication includes, for example, the user information corresponding to the information processing device 100, and data indicating that the device is not present in the communicable range R1 of the first communication (for example, data indicating a flag). The shop-installed terminal 600A determines whether or not the information processing device 100 has moved out of the communicable range R1 of the first communication, for example, as in the process of Step S210 of FIG. 6.

Based on the acquired information indicating that the information processing device 100 has moved out of the communicable range R1 of the first communication, the management device 500 specifies the user who has moved out of the communicable range R1 of the first communication (or the information processing device 100). The management device 500 specifies the user who has moved out of the communicable range R1 of the first communication (or the information processing device 100) using, for example, the user information included in the information indicating that the information processing device 100 has moved out of the communicable range R1 of the first communication, or the unique ID specified from the user information.

Then, the management device 500 transmits information of the specified user (or the information processing device 100) and data indicating that the device is not present in the communicable range R1 of the first communication to the sales assistant terminal 700. Based on the acquired information of the user and the like, the sales assistant terminal 700 causes the display screen to display a screen shown in, for example, G of FIG. 26.

Payment is realized, for example, as the process shown in FIG. 24 is performed in the payment system 2000.

In addition, as the process shown in FIG. 24 is performed in the payment system 2000, for example, specifying the user (or the information processing device 100), distribution of various kinds of data such as shop information and coupon information, and a real purchase process and reception of an electronic receipt of the user are seamlessly realized with approach of the user to a shop (i.e., an approach of the information processing device 100 to the shop-installed terminal 600) taken as an opportunity. Furthermore, the above is realized in the payment system 2000 without necessity that the sale assistant using the sales assistant terminal 700 steps toward a device installed in a shop, such as a device for POS.

Note that the overview of the process of the payment system according to the present embodiment is not limited to the example shown in FIG. 24.

In the payment system according to the present embodiment, for example, the process relating to the flow of the sales assistant side using the sales assistant terminal 700 shown in C of FIG. 24 may not be performed. When the process relating to the flow of the sales assistant side using the sales assistant terminal 700 shown in C of FIG. 24 is not be performed, the management device 500 transmits, for example, the initial data of the shop information and coupon information to the information processing device 100 via the shop-installed terminal 600A.

[B] Process Performed in Payment System 2000

Next, an example of the process of the payment system 2000 will be described. An example of a process performed in the entire the payment system 2000 and an example of processes of respective devices constituting the payment system 2000 will be described below.

[B-1] Process Performed in Entire Payment System 2000

Figure 27:
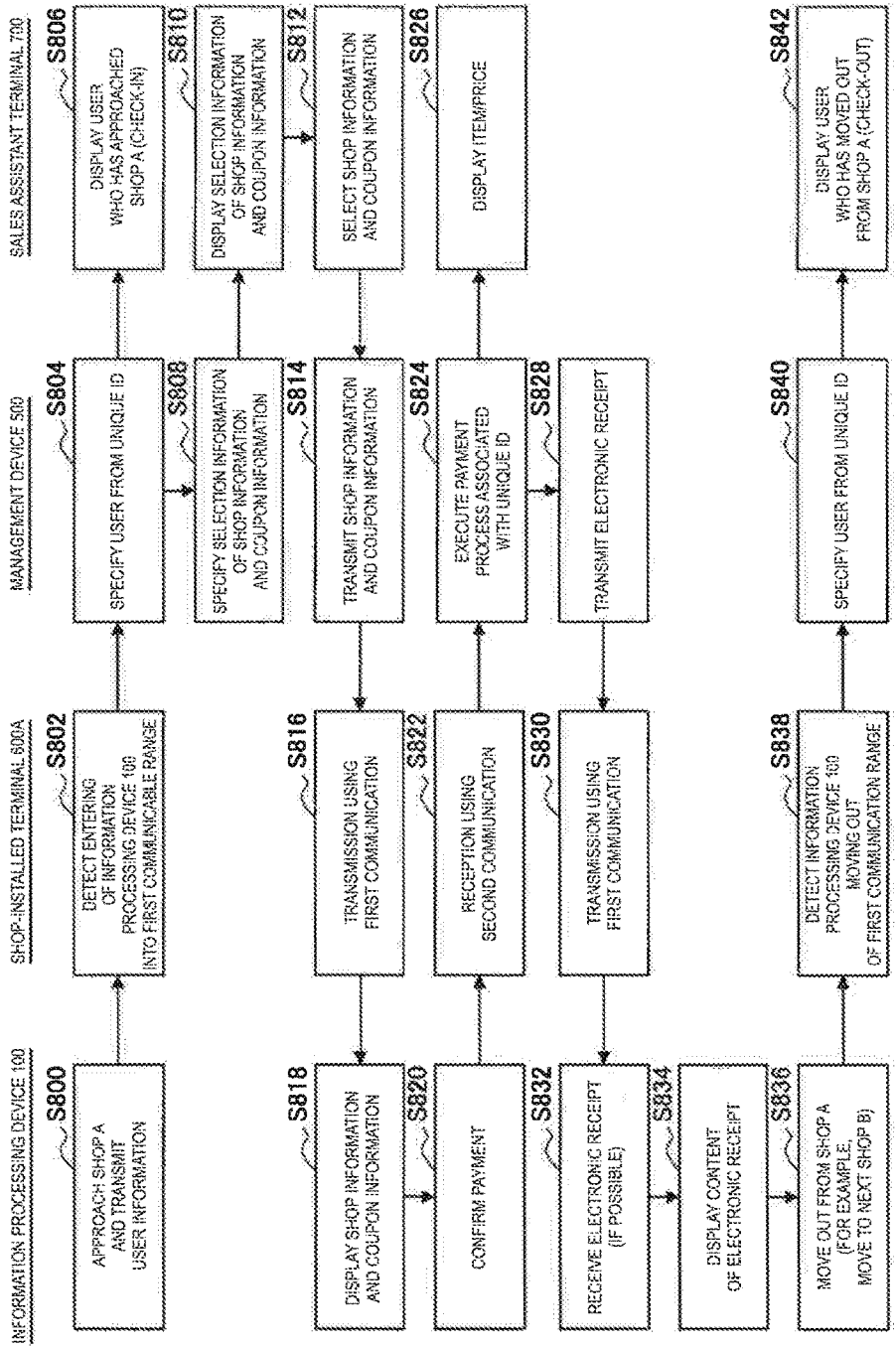
FIG. 27 is an illustrative diagram for describing an example of a process in the payment system according to the present embodiment.

FIG. 27 is an illustrative diagram for describing the example of the process in the payment system 2000 according to the present embodiment, showing the example of the process performed in the entire payment system 2000. FIG. 27 shows the example of the process when the user carrying the information processing device 100 performs payment using the shop-installed terminal 600A installed in the shop A, as in FIG. 24.

When the information processing device 100 enters the communicable range RI of the first communication of the shop-installed terminal 600A, the information processing device 100 transmits user information using the first communication (S800). In addition, when the information processing device 100 enters the communicable range R1 of the first communication of the shop-installed terminal 600A, the shop-installed terminal 600A detects the information processing device 100 using the first communication (S802). The shop-installed terminal 600A detects the information processing device 100 using the first communication by performing, for example, the process similar to Step S200 of FIG. 6.

The management device 500 specifies the user (or the information processing device 100) from the unique ID corresponding to the information processing device 100 (S804). The management device 500 acquires, for example, the user information acquired by the shop-installed terminal 600A using the first communication with the information processing device 100 from the shop-installed terminal 600A, and specifies the user (or the information processing device 100) using the unique ID corresponding to the user information as described above.

In addition, the management device 500 transmits information (data) of the specified user to the sales assistant terminal 700. Then, the sales assistant terminal 700 causes the display screen to display a screen as shown in, for example, A of FIG. 26 based on the acquired information of the user to cause the display screen to display the user approaching the shop A (S806).

In addition, the management device 500 specifies selection information, and transmits the specified selection information to the sales assistant terminal 700 (S808).

The sales assistant terminal 700 causes the display screen to display a screen for selection of shop information and a screen for selection of coupon information based on the acquired selection information, and decides shop information and coupon information to be transmitted to the information processing device 100 based on an operation performed by the sales assistant on the operation device provided in the sates assistant terminal 700 (S812). Then, the sales assistant terminal 700 transmits the decided shop information and coupon information to the management device 500.

The management device 500 transmits the shop information and coupon information to be transmitted and a transmission command to the shop-installed terminal 600A (S814), and the shop-installed terminal 600A transmits the acquired shop information and coupon information using the first communication (S816).

The information processing device 100 causes the display screen to display, for example, a screen showing content of the shop information shown in A of FIG. 25 or a screen showing content of the coupon information shown in B of FIG. 25 based on the acquired shop information and coupon information (S818).

For example, when the user approves payment by performing a touch operation with respect to the shop-installed terminal 600A using his or her information processing device 100, the information processing device 100 confirms payment (S820), and the second communication for the payment process is performed between the information processing device 100 and the shop-installed terminal 600 (S822). Then, the information processing device 100 and the management device 500 start the payment process for a product that the user desires to purchase or the like in the second communication performed between the shop-installed terminal 600 and the information processing device 100, and the management device 500 performs the payment process associated with the unique ID (S824).

In addition, the management device 500 transmits information relating to payment of the payment process to the sales assistant terminal 700. Based on the acquired information relating to payment, the sales assistant terminal 700 causes the display screen to display a screen shown in, for example, F of FIG. 26(S826). As the sales assistant terminal 700 causes the display screen to display the screen shown in F of FIG. 26, the sales assistant who is the user of the sales assistant terminal 700 can ascertain content of the payment.

Furthermore, the management device 500 generates an electronic receipt according to the result of the payment process when the payment process is normally completed, and transmits the electronic receipt and a transmission command to the shop-installed terminal 600A (S828). Then, the shop-installed terminal 600A transmits the acquired electronic receipt using communication according to the transmission command (S830). Here, although an example in which the shop-installed terminal 600A transmits the electronic receipt using the first communication is shown in FIG. 27, the shop-installed terminal 600A can also transmit the electronic receipt using the second communication in the payment system 2000. That is, as the communication corresponding to the transmission command, for example, the first communication or the second communication is exemplified.

Upon receiving the electronic receipt (S832), the information processing device 100 causes the display screen to display a screen shown in for example, C of FIG. 25 based on the acquired electronic receipt (S834).

When the information processing device 100 moves out of the communicable range R1 of the first communication of the shop-installed terminal 600A since the user thereof moves (S836), the shop-installed terminal 600A detects that, for example, the information processing device 100 has moved out of the communicable range R1 of the first communication (S838). Then, the shop-installed terminal 600A transmits information indicating that the information processing device 100 has moved out of the communicable range R1 of the first communication to the management device 500.

Based on the acquired information indicating that the information processing device 100 has moved out of the communicable range R1 of the first communication, the management device 500 specifies the user (or the information processing device 100) that has moved out of the communicable range R1 of the first communication (S840). Then, the management device 500 transmits information of the specified user (or the information processing device 100) and data indicating that the device is not present in the communicable range R1 of the first communication to the sales assistant terminal 700.

The sales assistant terminal 700 causes the display screen to display a display screen shown in, for example, G of FIG. 26 based on the acquired information of the user, or the like (S842).

Payment is realized as the process shown in, for example, FIG. 27 is performed in the payment system 2000. Note that it is a matter of course that the process of the payment system according to the present embodiment is not limited to the example shown in FIG. 27.

[B-2] Process Performed by Information Processing Device 100 Constituting Payment System 2000

Figure 28:
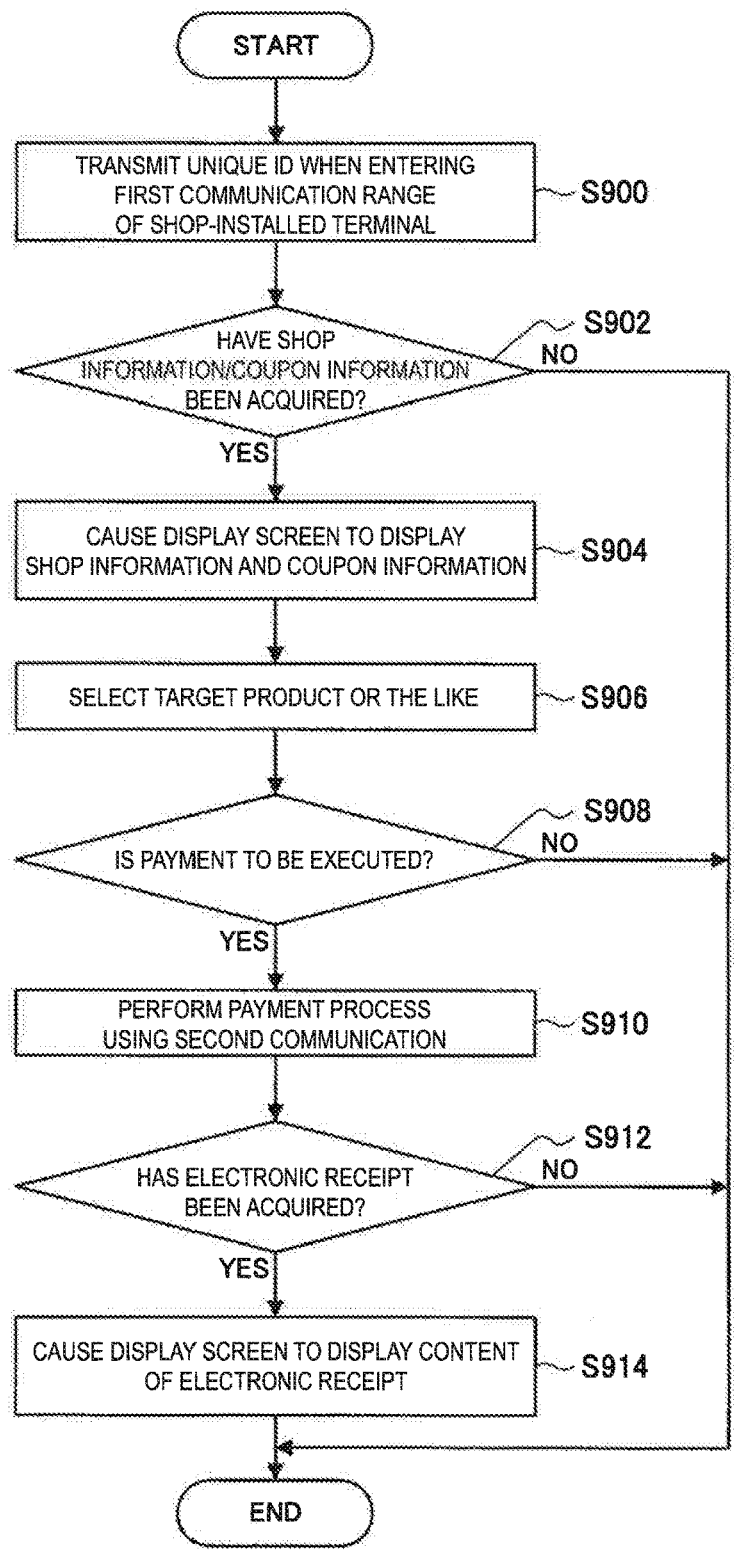
FIG. 28 is an illustrative diagram for describing an example of a process in the payment system according to the present embodiment.

FIG. 28 is an illustrative diagram for describing the example of the process performed in the payment system 2000 according to the present embodiment, showing an example of the process of the information processing device 100 constituting the payment system 2000.

In addition, FIG. 29 is an illustrative diagram for describing the example of the process of the information processing device 100 constituting the payment system 2000 according to the present embodiment, showing an example of a data format of data used by the information processing device 100 in the process. The data of the data format shown in FIG. 29 is recorded in, for example, the storage unit 106 provided in the information processing device 100, an external recording medium connected to the information processing device 100, or the like.

"Payment type" shown in FIG. 29 is data indicating a payment scheme, and data indicating a flag indicating a payment scheme, for example, a payment scheme that uses electronic money, a payment scheme that uses credit card numbers, or the like is exemplified. In addition, "electronic values" shown in FIG. 29 is, for example, data indicating balance available for payment. Furthermore, "electronic receipt exchange completion flag" shown FIG. 29 is, for example, data indicating a flag indicating whether or not an electronic receipt has been acquired in performed payment. Note that it is a matter of course that the example of a data format of data used by the information processing device 100 in the process is not limited to the example shown in FIG. 29.

When the information processing device 100 enters the communicable range R1 of the first communication of the shop-installed terminal 600, the information processing device transmits user information using the first communication (S900). When the shop-installed terminal 600 is determined to have been detected through a process similar to Step S100 of FIG. 5, for example, the information processing device 100 transmits the user information.

The information processing device 100 determines whether or not shop information and coupon information have been acquired (S902). When shop information and coupon information are not acquired even after a set predetermined period of time elapses after the process of Step S900 is performed, for example, the information processing device 100 determines that no shop information and coupon information are acquired.

When no shop information and coupon information are determined to have been acquired in Step S902, the information processing device 100 ends the process.

In addition, when shop information and coupon information are determined to have been acquired in Step S902, the information processing device 100 causes the display screen to display content of the acquired shop information and content of the acquired coupon information (S904). The information processing device 100 may cause the content of the shop information and the content of the coupon information to be displayed on separate screens as shown in, for example, A of FIG. 25 and B of FIG. 25, or cause the content of the shop information and the content of the coupon information to be displayed on one screen. In addition, when shop information and coupon information are determined to have been acquired in Step S902, for example, the information processing device 100 holds the acquired coupon information in the data format as shown in, for example, FIG. 29.

The information processing device 100 selects a product, a service, or the like for which payment is to be performed (S906). The information processing device 100 selects a product or a service for which payment is to be performed based on, for example, an operation signal according to an operation of the user with respect to the operation unit (not shown) provided in the information processing device 100.

The information processing device 100 determines whether or not payment is to be executed (S908). When the second communication is NFC, the information processing device 100 determines execution of payment if for example, it is determined to have entered the communicable range of the second communication in a set predetermined period of time after the process of Step S904 is performed. Here, when the second communication is NFC, a touch operation of the user to start the second communication can be understood as approval of payment from the user. Note that approval of payment from the user may be, for example, a predetermined operation for approval of payment, e.g., pushing of a button to approve payment.

When payment is determined not to be executed in Step S908, the information processing device 100 ends the process.

In addition, when payment is determined to be executed in Step S908, the information processing device 100 performs a payment process for a product or the like selected in Step S906 using the second communication with the shop-installed terminal 600 (S910). As the payment process of Step S910, for example, a process corresponding to a payment scheme that uses electronic values such as a process of subtracting a value from electronic values according to a command transmitted from the shop-installed terminal 600, or a process corresponding to a payment scheme that uses credit card numbers such as transmission of credit card numbers or code numbers according to a command transmitted from the shop-installed terminal 600 is exemplified. In addition, the acquired coupon information, for example, may be used in the payment process of Step S910.

The information processing device 100 determines whether or not an electronic receipt has been acquired (S912). When no electronic receipt is acquired within a set predetermined time after the process of Step S910 is performed, for example, the information processing device 100 determines that no electronic receipt has been acquired.

When no electronic receipt is determined to have been acquired in Step S912, the information processing device 100 ends the process.

In addition, when an electronic receipt is determined to have been acquired in Step S912, the information processing device 100 causes the display screen to display content of the electronic receipt as shown in, for example, C of FIG. 25 (S914). Furthermore, when an electronic receipt is determined to have been acquired in Step S912, the information processing device 100 holds the acquired electronic receipt in the data format shown in, for example, FIG. 29, and updates the "electronic receipt exchange completion flag" corresponding to the performed payment with a value indicating that acquisition of the electronic receipt has been completed.

The information processing device 100 constituting the payment system 2000 performs, for example, the process shown in FIG. 28. Note that it is a matter of course that the process of the information processing device 100 constituting the payment system 2000 is not limited to the example shown in FIG. 28.

[B-3] Process of Management Device 500 Constituting Payment System 2000

Figure 30:
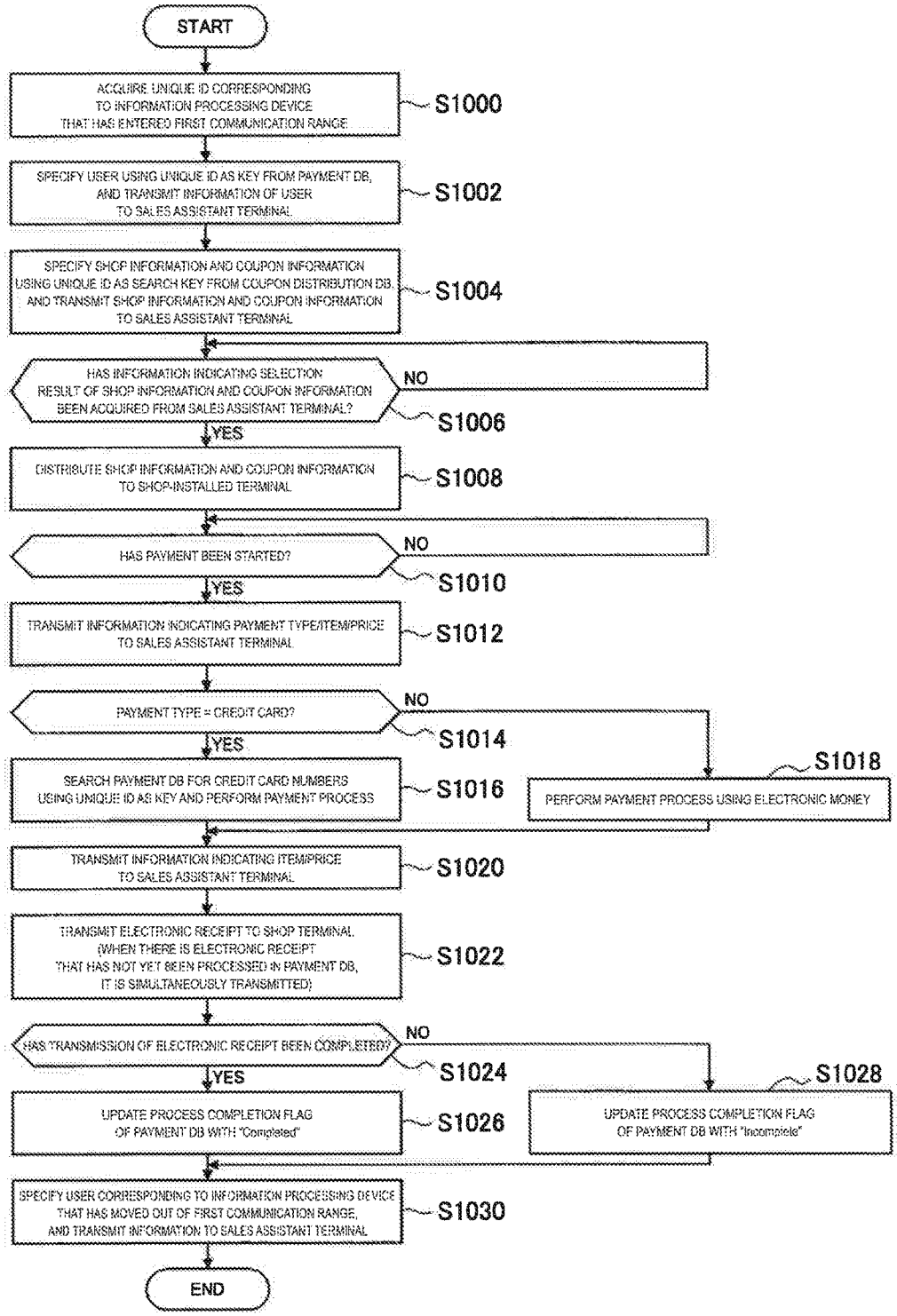
FIG. 30 is an illustrative diagram for describing an example of a process in the payment system according to the present embodiment.

FIG. 30 is an illustrative diagram for describing the example of the process of the payment system 2000 according to the present embodiment, showing an example of a process of the management device 500 constituting the payment system 2000.

The management device 500 acquires, for example, the unique ID corresponding to the information processing device 100 that has entered the communicable range of the first communication of the shop-installed terminal 600 (S1000). The management device 500 acquires the unique ID corresponding to the information processing device 100 based on, for example, user information acquired via the shop-installed terminal 600.

The management device 500 searches the payment DB using, for example, the unique ID corresponding to the information processing device 100 as a key, thereby specifies a user corresponding to the unique ID, and then transmits user information corresponding to the specified user to the sales assistant terminal 700 (S1002).

The management device 500 searches, for example, the coupon distribution DB using the unique ID as a key, thereby specifies shop information and coupon information corresponding to the unique ID, and then transmits the specified shop information and coupon information to the sales assistant terminal 700 (S1004). Here, transmission candidate data of the shop information and coupon information may be further included in Step S1004.

The management device 500 determines whether or not information indicating a selection result of the shop information and coupon information has been acquired from the sales assistant terminal 700 (S1006).

When the information indicating the selection result is determined to have been acquired in Step S1006, the management device 500 transmits shop information and coupon information corresponding to the information indicating the selection result to the shop-installed terminal 600 that had transmitted the user information corresponding to the information processing device 100 (1008).

In addition, when the information indicating the selection result is determined not to have been acquired in Step S1006, the management device 500 does not advance the process until, for example, the information indicating the selection result is determined to have been acquired.

Note that, when the information indicating the selection result is determined not to have been acquired even after a set predetermined period of time elapses after the process of Step S1004 is performed, the management device 500 can also transmit the shop information and coupon information transmitted to the sales assistant terminal 700 in Step S1004 to the shop-installed terminal 600 that transmitted the user information corresponding to the information processing device 100.

The management device 500 determines whether or not payment has been started between the information processing device 100 corresponding to the unique ID (S1010). The management device 500 determines whether or not payment has been started between the information processing device 100 based on, for example, information transmitted from the shop-installed terminal 600 via the second communication.

When no payment is determined to be started in Step S1010, the management device 500 does not advance the process until payment is determined to be started.

In addition, when payment is determined to have been started in Step S1010, the management device 500 transmits information regarding the payment indicating, for example, a payment type, an item, a price, etc., to the sales assistant terminal 700 (S1012).

The management device 500 determined whether or not the payment type is a payment scheme that uses credit card numbers (S1014).

When the payment type is determined to be a payment scheme that uses credit card numbers in Step S1014, the management device 500 searches the payment DB to find credit card numbers corresponding to the unique ID using the unique ID corresponding to the information processing device 100 as a key, and performs a payment process based on the payment scheme that uses the credit card numbers (S1016).

In addition, when the payment type is determined not to be a payment scheme that uses credit card numbers in Step S1014, the management device 500 performs a payment process based on a payment scheme that uses electronic money (S1018).

When the process of Step S1016 or the process of Step S1018 is completed, the management device 500 transmits the information regarding payment indicating, for example, an item, a price, etc., to the sales assistant terminal 700 (S1020).

In addition, when the process of Step S1016 or the process of Step S1018 is completed, the management device 500 generates an electronic receipt according to the result of the payment process, and transmits the electronic receipt and a transmission command to the shop-installed terminal 600 that has performed the second communication for the payment with the information processing device 100 (or the shop-installed terminal 600 that is performing the second communication for the payment with the information processing device 100) (S1022). Here, when there is an electronic receipt that has not yet been processed associated with the unique ID corresponding to the information processing device 100 in the payment DB, for example, the management device 500 may transmit the electronic receipt that has not yet been processed as well.

When the process of Step S1022 is performed, the management device 500 determines whether or not transmission of the electronic receipt has been completed (S1024). The management device 500 determines whether or not transmission of the electronic receipt has been completed based on, for example, information (data) indicating the result of the transmission of the electronic receipt transmitted from the shop-installed terminal 600 that is a transmission target in Step S1022. Here, the shop-installed terminal 600 serving as a transmission target transmits, for example, the information indicating the result of the transmission of the electronic receipt in response to the electronic receipt and the transmission command transmitted by the management device 500 in Step S1022.

When the transmission of the electronic receipt is determined to have been completed in Step S1024, the management device 500 updates an updating target flag in a process completion flag storage area of the payment DB with, for example, "Completed" indicating that the process has been completed (S1026). As the updating target flag, for example, a flag of the process completion flag storage area associated with the unique ID corresponding to the information processing device 100 in the payment DB, or a flag in the process completion flag storage area associated with the unique ID corresponding to a transaction number of the payment in the payment DB is exemplified.

In addition, when the transmission of the electronic receipt is determined not to have been completed in Step S1024, the management device 500 updates the updating target flag in the process completion flag storage area of the payment DB with, for example, "Incomplete" indicating that the process has not been completed (S1028).

The management device 500 specifies the user corresponding to the information processing device 100 (or the information processing device 100) that has moved out of the communicable range of the first communication of the shop-installed terminal 600, and transmits information of the specified user (or the information processing device 100) and data indicating that the device is not present in the communicable range of the first communication to the sales assistant terminal 700 (S1030). The management device 500 specifies the user (or the information processing device 100) based on, for example, information acquired from the shop-installed terminal 600 indicating that the information processing device 100 has moved out of the communicable range of the first communication.

The management device 500 constituting the payment system 2000 performs, for example, the process shown in FIG. 30. Note that it is a matter of course that a process of the management device 500 constituting the payment system 2000 is not limited to the example shown in FIG. 30.

[B-4] Process of Sales Assistant Terminal 700 Constituting Payment System 2000

Figure 31:
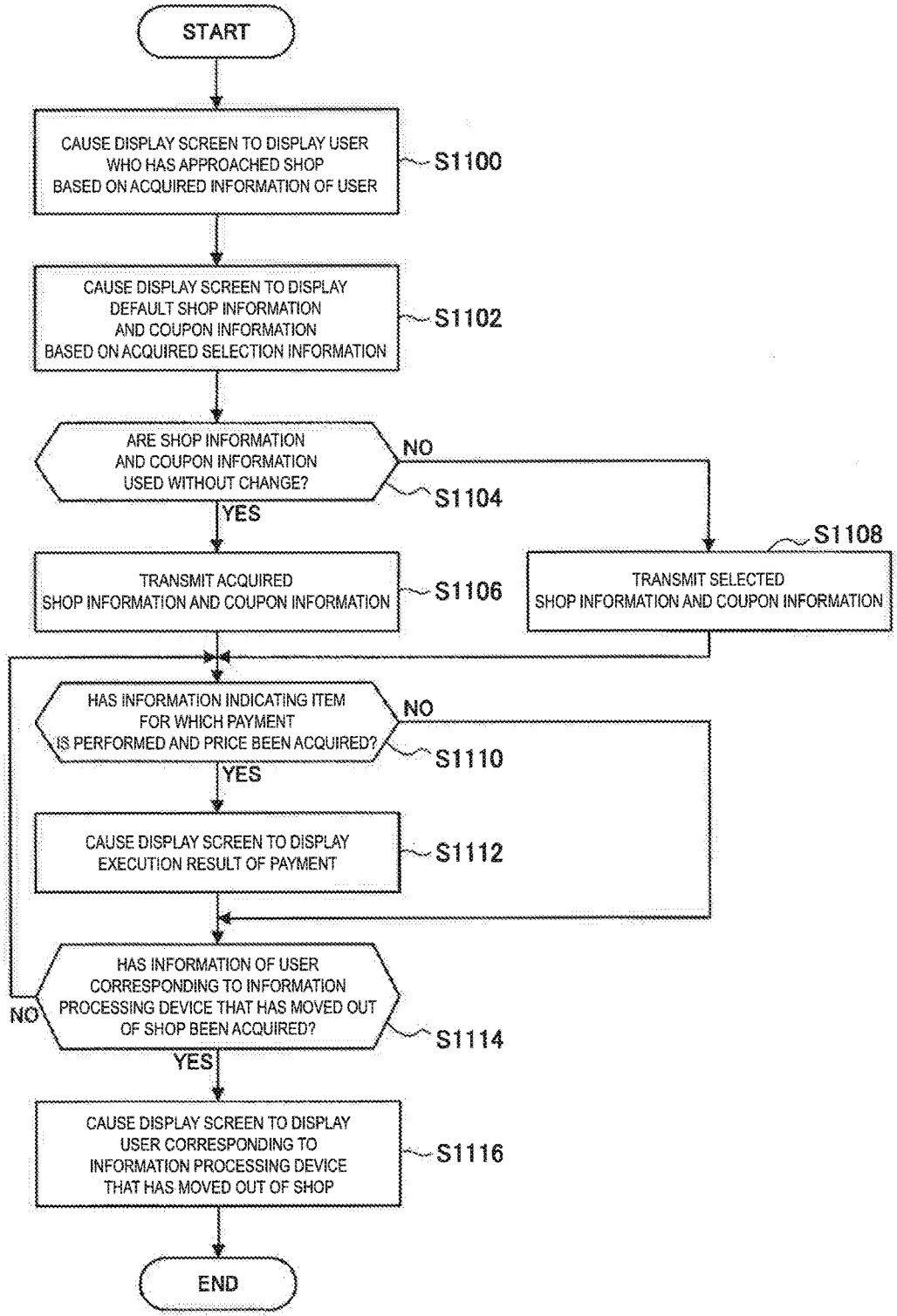
FIG. 31 is an illustrative diagram for describing an example of a process in the payment system according to the present embodiment.

FIG. 31 is an illustrative diagram for describing the example of the process of the payment system 2000 according to the present embodiment, showing an example of a process of the sales assistant terminal 700 constituting the payment system 2000.

The sales assistant terminal 700 causes the display screen to display the user who has approached the shop as shown in, for example, A of FIG. 26, based on the acquired information of the user (S1100).

The sales assistant terminal 700 causes the display screen to display default shop information and coupon information as shown in, for example, B of FIG. 26 and D of FIG. 26 based on the acquired selection information (S1102).

The sales assistant terminal 700 determines whether or not the default shop information and coupon information are used without change based on, for example, an operation on the operation device provided in the sales assistant terminal 700 by a sales assistant (S1104).

When the shop information and coupon information are determined to be used without change in Step S1104, for example, the sales assistant terminal 700 transmits the acquired shop information and coupon information to the management device 500 (S1106). Note that the sales assistant terminal 700 may transmit, for example, data indicating that the default shop information and coupon information are used without change to the management device 500 in Step S1106.

In addition, when the shop information and coupon information are not determined to be used without change in Step S1104, the sales assistant terminal 700 transmits shop information and coupon information selected based on an operation to the management device 500 (S1108).

The sales assistant terminal 700 determines whether or not information regarding payment indicating an item, e.g., a product for which payment is performed, and a price has been acquired (S1110).

When the information regarding payment is determined not to have been acquired in Step S1110, the sales assistant terminal 700 performs the process of Step S1114 to be described below.

In addition, when the information regarding payment is determined to have been acquired in Step S1110, the sales assistant terminal 700 causes the display screen to display the execution result of the payment as shown in, for example, F of FIG. 26 (S1112).

The sales assistant terminal 700 determines whether or not information of the user corresponding to the information processing device 100 that moved out of the communicable range of the first communication of the shop-installed terminal 600 has been acquired (S1114).

When the information of the user is determined not to have been acquired in Step S1114, the sales assistant terminal 700 repeats the process from, for example, Step S1110.

In addition, when the information of the user is determined to have been acquired in Step S1114, the sales assistant terminal 700 causes the display screen to display the user corresponding to the information processing device 100 that moved out of the communicable range of the first communication of the shop-installed terminal 600, i.e., the user who left the shop, as shown in, for example, G of FIG. 26(S1116).

The sales assistant terminal 700 constituting the payment system 2000 performs, for example, the process shown in FIG. 31. Note that it is a matter of course that a process of the sales assistant terminal 700 constituting the payment system 2000 is not limited to the example shown in FIG. 31.

Since the processes shown in, for example, [B-2] to [B-4] described above are performed in the respective devices constituting the payment system 2000, the process shown in [B-1] described above is realized in the payment system 2000.

[B-5] Advantages of Payment System According to Present Embodiment

Since the processes shown in, for example, [B-2] to [B-4] described above are performed in the respective devices constituting the payment system 2000, and thus the process shown in [B-1] described above is realized, the payment system according to the present embodiment such as the payment system 2000 has advantages as shown in, for example, (A) to (D) below.

(A) Advantage Gained by Performing Payment in Combination of First Communication and Second Communication Approach of the user carrying the information processing device 100 to a shop that would not be detected in the second communication such as NFC can be detected using the first communication such as BT.

When the second communication is NFC, payment can be executed with a touch operation by the user carrying the information processing device 100 regarded as consent of the user to the payment.

When exchange of an electronic receipt are incomplete, such as when the information processing device 100 leaves before receiving an electronic receipt, the incomplete electronic receipt can be transmitted again. Thus, in the payment system according to the present embodiment, for example, re-transmission of an incomplete electronic receipt can be realized when the second communication for payment of the user carrying the information processing device 100 is performed with the shop-installed terminal 600 installed at the shop or another shop at which payment relating to the incomplete electronic receipt was performed.

(B) Advantage Gained when Information Processing Device Constituting Payment System According to Present Embodiment is Device with UI Function, e.g., IC Card with UI Function Shown in FIG. 24

As the user of the information processing device can realize a series of operations, for example, "ascertaining reception of coupons and content thereof," "confirming payment," and "receiving and checking receipts" using the information processing device.

(C) Advantage Gained when Payment System According to Present Embodiment has Sales Assistant Terminal 700

The user of the sales assistant terminal 700, for example, a sales assistant, etc., can "ascertain users who approach the shop," "customize shop information and coupon information for users," "transmit customized shop information and coupon information," and "ascertain content of payment."

(D) Advantage Gained when Payment Process Associated with Unique ID Corresponding to Information Processing Device 100 is Performed An arbitrary payment scheme such as payment using credit card numbers, in addition to payment using electronic money (stored values), can be realized.

[C] Configurations of Devices Constituting Payment Process According to Present Embodiment Next, as examples of configurations of the respective devices constituting the payment system according to the present embodiment, examples of configurations of the respective devices constituting the payment system 2000 will be described.

[C-1] Information Processing Device 100

The information processing device 100 has a configuration similar to, for example, that of the information processing device 100 shown in FIG. 16 (including a configuration of a modified example thereof). In addition, the information processing device 100 is configured to have a hardware configuration similar to, for example, that of the information processing device 100 shown in FIG. 17 (including a configuration of a modified example thereof).

The control unit 108 and the processing unit 110 of the information processing device 100, for example, perform the process of the payment system according to the present embodiment.

[C-2] Management Device 500

Figure 32:
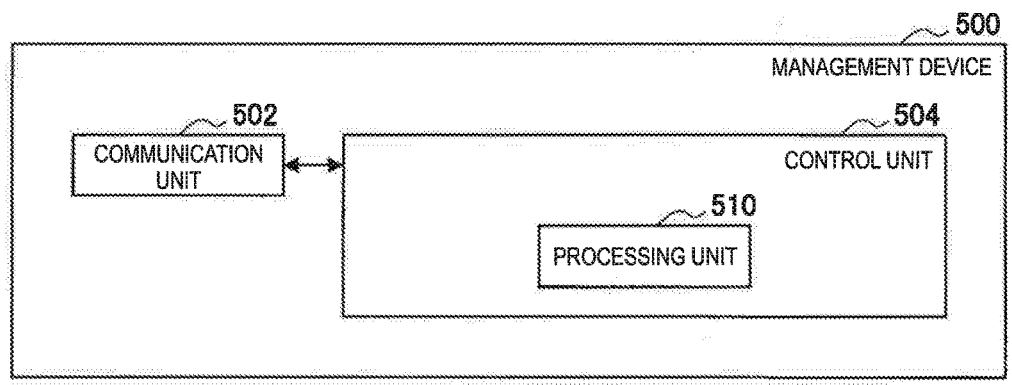
FIG. 32 is a block diagram showing an example of a configuration of a management device according to the present embodiment.

FIG. 32 is a block diagram showing an example of a configuration of the management device 500 according to the present embodiment. The management device 500 is provided with, for example, a communication unit 502 and a control unit 504.

The management device 500 may be provided with, for example, a ROM (not shown), a RAM (not shown), a storage unit (not shown), an operation unit (not shown) which can be operated by a user of the management device 500, a display unit (not shown) which displays various screens on a display screen, and the like. The management device 500 connects the respective constituent elements with each other using, for example, a bus serving as a data transmission path.

The ROM (not shown) stores control data such as programs and operation parameters used by the control unit 504. The RAM (not shown) temporarily stores a program executed by the control unit 504, and the like.

The storage unit (not shown) is a storage means provided in the management device 500, which stores, for example, data relating to the payment system according to the present embodiment such as the coupon distribution DB and the payment DB, and various kinds of data such as various applications. Here, as the storage unit (not shown), for example, a magnetic recording medium such as a hard disk, a non-volatile memory such as a flash memory, and the like are exemplified. In addition, the storage unit (not shown) may be attachable to/detachable from the management device 500.

As the operation unit (not shown), an operation input device which will be described below may be exemplified. As the display unit (not shown), a display device which will be described below may be exemplified.

Example of Hardware Configuration of Management Device 500

Figure 33:
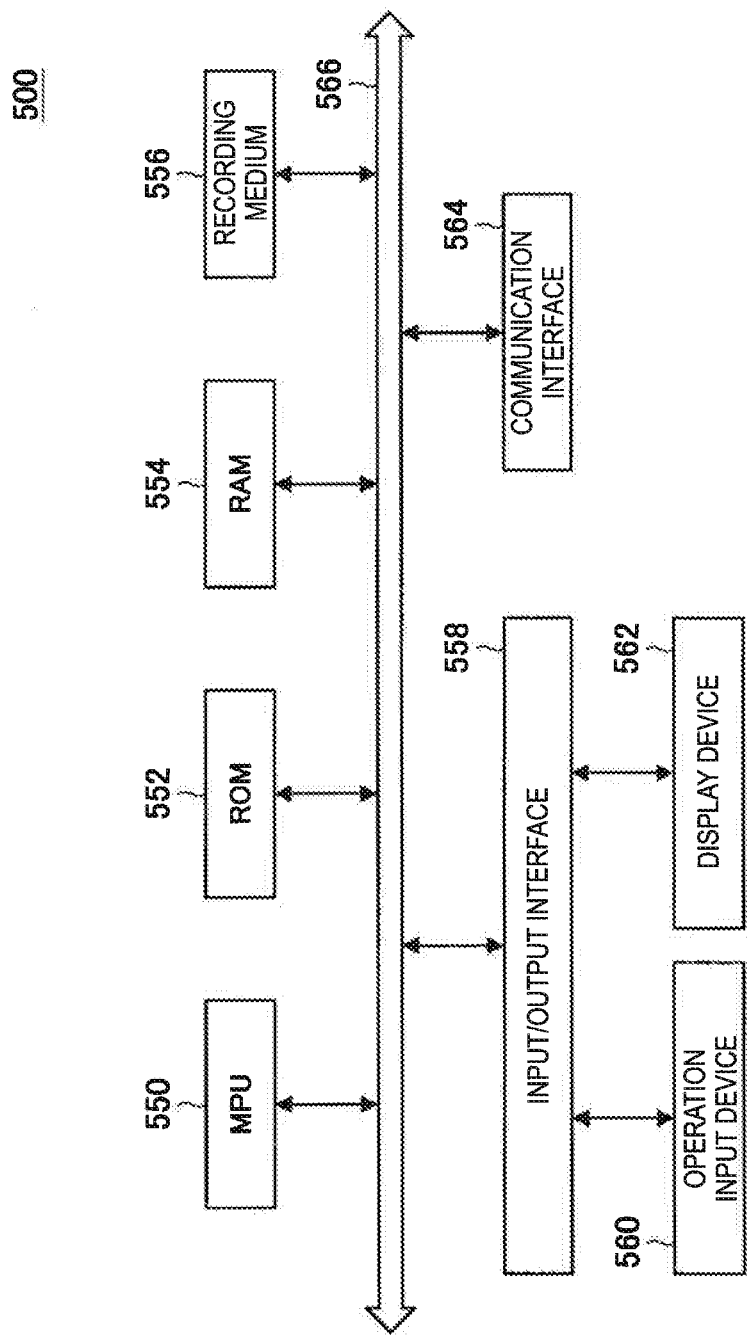
FIG. 33 is an illustrative diagram showing an example of a hardware configuration of the management device according to the present embodiment.

FIG. 33 is an illustrative diagram showing an example of a hardware configuration of the management device 500 according to the present embodiment. The management device 500 is provided with, for example, an MPU550, a ROM 552, a RAM 554, a recording medium 556, an input/output interface 558, an operation input device 560, a display device 562, and a communication interface 564. In addition, the management device 500 connects the respective constituent elements with each other using, for example, a bus 566 serving as a data transmission path.

The MPU 550 is constituted with, for example, one or two or more processors configured as an operation circuit such as an MPU, various processing circuits, and the like, and functions as the control unit 504 which controls the management device 500 overall. In addition, the MPU 550 plays a role of, for example, a processing unit 510 in the management device 500.

The ROM 552 stores control data such as programs and operation parameters used by the MPU550, and the like. The RAM 554 temporarily stores, for example, a program or the like executed by the MPU550.

The recording medium 556 functions as the storage unit (not shown), and stores, for example, data relating to the payment system according to the present embodiment such as the coupon distribution DB and the payment DB, and various kinds of data such as various applications. Here, as the recording medium 556, for example, a magnetic recording medium such as a hard disk and a non-volatile memory such as a flash memory are exemplified. In addition, the recording medium 556 may be attachable to/detachable from the management device 500.

The input/output interface 558 is connected, for example, to the operation input device 560 and the display device 562. The operation input device 560 serves as the operation unit (not shown), and the display device 562 serves as the display unit (not shown). Here, as the input/output interface 558, for example, a USB port, a DVI terminal, an HDMI (a registered trademark) terminal, various processing circuits or the like may be exemplified.

In addition, the operation input device 560 is provided, for example, on the management device 500, and connected with the input/output interface 558 in the inside of the management device 500. As the operation input device 560, for example, buttons, arrow keys, a rotary type selector such as a jog dial, or a combination thereof may be exemplified.

Furthermore, the display device 562 is provided, for example, on the management device 500, and connected with the input/output interface 558 in the inside of the management device 500. As a display device constituting the display device 562, for example, a liquid crystal display, an organic EL display, or the like is exemplified.

Note that it is a matter of course that the input/output interface 558 can be connected to an external device such as an external operation input device (e.g., a keyboard, a mouse, etc.) and an external display device as external devices of the management device 500. Furthermore, the display device 562 may be, for example, a device that enables display and a user operation, such as a touch panel.

The communication interface 564 is a communication means provided in the management device 500, functioning as the communication unit 502 for performing wireless or wired communication with an external device such as the shop-installed terminal 600 or the sales assistant terminal 700 via a network (or directly). Here, as the communication interface 564, for example, a communication antenna and an RF circuit, an IEEE 802.15.1 port and a transmission/reception circuit, an IEEE 802.11 port and a transmission/reception circuit, a LAN terminal and a transmission/reception circuit, or the like are exemplified.

The management device 500 performs the process of the payment system according to the present embodiment with, for example, the configuration shown in FIG. 33. Note that a hardware configuration of the management device 500 according to the present embodiment is not limited to the configuration shown in FIG. 33.

When communication is performed with an external device via a connected external communication device, for example, the management device 500 may not be provided with the communication interface 564.

In addition, the management device 500 may be further provided with, for example, one or two or more communication interfaces whose communication schemes are different from the communication interface 564.

Furthermore, the management device 500 can have a configuration in which, for example, the recording medium 556, the operation input device 560, or the display device 562 is not provided.

In addition, the configuration shown in FIG. 33 (or a configuration of a modified example thereof) may be realized with, for example, one or two or more ICs.

The example of the configuration of the management device 500 will be described with reference to FIG. 32 again. The communication unit 502 is a communication means provided in the management device 500, and performs wireless or wired communication with an external device such as the shop-installed terminal 600 or the sales assistant terminal 700 via a network (or directly). In addition, communication of the communication unit 502 is controlled by, for example, the control unit 504.

Here, although a communication antenna and an RF circuit, a LAN terminal and a transmission/reception circuit or the like may be exemplified as the communication unit 502, for example, the configuration of the communication unit 502 is not limited thereto. For example, the communication unit 502 may have a configuration corresponding to an arbitrary standard that enables communication of a USB port, a transmission/reception circuit and the like, and an arbitrary configuration in which communication with an external device via a network may be performed. In addition, the communication unit 502 may have a configuration in which communication with one or more external devices according to a plurality of communication schemes may be performed.

The control unit 504 is configured with, for example, an MPU, and plays a role of controlling the management device 500 overall. In addition, the control unit 504 is provided with, for example, the processing unit 510, and the processing unit 510 performs, for example, the process of the payment system according to the present embodiment.

The management device 500 performs the process of the payment system according to the present embodiment with, for example, the configuration shown in FIG. 32.

Note that a configuration of the management device constituting the payment system according to the present embodiment is not limited to the configuration shown in FIG. 32.

In the management device according to the present embodiment, for example, the processing unit 510 shown in FIG. 32 can be separately provided from the control unit 504 (for example, realized with a different processing circuit).

In addition, when communication is performed with an external device via an external communication device having a function and a configuration similar to those of the communication unit 502, for example, the management device according to the present embodiment may not be provided with the communication unit 502.

[C-3] Shop-Installed Terminal 600 (Processing Device)

The shop-installed terminal 600 has a configuration, for example, similar to that of the information transmission control device 200 shown in FIG. 19 (including a configuration of a modified example). In addition, the shop-installed terminal 600 is configured to have a hardware configuration, for example, similar to that of the information transmission control device 200 shown in FIG. 20 (including a configuration of a modified example).

The shop-installed terminal 600 performs the process of the payment system according to the present embodiment using, for example, the control unit 206. In addition, the shop-installed terminal 600 may perform the process of the payment system according to the present embodiment using a processing unit (not shown) configured as a different processing circuit from the control unit 206.

[C-4] Sales Assistant Terminal 700 (Processing Device)

Figure 34:
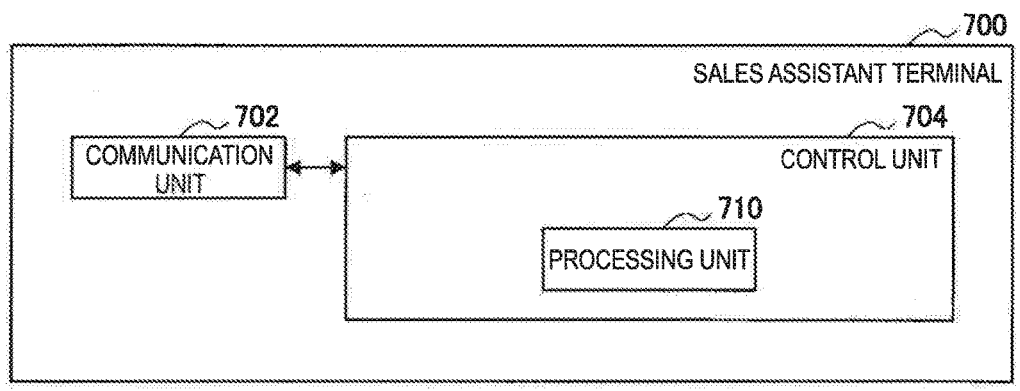
FIG. 34 is a block diagram showing an example of a configuration of a staff terminal according to the present embodiment.

FIG. 34 is a block diagram showing an example of a configuration of the sales assistant terminal 700 according to the present embodiment. The sales assistant terminal 700 is provided with, for example, a communication unit 702 and a control unit 704.

The sales assistant terminal 700 may be provided with, for example, a ROM (not shown), a RAM (not shown), a storage unit (not shown), an operation unit (not shown) which can be operated by a user of the sales assistant terminal 700, a display unit (not shown) which displays various screens on a display screen, and the like. The sales assistant terminal 700 connects the respective constituent elements with each other using, for example, a bus serving as a data transmission path.

The ROM (not shown) stores control data such as programs and operation parameters used by the control unit 704. The RAM (not shown) temporarily stores a program executed by the control unit 704.

The storage unit (not shown) is a storage means provided in the sales assistant terminal 700, and stores various kinds of data, for example, various applications. Here, as the storage unit (not shown), for example, a magnetic recording medium such as a hard disk, a non-volatile memory such as a flash memory, or the like is exemplified. In addition, the storage unit (not shown) is attachable to/detachable from the sales assistant terminal 700.

As the operation unit (not shown), for example, a device similar to the operation input device 560 shown in FIG. 33 is exemplified. In addition, as the display unit (not shown), for example, a device similar to the display device 562 shown in FIG. 33 is exemplified.

Example of Hardware Configuration of Sales Assistant Terminal 700

The sales assistant terminal 700 has a hardware configuration, for example, similar to the hardware configuration of the management device 500 shown in FIG. 33. When the configuration similar to the hardware configuration of the management device 500 shown in FIG. 33 is adopted, the communication interface 564 shown in FIG. 33 plays the role of the communication unit 702 which performs communication with an external device such as the management device 500. In addition, when the configuration similar to the hardware configuration of the management device 500 shown in FIG. 33 is adopted, the MPU 550 shown in FIG. 33 plays the role of the control unit 704.

Note that the hardware configuration of the sales assistant terminal 700 is not limited to the configuration similar to the hardware configuration of the management device 500 shown in FIG. 33. In addition to the communication device that performs communication with the management device 500, for example, the sales assistant terminal 700 may be provided with either a communication device for the first communication such as an IEEE 802.15.1 port and a transmission/reception circuit or a communication device for the second communication such as a communication device for NFC, or both.

The communication unit 702 is a communication means provided in the sales assistant terminal 700, and performs wireless or wired communication with an external device such as the management device 500 via a network (or directly). In addition, communication of the communication unit 702 is controlled by, for example, the control unit 704.

Here, although a communication antenna and an RF circuit, a LAN terminal and a transmission/reception circuit or the like may be exemplified as the communication unit 702, for example, the configuration of the communication unit 702 is not limited thereto. For example, the communication unit 702 may have a configuration corresponding to an arbitrary standard that enables communication of a USB port, a transmission/reception circuit and the like, and an arbitrary configuration in which communication with an external device may be performed via a network. In addition, the communication unit 702 may have a configuration in which communication with one or more external devices according to a plurality of communication schemes may be performed.

The control unit 704 is constituted with, for example, an MPU or the like, and plays a role of controlling the sales assistant terminal 700 overall. In addition, the control unit 704 is provided with, for example, a processing unit 710, and performs the process of the payment system according to the present embodiment using, for example, the processing unit 710.

The sales assistant terminal 700 performs the process of the payment system according to the present embodiment with, for example, the configuration shown in FIG. 34.

Note that a configuration of the sales assistant terminal constituting the payment system according to the present embodiment is not limited to the configuration shown in FIG. 34.

The sales assistant terminal according to the present embodiment can be provided with the processing unit 710 shown in FIG. 34, for example, separately from the control unit 704 (for example, realized with a different processing circuit).

In addition, when communication is performed with an external device via an external communication device having a function and a configuration similar to those of the communication unit 702, for example, the sales assistant terminal according to the present embodiment may not be provided with the communication unit 702.

Although the information processing device has been described above as a constituent element of the payment system according to the present embodiment, the present embodiment is not limited thereto. The present embodiment can be applied to various apparatuses, for example, devices having a UI function such as IC cards having a UI function as shown in FIG. 24, communication devices such as smartphones or mobile telephones, tablet type devices, computers such as PCs, video/audio reproduction devices (or video/audio recording/reproduction devices), game machines, and the like. In addition, the present embodiment can also be applied to, for example, processing ICs which are incorporated into the apparatuses described above, and the like.

Furthermore, although the management device has been described as a constituent element of the payment system according to the present embodiment, the present embodiment is not limited thereto. The present embodiment can be applied to various apparatuses, for example, computers such as PCs and servers.

In addition, although the shop-installed terminal has been described as a constituent element of the payment system according to the present embodiment, the present embodiment is not limited thereto. The present embodiment can be applied to various apparatuses that can be installed in stores and the like, for example, devices for POS, computers such as PCs and servers, communication devices such as smartphones and mobile telephones, tablet type devices, and the like. Furthermore, the present embodiment can also be applied to, for example, processing ICs that can be incorporated into the apparatuses described above.

In addition, although the sales assistant terminal has been described as a constituent element of the payment system according to the present embodiment, the present embodiment is not limited thereto. The present embodiment can be applied to various apparatuses, for example communication devices such as smartphones and mobile telephones, tablet type devices, computers such as PCs, and the like. Furthermore, the present embodiment can also be applied to, for example, processing ICs that can be incorporated into the apparatuses described above.

Program Relating to Payment System According to Present Embodiment

[a] Program for enabling computer to function as information processing device constituting payment system according to present embodiment The payment system according to the present embodiment can be realized as a program for enabling a computer to function as the information processing device constituting the payment system according to the present embodiment (for example, a program for enabling a computer to function as the information processing device 100 constituting the payment system 2000) is executed by a processor and the like of the computer.

[b] Program for Enabling Computer to Function as Management Device Constituting Payment System According to Present Embodiment The payment system according to the present embodiment can be realized as a program for enabling a computer to function as the management device constituting the payment system according to the present embodiment (for example, a program for enabling a computer to function as the management device 500 constituting the payment system 2000) is executed by a processor and the like of the computer.

[c] Program for Enabling Computer to Function as Shop-Installed Terminal Constituting Payment System According to Present Embodiment The payment system according to the present embodiment can be realized as a program for enabling a computer to function as the shop-installed terminal constituting the payment system according to the present embodiment (for example, a program for enabling a computer to function as the shop-installed terminal 600 constituting the payment system 2000) is executed by a processor and the like of the computer.

[d] Program for Enabling Computer to Function as Sales Assistant Terminal Constituting Payment System According to Present Embodiment The payment system according to the present embodiment can be realized as a program for enabling a computer to function as the sales assistant terminal constituting the payment system according to the present embodiment (for example, a program for enabling a computer to function as the sales assistant terminal 700 constituting the payment system 2000) is executed by a processor and the like of the computer.

The preferred embodiment(s) of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the programs for enabling a computer to function as, for example, the information processing device according to the present embodiment or the information transmission control device according to the present embodiment (computer programs) have been described to be provided above, the present embodiment can further provide recording media in which the programs are stored respectively, or a recording medium in which the programs are stored together as well.

In addition, although the programs for enabling a computer to function as the respective devices constituting the payment system according to the present embodiment have been described to be provided above, the present embodiment can further provide recording media in which the programs are stored respectively, or a recording medium in which two or more of the programs are stored together as well.

The above configuration shows an example of the present embodiment and naturally comes under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:
a processing unit configured to, when an information transmission control device is detected based on a signal transmitted from the information transmission control device using first communication, cause user information indicating a user to be transmitted to the information transmission control device using second communication whose communicable range is narrower than the first communication, and to acquire, using the first communication, distribution information transmitted from the information transmission control device that has acquired the user information.

(2)

The information processing device according to (1), wherein the processing unit
acquires the distribution information including the user information transmitted using the second communication, or acquires the distribution information transmitted from the information transmission control device in association with the user information transmitted using the second communication.

(3)

The information processing device according to (1) or (2), wherein the distribution information is information corresponding to the user information transmitted using the second communication.

(4)

The information processing device according to any one of (1) to (3), wherein, when the information transmission control device is detected, the processing unit causes the user information to be transmitted using the second communication based on a user operation to start the second communication.

(5)

The information processing device according to any one of (1) to (4), wherein, when the information transmission control device is detected using the first communication, the processing unit notifies a user that the information transmission control device is detected.

(6)

The information processing device according to (5), wherein the processing unit changes content that the user is to be notified of according to a state of detection of the information transmission control device in the first communication.

(7)

The information processing device according to any one of (1) to (6), wherein, when the distribution information is acquired using the first communication, the processing unit notifies a user of content indicated by the distribution information.

(8)

The information processing device according to any one of (5) to (7), further including:
a display unit configured to display content notified of by the processing unit on a display screen.

(9)

The information processing device according to any one of (5) to (8), further including:
an audio output unit configured to output a sound indicating content notified of by the processing unit.

(10)

The information processing device according to any one of (1) to (9), further including:
a first communication unit configured to be capable of communicating with an external device using the first communication.

(11)

The information processing device according to any one of (1) to (10), further including:
a second communication unit configured to be capable of communicating with an external device using the second communication.

(12)

An information transmission control device including:
a communication control unit configured to cause a signal to be transmitted using first communication, and to cause distribution information to be transmitted using the first communication when user information indicating a user is acquired using second communication whose communicable range is narrower than the first communication.

(13)

The information transmission control device according to (12), wherein the communication control unit causes the distribution information corresponding to the acquired user information to be transmitted.

(14)

An information processing method executed by an information processing device, the method including:
a step of causing, when an information transmission control device is detected based on a signal transmitted from the information transmission control device using first communication, user information indicating a user to be transmitted to the information transmission control device using second communication whose communicable range is narrower than the first communication; and
a step of acquiring, using the first communication, distribution information transmitted from the information transmission control device that has acquired the user information.

(15)

An information transmission control method executed by an information transmission control device, the method including:
a step of transmitting a signal using first communication; and
a step of transmitting distribution information using the first communication when user information indicating a user is acquired using second communication whose communicable range is narrower than the first communication.

(16)

A program for causing a computer to execute:
a step of transmitting, when an information transmission control device is detected based on a signal transmitted from the information transmission control device using first communication, user information indicating a user to the information transmission control device using second communication whose communicable range is narrower than the first communication; and
a step of acquiring, using the first communication, distribution information transmitted from the information transmission control device that has acquired the user information.

(17)

A program for causing a computer to execute:
a step of transmitting a signal using first communication; and
a step of transmitting distribution information using the first communication when user information indicating a user is acquired using second communication whose communicable range is narrower than the first communication.

(18)

An information processing system including:
an information transmission control device; and
an information processing device,
wherein the information transmission control device includes a communication control unit configured to cause a signal to be transmitted using first communication, and to cause distribution information to be transmitted using the first communication when user information indicating a user is acquired using second communication whose communicable range is narrower than the first communication, and
the information processing device includes a processing unit configured to, when the information transmission control device is detected based on a signal transmitted from the information transmission control device using the first communication, cause the user information to be transmitted to the information transmission control device using the second communication, and to acquire, using the first communication, the distribution information transmitted from the information transmission control device.

REFERENCE SIGNS LIST 100 information processing device
102, 202 first communication unit
104, 204 second communication unit
106 storage unit
108, 206, 504, 704 control unit
110, 510, 710 processing unit
200, 200A, 200B, 200C, 200D, 200N information transmission control device
210 communication control unit
300, 500 management device
400 management terminal
502, 702 communication unit
600, 600A, 600B shop-installed terminal
700, 700A, 700B sales assistant terminal
1000 information processing system
2000 payment system

The invention claimed is:

1. An information processing device comprising:
a processing unit configured to
notify a user when an information transmission control device is detected based on a signal transmitted from the information transmission control device using first communication,
determine a user operation to start second communication whose communicable range is narrower than the first communication when the information processing device is within the communicable range of the second communication of the information transmission control device,
cause user information indicating the user to be transmitted to the information transmission control device using the second communication based on the user operation to start the second communication, and
acquire distribution information transmitted from the information transmission control device using the first communication when the information transmission control device has acquired the user information using the second communication.

2. The information processing device according to claim 1, wherein the processing unit is further configured to
acquire the distribution information including the user information transmitted using the second communication, or
acquire the distribution information transmitted from the information transmission control device in association with the user information transmitted using the second communication.

3. The information processing device according to claim 1, wherein the distribution information is information corresponding to the user information transmitted using the second communication.

4. The information processing device according to claim 1, wherein the processing unit is further configured to change content that the user is to be notified of according to a state of detection of the information transmission control device in the first communication.

5. The information processing device according to claim 1, wherein, when the distribution information is acquired using the first communication, the processing unit is further configured to notify a user of content indicated by the distribution information.

6. The information processing device according to claim 1, further comprising:
a display unit configured to display content notified by the processing unit on a display screen.

7. The information processing device according to claim 1, further comprising:
an audio output unit configured to output a sound indicating content notified by the processing unit.

8. The information processing device according to claim 1, further comprising:
a first communication unit configured to communicate with an external device using the first communication.

9. The information processing device according to claim 1, further comprising:
a second communication unit configured to communicate with an external device using the second communication.

10. An information transmission control device comprising:
a communication control unit configured to
cause a signal to be transmitted using first communication,
request a user operation to start second communication whose communicable range is narrower than the first communication in order to transmit user information indicating a user when an information processing device is within the communicable range of the second communication of the information transmission control device, and
cause distribution information to be transmitted using the first communication when the user information is acquired using the second communication based on the user operation to start the second communication.

11. The information transmission control device according to claim 10, wherein the communication control unit is further configured to cause the distribution information corresponding to the acquired user information to be transmitted.

12. An information processing method executed by an information processing device, the method comprising:
notifying a user when an information transmission control device is detected based on a signal transmitted from the information transmission control device using first communication;
determining a user operation to start the second communication whose communicable range is narrower than the first communication when the information processing device is within the communicable range of the second communication of the information transmission control device;
causing user information indicating the user to be transmitted to the information transmission control device using the second communication based on the user operation to start the second communication; and
acquiring distribution information transmitted from the information transmission control device using the first communication when the information transmission control device has acquired the user information using the second communication.

13. An information transmission control method executed by an information transmission control device, the method comprising:
transmitting a signal using first communication;
requesting a user operation to start second communication whose communicable range is narrower than the first communication in order to transmit user information indicating a user when an information processing device is within the communicable range of the second communication of the information transmission control device; and transmitting distribution information using the first communication when the user information is acquired using the second communication based on the user operation to start the second communication.

14. A non-transitory computer-readable medium having embodied thereon a program, which when executed by a computer of an information processing device causes the computer to execute a method, the method comprising:

notifying a user when an information transmission control device is detected based on a signal transmitted from the information transmission control device using first communication;

determining a user operation to start the second communication whose communicable range is narrower than the first communication when the information processing device is within the communicable range of the second communication of the information transmission control device;

causing user information indicating the user to be transmitted to the information transmission control device using the second communication based on the user operation to start the second communication; and acquiring distribution information transmitted from the information transmission control device using the first communication when the information transmission control device has acquired the user information using the second communication.

15. A non-transitory computer-readable medium having embodied thereon a program, which when executed by a computer of an information transmission control device causes the computer to execute a method, the method comprising:

transmitting a signal using first communication;

requesting a user operation to start second communication whose communicable range is narrower than the first communication in order to transmit user information indicating a user when an information processing device is within the communicable range of the second communication of the information transmission control device; and transmitting distribution information using the first communication when the user information is acquired using the second communication based on the user operation to start the second communication.

16. An information processing system comprising:
an information transmission control device; and
an information processing device, wherein
the information transmission control device includes a communication control unit configured to
cause a signal to be transmitted using first communication,
request a user operation to start second communication whose communicable range is narrower than the first communication in order to transmit user information indicating a user when the information processing device is within the communicable range of the second communication of the information transmission control device, and
cause distribution information to be transmitted using the first communication when the user information is acquired using the second communication based on the user operation to start the second communication, and
the information processing device includes a processing unit configured to
notify the user when the information transmission control device is detected based on the signal transmitted from the information transmission control device using the first communication,
determine the user operation to start the second communication when the information processing device is within the second communicable range of the second communication of the information transmission control device,
cause the user information to be transmitted to the information transmission control device using the second communication based on the user operation to start the second communication, and
acquire distribution information transmitted from the information transmission control device using the first communication when the information transmission control device has acquired the user information using the second communication.

* * * * *